United States Patent [19]
Bernard et al.

[11] Patent Number: 5,918,213
[45] Date of Patent: *Jun. 29, 1999

[54] SYSTEM AND METHOD FOR AUTOMATED REMOTE PREVIEWING AND PURCHASING OF MUSIC, VIDEO, SOFTWARE, AND OTHER MULTIMEDIA PRODUCTS

[75] Inventors: Warren E. Bernard, Bethesda, Md.; Philip A. Jacobson, Vienna, Va.

[73] Assignee: MCI Communications Corporation, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,104

[22] Filed: Dec. 22, 1995

[51] Int. Cl.[6] .................................................. G06F 17/60
[52] U.S. Cl. ..................... 705/26; 705/27; 395/200.57; 395/200.58; 395/200.59
[58] Field of Search ........................... 364/401 R, 478.01, 364/479.03; 235/381; 395/226, 227, 200.57, 200.58, 200.59; 705/26, 27

[56] References Cited

U.S. PATENT DOCUMENTS 3,082,402  3/1963  Scantlin .
3,159,818  12/1964  Scantlin .

(List continued on next page.)

FOREIGN PATENT DOCUMENTS 1 225 759  10/1984  Canada .
0 249 575  12/1987  European Pat. Off. .
WO 87/00375  1/1987  WIPO .
WO 88/02966  4/1988  WIPO .
WO 94/06085  3/1994  WIPO .

OTHER PUBLICATIONS

"VH1 Online Takes Vid Net to Cyberspace", Billboard, v 107, n 41, pp. 41+ Oct. 14, 1995.
"Virgin Goes On Line With Net Shopping", Music Week, p. 4, Apr. 29, 1995.
John Heilemann, "From Prime Time to My Time", Economist, v 330, n 2850, pp. SS9–SS11, Feb. 12, 1994.
Bruce Page, Ernest Perez, "Online Help for Finding the Right Software", Link–Up, v 5, n 5, pp. 14–15, Oct. 1988.
Steven J. Bell, "Bailouts and Brutal Disconnects: How to Handle Search Interruptions", Online, v 16, n 6, pp. 50–61, Nov. 1992.

(List continued on next page.)

*Primary Examiner*—Gail O. Hayes
*Assistant Examiner*—William N. Hughet

[57] ABSTRACT

An automated product purchasing system allows purchasers to order products via a remote communications medium without having to speak to a sales representative or other human operator. According to the invention, purchasers access the automated product purchasing system and browse among the selections offered. Menu style prompts guide the customer through the various products offered by the automated product purchasing system. Product descriptions are provided to assist the customer in making his or her selections. Where appropriate, product samples are provided to the customer via the communications medium so the customer can evaluate the product prior to purchasing. Examples of product samples include movie previews, sample cuts from music tracks, software demos, and the like. Ordering and purchasing are automated so that human operators are not required to intervene in the process. The use of a membership profile with important customer information facilitates the automation of the process and minimizes the amount of times a repeat customer needs to provide this information.

40 Claims, 45 Drawing Sheets

U.S. PATENT DOCUMENTS

| | | |
|---|---|---|
| 3,249,919 | 5/1966 | Scantlin . |
| 3,371,162 | 2/1968 | Scantlin . |
| 3,381,276 | 4/1968 | James . |
| 3,482,057 | 12/1969 | Abbott et al. . |
| 3,829,833 | 8/1974 | Freeny, Jr. et al. . |
| 3,911,397 | 10/1975 | Freeny, Jr. et al. . |
| 3,924,065 | 12/1975 | Freeny, Jr. . |
| 3,928,724 | 12/1975 | Byram et al. . |
| 3,946,220 | 3/1976 | Brobeck et al. . |
| 3,970,992 | 7/1976 | Boothroyd et al. . |
| 4,071,698 | 1/1978 | Barger, Jr. et al. . |
| 4,071,911 | 1/1978 | Mazur . |
| 4,112,421 | 9/1978 | Freeny, Jr. . |
| 4,209,787 | 6/1980 | Freeny, Jr. . |
| 4,217,588 | 8/1980 | Freeny, Jr. . |
| 4,220,991 | 9/1980 | Hamano et al. . |
| 4,232,317 | 11/1980 | Freeny, Jr. . |
| 4,265,371 | 5/1981 | Desai et al. . |
| 4,270,182 | 5/1981 | Asija . |
| 4,300,040 | 11/1981 | Gould et al. . |
| 4,328,544 | 5/1982 | Baldwin et al. . |
| 4,414,467 | 11/1983 | Gould et al. . |
| 4,494,197 | 1/1985 | Troy et al. . |
| 4,517,410 | 5/1985 | Williams et al. . |
| 4,528,643 | 7/1985 | Freeny, Jr. . |
| 4,654,482 | 3/1987 | DeAngelis . |
| 4,674,044 | 6/1987 | Kalmus et al. . |
| 4,674,055 | 6/1987 | Ogaki et al. . |
| 4,763,191 | 8/1988 | Gordon et al. . |
| 4,785,408 | 11/1988 | Britton et al. . |
| 4,792,968 | 12/1988 | Katz . |
| 4,797,911 | 1/1989 | Szlam et al. . |
| 4,797,913 | 1/1989 | Kaplan et al. . |
| 4,799,156 | 1/1989 | Shavit et al. . |
| 4,845,739 | 7/1989 | Katz . |
| 4,852,154 | 7/1989 | Lewis et al. . |
| 4,866,756 | 9/1989 | Crane et al. . |
| 4,894,857 | 1/1990 | Szlam et al. . |
| 4,908,850 | 3/1990 | Masson et al. . |
| 4,930,150 | 5/1990 | Katz . |
| 4,942,616 | 7/1990 | Linstroth et al. . |
| 4,943,995 | 7/1990 | Daudelin et al. . |
| 4,947,028 | 8/1990 | Gorog . |
| 4,969,183 | 11/1990 | Reese . |
| 4,975,945 | 12/1990 | Carbullido . |
| 4,989,233 | 1/1991 | Schakowsky et al. . |
| 4,992,940 | 2/1991 | Dworkin . |
| 5,014,298 | 5/1991 | Katz . |
| 5,048,075 | 9/1991 | Katz . |
| 5,073,929 | 12/1991 | Katz . |
| 5,128,984 | 7/1992 | Katz . |
| 5,218,631 | 6/1993 | Katz . |
| 5,224,153 | 6/1993 | Katz . |
| 5,251,252 | 10/1993 | Katz . |
| 5,255,309 | 10/1993 | Katz . |
| 5,259,023 | 11/1993 | Katz . |
| 5,349,633 | 9/1994 | Katz . |
| 5,351,285 | 9/1994 | Katz . |
| 5,359,645 | 10/1994 | Katz . |
| 5,418,713 | 5/1995 | Allen ................................. 364/403 |
| 5,539,635 | 7/1996 | Larson, Jr. . |

OTHER PUBLICATIONS

Lexis Search Results (Great American Potato–Chip Giveaway/Raisin Bran Game/giants Baseball Trivia—Dial Info): "In The Chips," *AdWeek,* Jul. 22, 1985; "San–Fran–Police–League," *Business Wire,* Aug. 2, 1985; "Similar Campaigns," *DM News,* Dec. 15, 1985; "Phone Offers Action At Push Of Button," *Advertising Age,* Feb. 6, 1986; and "Pay Radio Tunes In Charities, Turns Off Some Consumer Groups," *Los Angeles Times,* Aug. 24, 1986.

Hester, S.D. et al., "The AT&T Multi–Mode Voice Systems—Full Spectrum Solutions for Speech Processing Applications," Sep. 1985, pp. 1–10—(Proceedings Of The 1985 AVOIS Conference).

Press Release: "Telephone Call–In Game Uses Computer Voice Interface," Dallas, date unknown.

Author unknown, "Voice–Response System Improves Order Entry, Inventory Control," *Communication News,* Aug. 1976.

Brochure: "Periphonics Voicepack".

Brochure: "The Voice Response Peripheral That Turns Every Touch–Tone Telephone Into A Computer Terminal," Periphonics Corporation.

Rabin, J., "Minorities Seek 30% Share Of All Lottery Operations," *Sacramento Bee,* Apr. 12, 1985.

Finnigan, P., "Audiotex: The Telephone As Data–Access Equipment," *Data Communications,* 1987, pp. 155–161.

Ozawa, Y. et al., "Voice Response System And Its Applications," *Hitachi Review,* Dec. 1979, vol. 28. No. 6, pp. 301–305.

Adams, C., "Conversing With Computers," *Computerworld on Communications,* May 18, 1983, vol. 17, No. 20A, pp. 36–44.

VRU 104 DATA TYPES

GENERAL SYSTEM SCRIPTS

ENVIRONMENT SCRIPTS

MUSIC SAMPLES

BROWSERS

TEASERS

CATALOG LISTS

CALL STATISTICS

TOP HITS

FIG. 9

| ARTIST ID 1004 | CATALOG ID 1008 | ARTIST NAME 1012 | TITLE 1014 |
|---|---|---|---|
| 10060 | 10060   001 | 10000 MANIACS | WISHING CHAIR |
| 10060 | 10060   002 | 10000 MANIACS | IN MY TRIBE |
| 10060 | 10060   003 | 10000 MANIACS | BLIND MAN'S ZOO |

TOP HITS LIST 
CATALOG ID 1008
CATALOG ID 1008
CATALOG ID 1008
FIG. 11

INTERACTIVE TRANSACTION
DATABASE 112 DATA TYPES

MAPPING INFORMATION

CUSTOMER INFORMATION

ORDER INFORMATION

COMMISSIONS INFORMATION

TAX CALCULATION DATA

CREDIT CALCULATION DATA

PROFILING/CALL STATISTICS

FIG. 12

| FIG. 20C | FIG. 20A | FIG. 20B |

FIG. 20

SYSTEM AND METHOD FOR AUTOMATED REMOTE PREVIEWING AND PURCHASING OF MUSIC, VIDEO, SOFTWARE, AND OTHER MULTIMEDIA PRODUCTS

BACKGROUND OF THE INVENTION

1. Field of the Invention

This invention relates generally to purchasing systems and more specifically to a system and method for automated previewing and purchasing of products via a remote communications medium.

2. Related Art

The retail industry is one of the largest industries in the U.S. and global markets. Billions of dollars are spent in the retail industry each year by consumers throughout the world. Entrepreneurs and retailers have for years been attempting to capture a larger and larger share of this expanding retail market.

Historically, retailers provided their services in very traditional ways. In one situation, a retailer established a store where customers could visit, peruse the merchandise and make purchases. In this situation, customers had to visit the stores in order to purchase the products. This form of retailing is still one of the most prominent forms of retailing today. The evolution of this form of retailing into the shopping mall, some would argue, has provided increased convenience to shoppers in that numerous different types of products are offered "all under one roof."

A variation on this retail store theme is practiced by local street vendors. You would be hard-pressed to pass a busy urban downtown street corner without running across a street vendor. This is especially true in areas where tourists are plentiful. These vendors offer numerous products to passing pedestrians including food items, T-shirts and other miscellaneous items. Well known, of course, are the corner hot dog and pretzel vendors, whose products can be seen and smelled, but not tasted until purchased.

Another historical method of retailing was practiced by retailers who came to be known as "traveling salesman." These peddlers would travel from city to city, and set up a display in the town center, hawking their wares to interested townsfolk. Some of these retailers followed less than scrupulous business practices in that the products they offered rarely lived up to their promised value. The products offered by these hucksters came to be known as "snake oil cures." These remedies and elixirs were often "tested" by the salesman's accomplice, but the real customers never got to sample the products until after they made a purchase. In most instances, the salesman had already moved on to the next town before his patrons tried the product and realized that they had been duped. Needless to say, not all traveling salesmen were dishonest and, in fact, some offered very good products.

Another form of retailing is carried out by a "door-to-door" salesman. These retailers got their name because they traveled from door-to-door, peddling their products directly to the customer in the customer's home. Depending on the product offered, customers often had the opportunity to try out the product before purchasing. Many businesses who offer door-to-door service are still in operation today, offering numerous products from vacuum cleaners to household cleaning and food products.

It may appear that the door-to-door method of retailing offers the utmost in convenience to the shopper. In fact, in many cases, this is true. However, there are also many instances where residents feel intruded upon when door-to-door salesman come calling unannounced.

One form of retailing that has grown tremendously in recent times is the "shop-at-home-by-telephone" method. Using this retailing strategy, potential customers are provided with product information in the form of literature such as catalogs and fliers. Additionally, some retailers advertise by radio and television as well. When the customer determines that he or she would like to order a product, the customer dials a toll-free number, speaks to a sales person and orders a product. The customer either provides a credit card number over the phone, mails a check or money order to the retailer, or accepts the product C.O.D.

A more recent variation of the shop-at-home-by-telephone technique is the shop-by-television technique. Home shopping services which advertise their products via the television have of late enjoyed widespread popularity. Shoppers of these services watch advertisements of the products for sale and call in to order the desired products.

Some traditional shop-at-home-by-telephone techniques suffer one or more additional shortcomings. One shortcoming is that the customer must speak with a customer service representative to complete the sale. This requires a full staff of representatives on hand to answer calls. Additionally, if the service wants to operate 24 hours-a-day, the representatives must be on staff during these times.

The most recent retailing endeavors allow shoppers to browse through available products offered using the Internet. These services allow shop-at-home convenience without having to pick up the telephone.

Depending on the retail environment and on the products offered for sale, the customer may not be afforded the opportunity to inspect or sample the products to the level he or she desires. Shop-at-home-by-telephone retailing offers no opportunity for inspection or sampling of products. Customers have to rely on catalog pictures or descriptions when deciding which products to purchase.

Radio and television advertisements typically fail to give consumers an adequate sampling of the product. Often, products advertised on the television are shown only very briefly and are usually portrayed using ideal lighting, select camera angles and other techniques to enhance the appeal of the product. In many instances, the customer does not get an adequate appreciation for the true nature of the product. Radio advertisements for music selections usually only play the music as a background to the announcer's voice. Also, the customer is not allowed to sample other music selections, but is limited to hearing those selections advertised by the sponsors. In summary, neither radio nor television advertsing allows customers to adequately inspect products prior to purchase.

Even within retail stores there are some products which are not readily inspectable. Where a customer is purchasing clothing, toys, tools, etc. he or she has the ability to inspect the merchandise in the store before making a purchase. However, certain products that are sealed or that require a playback device, such as music, videos, video games, software, etc. typically cannot be examined. Some stores, such as music stores, video rental stores and software stores have sample selections playing for the customer to enjoy.

Other retail stores set up listening booths, in-store juke boxes, sample computers, or other like trial stations where customers can sample some of the available products. However, due to the costs of installing and maintaining these trial stations, the floor space they consume, and the cost of having inventory available at these stations, the variety of products available for sampling is usually quite limited.

Thus, one shortcoming common to all of the above-mentioned retail techniques is that they do not offer the consumer with an adequate opportunity to inspect or sample the offered products in a convenient and/or economical fashion.

SUMMARY OF THE INVENTION

The present invention is directed toward an automated product purchasing and previewing system (generally referred to as an "automated product purchasing system") which allows customers to shop for and purchase products via a remote communications medium in an automated fashion. According to the invention, customers access the automated system and browse through the selections offered. This access can be achieved by any remote communications medium such as the telephone, a direct data link, a network connection (e.g., the Internet), and other communications means.

Once a customer has accessed the automated product purchasing system, the customer is permitted to browse through the offered selections and to obtain more information about particular selections in which he or she may be interested. For example, in one embodiment, music, videos, computer software, and other multimedia products are offered for sale by the automated product purchasing system. In this embodiment, users can sample portions of selected titles to determine whether or not it is a product that they would actually like to rent or purchase.

For example, where the product is movies, the purchaser can select a particular movie to preview before actually purchasing or renting the movie. In this scenario, a sample portion of the movie, or an actual preview, is provided to the customer for his or her sampling. Where the customer is connected by a suitable medium (such as the Internet, for example), actual movie clips can be provided. However, where the customer only has voice access (such as a customer accessing the system via telephone), a description of the product (in this case a movie) is provided to the customer so that he or she can decide whether to purchase or rent the selection.

One embodiment of the invention is directed toward a script-based menu-driven system that allows users to shop for products via the telephone. In the script-based system, scripts are used to provide the purchaser with information pertaining to selections available on the automated product purchasing system, and to further provide the purchaser with price, availability, and delivery information on a product that he or she wishes to purchase. Scripts also introduce samples of the products selected by the customer, and are used to describe the products in greater detail.

In such a telephone implementation of the system, a telephone keypad as well as voice recognition can be used to allow the customer to provide his or her inputs to the automated product purchasing system. In an embodiment where access is provided via a data link (e.g., via modem or the Internet), product information, sales information, and other information can be provided to the customer through the use of computer pages, screens or other data capable of being displayed on the customer's terminal. Customer input is provided in response by way of keyboard, touch screen, mouse entry or other suitable input means.

To facilitate automated order processing, a customer can become a "member" of the system and have a membership profile on file containing important customer information. This membership information can include data such as the customer's name and shipping address, customer preferences, and customer payment information such as credit card, debit card or other payment information. Because all this information is maintained in a membership profile, the caller need not provide this information each time he or she places an order. Instead, the system can automatically access the customer's membership information to obtain necessary payment and shipping information.

An advantage of having a membership profile established for customers, is that certain customer information need not be entered by a customer each time he or she places an order. This provides greater convenience to the customer, and also minimizes staffing requirements for the automated product purchasing system. To the extent that credit card, debit card or other payment information can be maintained for a particular customer, this minimizes the number of instances in which the customer must provide his or her payment information over the telephone, or via network data link. Thus, this minimizes the number of instances in which this sensitive information is susceptible to interception by unauthorized third parties.

According to the invention, customers are provided with the ability to browse through various selections offered by the automated product purchasing system in a number of different ways. In one scenario, a customer is provided with the ability to browse through selections based on a product name. For example, where the product is music, the customer can browse through the available selections based on the artist's name and the titles of the albums available by that artist. This form of browsing is best suited to a customer who knows which particular products he or she is most interested in purchasing.

Another form of browsing allows a customer to learn more about products which are popular or in great demand but about which the customer may not be aware. For example, again consider the music environment. A customer may know that he or she wishes to purchase one or more music albums, but does not know which albums he or she is interested in. In this instance, the customer may call or otherwise access the automated purchasing system to browse through available selections based on selections that are in a top hits list, selections by a featured artist, or other like criteria.

For example, when the customer accesses the automated purchasing system, he or she may be provided with the option of hearing the top hits in his or her area, the tracks featured in a local radio station's play list, a featured artist, and the like. This allows the customer to gain exposure to various products even though he or she may not be sure in which particular products he or she is interested at the time he or she accesses the system. Where the product is movies, a similar scenario can be used whereby the customer can sample movies based on top box office hits, top sales, award-winning titles, films featuring certain stars, and other similar criteria. This facilitates browsing among the various selections offered.

Shopping can also be done based on a particular category of product in which the customer may be interested. For example, in the music environments, the browsing can be accommodated according to a style of music preferred by the customer. For movies, the customer may shop for available selections in a movie category in which he or she is interested (such as drama, action, comedy, etc.).

These examples serve to illustrate how various categories can be used to facilitate shopping among the various products offered, even where a customer is not sure exactly what he or she is looking for. The system comprises an interface unit which provides the front-end interface to the customers, an interactive transaction database for storing important information regarding the system and its customers, and, optionally, a customer service center for handling special situations which may arise from time to time with customers.

The interface units provide a front-end interface between the customers and the automated product purchasing system. The interface units provide information to the customers relating to various products and their availability. This information is provided via the communications medium through which the customer accesses the system. In embodiments where samples of music, video, computer software or other multimedia products are offered, these samples are provided to the customers via the interface units.

The system stores important information such as customer information, order information pertaining to the customer's order, and product information. The product information can include texts describing the products and their features, and samples of the products such as music samples, video samples, and other samples as appropriate depending on the product.

The customer service center can be manned by live sales and service representatives, or can be a fully or partially automated system. The customer service center is used to establish membership accounts and to handle particular situations which cannot be handled via the interface units.

The invention introduces the concept of a virtual shopping cart. The virtual shopping cart is used to hold items which a customer has selected for purchase during his or her shopping trip through the automated product purchasing system. When a customer is browsing among the various products offered and comes across a product that he or she wishes to purchase, the customer indicates that desire to the system via the interface unit. The interface unit causes that product to be "placed into the customer's virtual shopping cart." In one implementation of the invention, what this really means is that a number or other designator identifying the product selected by the customer is tagged as part of that customer's order information.

For each item placed in the virtual shopping cart, the product identification number is appended to the order information to maintain a list of products selected by the customer for purchase.

When the customer has completed his or her shopping and wishes to complete the transaction, the customer "checks out" of the automated product purchasing system. In this procedure, the customer actually completes the purchase of the items in his or her electronic shopping cart. In situations where a membership profile is established for that customer and all the payment and delivery information is on file, the customer has to do no more than verify the purchase. In other situations where information needs to be provided, this information is provided by the customer to the automated product purchasing system to complete the transaction and finalize the sale.

To provide maximum flexibility to the customer, it is possible that the customer review the items that she or he has in the electronic shopping cart and remove items which he or she no longer wishes to purchase. To further provide flexibility, the items in the electronic shopping cart can be maintained on hold should the customer disconnect from the system before the purchase is complete. For example, where the customer is accessing the automated product purchasing system via telephone and for some reason that telephone link is disconnected, the customer's items in the shopping cart are held for that customer for a determined period of time. If that customer reconnects with the automated product purchasing system during that time, the customer is reminded that he or she has items on hold from a previous session and is at that time permitted the opportunity to retain or discard any of those items in the electronic shopping cart. This provides added convenience to the shopper, should he or she need to disengage from the automated product purchasing system before he or she has completed a transaction.

The system provides the capability to compile statistics and other information on the customers and their purchasing habits. This information can be maintained on a per-customer basis and can also be maintained based on other metrics such as user preferences, geographic areas, and other attributes of the customers, the products in the system, and other like information. In this regard, data can be compiled and analyzed for various uses. For example, this data can be used to determine which products are likely to be in great demand for particular callers or for particular regions based on previous sales experiences. Also, this information can be used to reward frequent purchasers with special offerings to thank them for being good customers and to encourage their continued loyalty to the system. Likewise, the information can be used to determine which customers may frequently access the system yet seldom purchase products. These customers may be discouraged from unnecessarily consuming system resources to the disadvantage of customers who actually utilize the system to purchase products.

The automated product purchasing system is capable of supporting and offering various promotions to the customers according to a plurality of scenarios. Promotions can be run and directed toward first-time callers, frequent purchasers, purchasers from a given geographic area, new members, purchases within a given time-frame, and other like criteria. Additionally, electronic couponing can be offered, such that coupons can be used as a form of promotion. As such, coupons provided to the customers via radio and television advertisements, magazine advertisements, periodicals, mailings, and other media, may be used by customers when making their purchases. In one instance, these coupons are identified by a coupon number which is provided by the customer at the time the purchase is made. These coupons can target specific customers, specific types of customers, specific geographic areas, and other like attributes. These coupons can also be set to be valid for only given periods of time or particular types of purchases. This is all handled using data stored in the interactive transaction database.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 9 is a diagram illustrating example data type for an interface unit. Specifically, FIG. 9 illustrates example data types for an embodiment of the invention where the customer interface is via telephone, the interface unit is a voice response unit (VRU) and the product offered is music albums.

FIG. 10 is a diagram illustrating an example data structure for an embodiment where the product is music albums.

FIG. 11 is a diagram illustrating an example product grouping according to a category type. Specifically, FIG. 11 illustrates that in one embodiment the top hits list is comprised of a catalog identification number for each track that makes up the top hits list.

FIG. 12 is a diagram illustrating an example listing of data types that can be included in interactive transaction database according to one embodiment of the invention.

FIG. 14 illustrates an example process in an embodiment where the customer is accessing the automated product purchasing system via telephone.

FIG. 20, which comprises

DETAILED DESCRIPTION OF THE INVENTION

Figure 1:
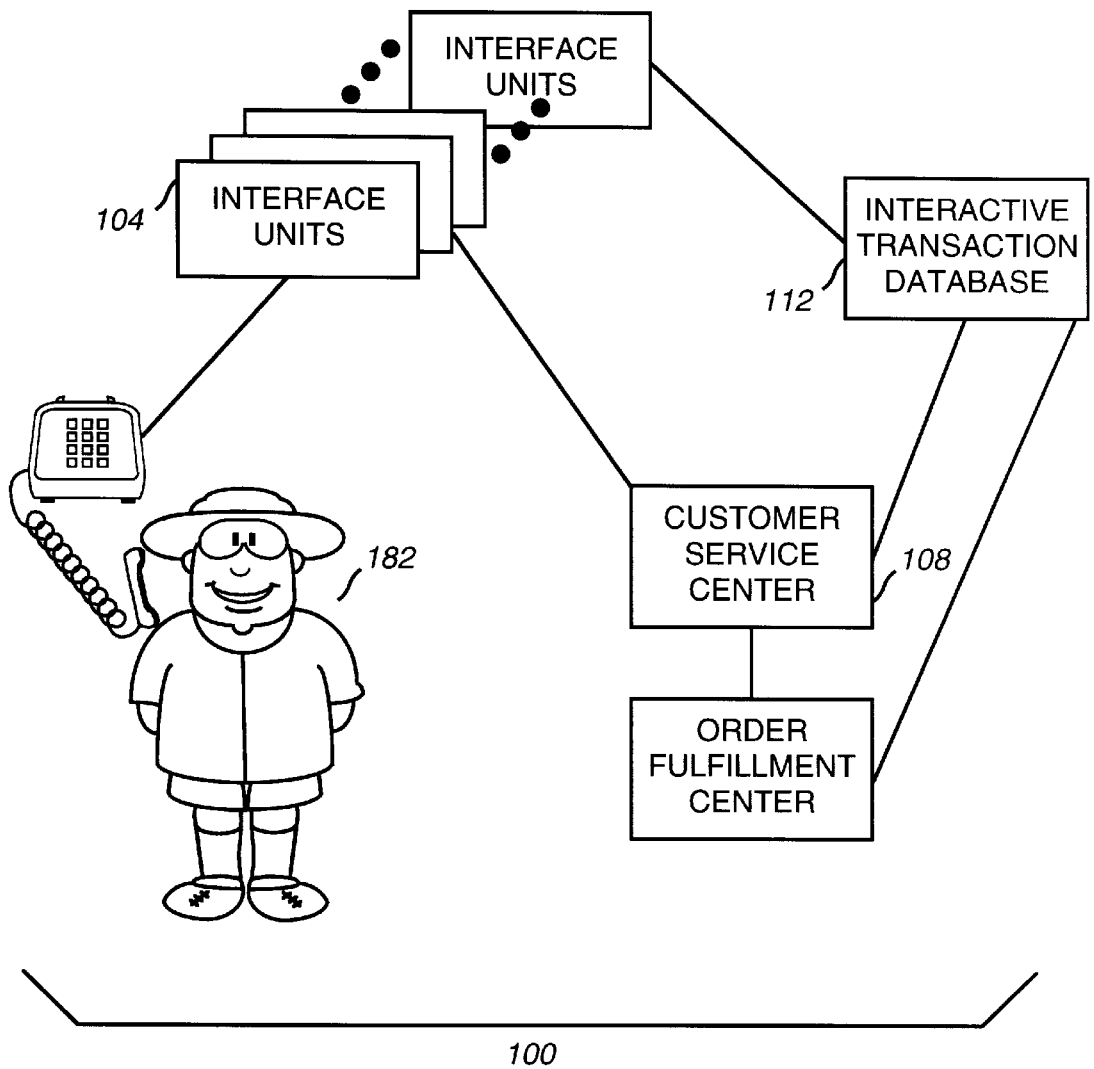
FIG. 1 is high level block diagram illustrating an example architecture for an automated product purchasing system according to one embodiment of the invention.

Table of Contents 1.0 Overview and Discussion of the Invention
   1.1 Automated Product Purchasing System
   1.2 Telephone Automated Music Purchasing System
2.0 Example High-Level Architecture
   2.1 High-Level Operational Scenarios 2.1.1 Access and Browse Features 2.1.2 Completion of a Purchase
   2.2 Example Architectures 2.2.1 Example Interface Unit Architecture 2.2.2 VRU's 2.2.3 VRU Sites 2.2.4 Additional VRU Embodiment 2.2.5 Interactive transaction Database 2.2.6 Automatic Call Distributor 2.2.7 Customer Service Center
   2.3 Expanded Example Architecture 2.3.1 Reporting Database 2.3.2 Fulfillment Vendor 2.3.3 WAN Example Architecture
      2.3.3.1 Example Architecture
      2.3.3.2 WAN Scenarios
3.0 Data Types and Data Files
   3.1 Interface Unit Data Types
   3.2 Interactive transaction database 112 Data Types
   3.3 Commissions Information
   3.4 Tax Computation
   3.5 Profiling and Statistics
   3.6 Data Structure Summary
4.0 Automated Product Purchasing System Operation
   4.1 Introduction to Menu-Driven Shopping
   4.2 Access via the User Interface
   4.3 Music Mall
      4.3.1 Browse by Artist
      4.3.2 Selection According to Catalog Number
5.0 Additional Features 5.1 Browser 5.2 Virtual shopping Cart 5.3 VRU Help Mode 5.4 Review and Order Processing 5.5 Order Review 5.6 Order Processing 5.7 Shopping Time-out 5.8 Check-out Process for a Timed-Out Caller 5.9 Removing Items from the Virtual Shopping Cart 5.10 Items on Hold 5.11 System Access
6.0 Promotions and Specials
7.0 Retail Store Browsing and Purchasing Systems 7.1 Remote Access by a Retail Store 7.2 Automated Retail Outlet 7.3 Automated Order Processing Center
8.0 Conclusion
1.0 Overview and Discussion of the Invention The present invention is directed toward an automated product purchasing and previewing system which allows purchasers to preview and order products via a remote communications medium without having to speak to a sales representative or other human operator. According to the invention, purchasers (also referred to in this document as callers and shoppers) access the automated product purchasing and previewing system (generally referred to in shorthand as an "automated product purchasing system") and browse the selections offered.

The automated product purchasing system is introduced in this Section 1.0 of the document in two embodiments. The embodiment described in Section 1.1 is a generic product purchasing system described in terms of allowing callers to preview and purchase any type of product via the telephone. The embodiment described in Section 1.2 further describes the first embodiment in terms of a specific product: music titles. Further embodiments are discussed in detail in subsequent sections of this document.

After reading the description of the embodiments of the invention as provided in this document, it will become apparent to a person skilled in the relevant art how to implement the invention for a system providing automated purchasing for virtually any type of product and over virtually any type of communications medium. The embodiments describing sales of music titles and describing access via a telephone connection are provided as a reader's aide to assist the reader in better visualizing the invention in a real-life example implementation. It should be noted that while virtually any type of product may be offered using the automated product purchasing system, certain features of the system make it particularly useful for vending audio, video, computer software and other multimedia products.

1.1 Automated Product Purchasing System

According to the invention, purchasers can browse through the product selections and listen to descriptions of products they may have an interest in purchasing. To facilitate this browsing, the purchasing system provides scripted menu selections guiding the purchaser (referred to in this document as "caller" when referring to telephone access embodiments of the invention) through the available product selections. The purchaser responds to the menu selections using keypad entries on his or her telephone. The menus also provide the caller with the option of purchasing the products.

In a script-based embodiment of the invention, scripts are used to provide the purchaser with price, availability and delivery information on a browsed product so that the purchaser can decide whether to actually purchase the product. If the purchaser decides to purchase a product, this is done by a simple keypad entry. If the purchaser is a "member" of the purchasing service, the purchaser has a profile on file which indicates the pertinent information such as the purchaser's delivery address, shipment preferences, credit/debit card or billing information, and other like information. Because the information required to complete the sale is contained in the purchaser's membership profile, the purchaser need not speak to a human operator to complete the sale. Thus, the process is fully automated.

In one embodiment, if the purchaser is not a member, the purchaser is still permitted to browse the available product listings, listen to or view product descriptions and sample product offerings. The non-member purchaser can even purchase products. However, because a non-member does not have a membership profile, the non-member will speak to a sales representative to complete the sale. At this time, the sales representative obtains payment and delivery information from the purchaser to complete the sale. If the purchaser desires, this information can be entered into a membership profile for that purchaser, allowing the purchaser to purchase products in the future without having to speak to a sales representative.

Naturally, many alternative methods of obtaining payment information can be utilized in combination with the present invention. Examples of these include mailed-in billing information, billing information collected in an automated fashion, and billing information obtained from other sources and reviewed, verified and approved by the customer prior to use.

1.2 Telephone Automated Music Purchasing System

The automated product purchasing system according to the invention can utilize a number of different communications media for allowing a purchaser to access the system. One such medium is the telephone. Additional media include cable systems, local or remote network access, a modem connection, a direct data line, and so on. Any one or any combination of these media can be used to access an automated product purchasing system according to the invention. In this Section 1.2 of the document, the automated product purchasing system is introduced in terms of an embodiment where the purchaser accesses the automated product purchasing system via a telephone.

To further illustrate the embodiment, it is described in terms of a remote, automated music previewing and purchasing system. The remote music purchasing system allows purchasers (referred to as callers in the telephone embodiment) to listen to samples of various music titles before making their selections. This music purchasing system (or service) embodiment is now briefly described.

According to the music purchasing system embodiment of the invention, a caller dials a telephone number to access the service. Preferably, the caller dials an 800 telephone number to access the service, but caller-paid numbers could also be used on either a per call or a timed call basis. Once connected, callers can browse through available music titles and hear samples of particular music titles in which they are interested. The browsing is facilitated by scripted menus which prompt the caller and guide him or her through the available titles. The caller may elect to browse by music category, by artist name, or by other artist, title, or music attributes.

If the caller elects to browse by music category, the caller can choose the kind of music he or she is interested in sampling. The various music styles that may be offered can include rock, alternative music, country, urban, rhythm & blues, classical, rap, and other styles. Based on the style of music selected by the caller the user is provided with the ability to listen to featured artists, top artists and titles, local favorites and other selections featured in their selected style.

In one embodiment, some of the samplings offered to the caller are based on the caller's geographic area. In this embodiment, the system determines the location from which the caller placed the call and plays for the caller a script of a disc jockey from one of the local radio stations to offer the caller further choices. For example, if the call is placed from the Baltimore/Washington area and the caller's preference is Alternative Music, a DJ from WHFS (a local alternative music radio station) offers the caller choices of music to sample. These choices can include, for example, a featured artist, a radio play featuring the week's top hits from that radio station, and top-selling albums in that area, among other choices. The caller can select to hear samples of music from each of these categories. In one embodiment, the caller is also provided with the option of hearing selections from the top-selling albums nationwide.

In some embodiments, the caller may be provided with the option of hearing selections from special promotional titles, nationwide featured artists, artists touring in the caller's geographic area, etc. The possibilities of categories in which titles may be organized for browsing are not limited by the purchasing system. The organization of categories for browsing can be determined based on business and marketing considerations. In other words, the system can be set up to allow the caller to browse through music in any manner that readily provides him or her to hear with the ability to sample titles in which the caller is most likely to be interested.

As stated above, in one embodiment the caller is provided the ability to listen to sample music selections by artist and title. The samples may include every track on an album, a selection of tracks from each album, or even a single track from an album. This feature is referred to as a Music Mall. In the Music Mall, callers can browse through the entire music inventory of the purchasing system. In the Music Mall, callers can choose what music they want to sample by categories such as, for example, Artist, Album Title, Catalog Number, Top-Selling Albums, and Specials. When the caller first connects with the music service, the caller is provided an audio menu by which he or she can make various selections. For example, the caller could choose to enter the Music Mall directly, where music titles can be purchased by Artist, Catalog Number, etc. Alternatively, the caller could choose to sample music featured by a local radio station, or top-selling albums in a particular style of music.

At any point during the call, whether sampling by category or whether shopping in the Music Mall, the caller can elect to purchase a title that he or she desires. When the caller determines the title he or she desires to purchase (either by sampling or otherwise), the caller simply enters a keypad keystroke.

Regardless of the manner chosen, the caller is ultimately given the ability to preview products in a manner, and to a degree, not normally provided by retail stores, or by other retail techniques, in a manner which is most convenient to a caller. In addition to provided callers with the ability to select and preview titles, the level of preview can be varied. In some situations, callers may only be allowed to listen to ten or fifteen seconds of a selection. However, in other situations, callers could have the ability to select longer play times. They could even be permitted to listen to entire songs during times of light call volume. The decision as to the length of sampling provided can be based on a number of parameters, such as for example call volume, whether the caller is a frequent purchaser or usually only a "window shopper", and other considerations.

In one embodiment, the caller's purchase is not final at this time, but is a pending purchase. In this embodiment, the title selected is said to be placed in the caller's virtual "shopping cart." At this point, the caller may choose to cancel the order, close the transaction by completing the purchase of the title in the virtual shopping cart, or continue to shop for additional titles. Additional titles can be added to the virtual shopping cart at any time during the call and titles no longer desired can be removed.

When the caller has finished shopping, he or she can complete the purchase, again using DTMF keystrokes. According to one embodiment, where the caller is already a member of the music service, this order can be completed automatically, without ever having to speak to a human operator. If callers are not members, or, alternatively, if they wish to speak to a representative, the order can be completed through a live music representative.

Members receive their own membership number and a personal identification number, or PIN. Account information is stored for each caller based on that caller's membership number. The personal identification number ensures that only the member has access to his or her information. Once a caller has established a membership account, caller information such as name, address, shipping preferences, credit card information, and the like, can be stored in the customer's membership profile. Thus, for existing members already having established membership profiles, an order can simply be placed by entering the membership number and PIN. The caller need not provide his or her name, address, and credit card information each time a product is ordered. This greatly streamlines the ordering process.

In one embodiment, to ensure secrecy with regard to the member's credit card information or other sensitive information, this sensitive information is masked from operators if they pull up membership information onto their screen. When an account is initially set up, the sales and service representative needs to know the credit card number and expiration date to enter it into the membership profile. But, because the credit validation and order processing steps are automated in several embodiments as described below, a sales and service representative need not access this information each time an order is placed. This minimizes the exposure a caller has to possible theft of his or her credit information.

Additionally, through the use of a membership profile, the shopper need not provide his or her credit card number (or other payment information) each time an order is placed. This minimizes the number of times a credit card number is spoken over the telephone, transmitted over the Internet, or otherwise transmitted to the shopping service. Thus, there are fewer opportunities for an unscrupulous third party to "tap" that information and misappropriate the shopper's credit information.

In summary, according to the invention, callers have the opportunity to sample a variety of different music selections and make those selections over the phone quickly and easily. For callers who know the artists in whom they are interested, they may simply choose to browse selections available by that artist in the Music Mall. Alternatively, for callers who are uncertain as to a particular artist, but who may know that they are interested in what is currently popular, or a top-selling artist, they may choose to browse based on music type and based on the selections offered by their local radio station or by a list of nation-wide top-selling albums.

The above description outlined various features and functions of the purchasing system in terms of an embodiment where the product offered is music (albums, CDS, cassettes, etc.). As stated above, the features and functions described in this music embodiment can be applied to other embodiments where other products are offered for sale. In fact, because the system allows portions of the product to be previewed by the shopper, the system lends itself particularly well to the sale of products such as videos (movies and movie rental, video-on-demand, educational programming, etc.), video games, computer software and other multi-media products. Using the previewing feature, the shopper can sample portions of the album, movie, video game, software, etc. before the decision is made to purchase or rent the product.

This provides the customer with great flexibility in making his or her shopping decisions. Note that in situations where the product is a multi-media product other than music, the sampling capabilities are limited using the telephone. Thus, these products are better vended in an embodiment where a computer system (instead of the telephone) is used as the means by which the shopper accesses the system. Such access can be provided via direct dial-up, network or Internet access, or other computer connection means.

Note that callers may not be able to "sample" other products in the way that music and other multi-media products can be sampled. However, the telephone-based embodiment of the system can provide the caller with a brief description of the products offered. Such descriptions can include the product features, uses, sizes, available colors, warranty information, and other product information a shopper may find useful when making a purchasing decision. Visual-based systems can provide graphics, text and other visual interactive preview techniques.

In this document the term "member" is used to describe a caller having a membership profile. In one embodiment, there are no special requirements for becoming a member, other than having membership information on file at the automated product purchasing system and being assigned a membership ID.

In this document the term "browse" and its conjugates are used with two meanings. In some instances the term is used to describe the concept of shopping using the automated product purchasing system and to highlight the system capability of allowing a shopper to look through and sample (or otherwise obtain information pertaining to) the available products. In another instance, the specific term "browser" is used as a noun to define a set of samples of songs from a music album. The meaning of the term in a particular instance is readily apparent from the context in which it is used.

2.0 Example High-Level Architecture

An example system architecture is now described for the automated product purchasing system. FIG. 1 is a block diagram illustrating an example architecture 100 for the automated product purchasing system. Referring now to FIG. 1, the architecture comprises a plurality of interface units 104, a customer service center 108, and an interactive transaction database 112. Interface units 104 provide an interface between the shopper and the functionality of the automated product purchasing system. Interface units 104 also provide a portion of the functionality of the automated product purchasing system as described below.

In the example architecture, a customer service center 108 is provided and is staffed with sales and service representatives capable of assisting customers with account information and purchasing information. For example, sales and service representatives may assist callers with such items as setting up new accounts, and changing existing account information.

Interactive transaction database 112 provides support to interface units 104 and customer service center 108 by maintaining, and in some embodiments generating, data needed to support the automated product purchasing system. Examples of this data can include geographic information, customer information, order information and other system-related information. As illustrated in the example architecture of FIG. 1, interactive transaction database 112 is a stand-alone database server. In an alternative embodiment, interactive transaction database 112 is a database resident in interface units 104.

Also included in the example architecture is an order fulfillment center. The order fulfillment center is the center that is actually responsible for filling the customer's order and sending the order to the customer. In one embodiment, the order fulfillment center is a third-party vendor contracted to maintain an inventory of products and to fulfill customer orders based on order information provided by the interactive transaction database 112. In another example, the order fulfillment center is an in-house order processing center responsible for filling customer orders. In yet another example, the order fulfillment center is an automated order fulfillment center comprising an automated order picker to automatically retrieve ordered products from inventory to fill customer orders.

Although customer 182 is illustrated in FIG. 1 as interfacing with the automated product purchasing system using a telephone, it should be noted that the customer interface can be implemented using any one or more of a number of different communications media, including telephone, data link, network, modem, et cetera.

2.1 High-Level Operational Scenarios

Before describing this example architecture 100 in greater detail, it is useful to provide a description of a few scenarios which illustrate the operation of the automated product purchasing system in the environment of this architecture. These scenarios are described in terms of an environment where the shopper accesses the automated product purchasing system using his or her telephone. In this environment, the user interface comprises the necessary interfaces to support a telephone connection. In this environment, an example of interface unit 104 is a voice response unit. Thus, in the following and subsequent discussions, interface unit 104 is referred to as "voice response unit 104." This is done for ease of description only and is not intended to limit the implementation of user interface 104 to a voice response unit.

Additionally, in this and subsequent embodiments described in terms of the telephone environment, the customer is referred to as a "caller" 182. This to, is done for ease of description only and is not intended to limit the use of the automated product purchasing system to customers accessing the system via other means such as network users, Internet browsers, and other user types.

2.1.1 Access and Browse Features

Figure 2:
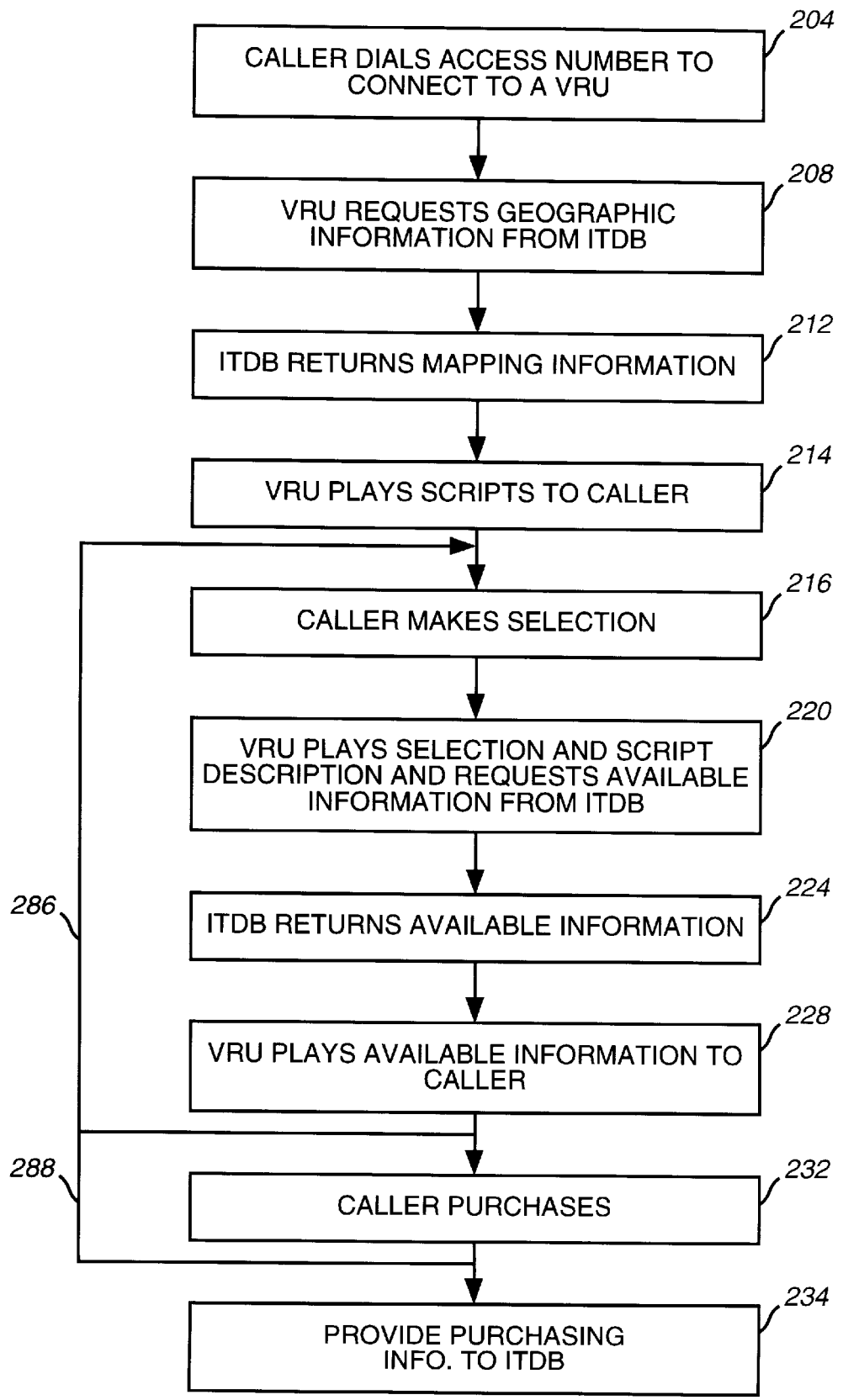
FIG. 2 is an operational flow diagram illustrating an example operational scenario for the architecture illustrating in FIG. 1 according to one embodiment of the invention.

FIG. 2 is an operational flow diagram illustrating in general the operation of the automated product purchasing system according to one embodiment of the invention. This description is provided in terms of a music ordering service that allows shoppers to access the service via telephone, browse music selections and order titles via an automated process, twenty-four hours a day. Because this embodiment is described in terms of a telephone purchase, the shopper is referred to as a caller 182.

Referring now to FIGS. 1 and 2, in a step 204, a caller 182 dials an access number to access the automated product purchasing system. For example, in one embodiment, caller 182 dials a toll-free 800 number to access the automated product purchasing system. In alternative embodiments, a local exchange carrier (LEC) may be used to route the call, a 900 number may be used, or other alternative exchanges could be established.

Upon placing the call, caller 182 is connected to a VRU 104 and VRU 104 captures the Automatic Number Identification (ANI) of the call. As described in greater detail below, in one embodiment caller interface 104 is comprised of a plurality of VRUs 104, each capable of handling multiple calls. The selection of which VRU 104 to use to handle a call can be based on a number of factors such as, origination of the call, load balancing and other factors commonly used in the art of call routing.

Once connected, in a step 208, VRU 104 requests information from interactive transaction database 112. Specifically, in one embodiment, VRU 104 requests geographic information (also called mapping information) from interactive transaction database 112. In one embodiment, the geographic information is determined based on the caller's ANI, or a portion thereof In this embodiment, VRU 104 sends the ANI to interactive transaction database 112. Interactive transaction database 112 uses the ANI, or a portion of the ANI (such as the area code of the originating number) and correlates this with a geographic area. In one embodiment, this is accomplished using a look-up table.

In one embodiment, the geographic area is comprised of a "radio metro area." The radio metro area indicates which participating radio stations, if any, are in the caller's listening area. The radio metro area is used by VRU 104 in determining which further scripts to play to caller 182 and also in determining which selections to provide to caller 182 during certain sampling scenarios. In a step 212, interactive transaction database 112 obtains geographic information and returns it to VRU 104.

The geographic information obtained in steps 208 and 212 can be used to determine particular services or selections offered to caller 182 based on the caller's geographic area. The features and operation of the automated product purchasing system is, in one embodiment, customized to offer different selections to different callers based at least in part on their geographic area. These steps can be bypassed where there is no requirement to offer customized services or sampling based on geographic area.

In a step 214, VRU 104 plays one or more scripts to caller 182. The scripts welcome caller 182 to the automated product purchasing system and prompt caller 182 to begin browsing. In one embodiment, this is accomplished by providing a scripted audio menu to caller 182 asking the caller to enter a keystroke on the telephone keypad to select from the menu choices.

In one embodiment, the menu scripts played to caller 182 at the beginning of the call prompt caller 182 to enter a membership number. If caller 182 does not have a membership number or if he or she simply wishes to browse without entering a membership number, caller 182 is prompted to enter a keystroke (such as the pound (#) key) to access the system without a membership number. In this embodiment, non-members are permitted to listen to music samples. Alternative embodiments may be implemented where access is denied to a caller 182 without a membership number, or access is provided on a more restricted basis, such as, for example, by limiting the number of selections that can be previewed or limiting the time permitted for the call.

As stated above, in step 214, the scripts played to caller 182 provide caller 182 with a menu allowing him or her to select from a number of choices. According to one embodiment, the first choice provided to caller 182 is the style of music for which he or she wishes to shop during that call. This style could be rock, jazz, pop, alternative, rap, etc. Upon selecting a style, the caller is further provided with the option to hear samples of titles from various categories in the selected style of music. The categories can include: featured artist for the local radio station, top hits from that station, the radio station play list for recently played songs, or to hear the top hits nationwide.

Once a selection is made, VRU 104 plays a script which provides caller 182 with a listing of the artists and titles available in the selected category. If caller 182 wants to hear a selection from one of the titles listed, caller 182 makes the selection in a step 216. When a selection is made, VRU 104 plays a sample of a track from that selection and may play a brief script describing the sample using text. This occurs in a step 220. In one embodiment, the caller can browse a sample from each album listed in a category or a sample from each track from a particular title.

Additionally, once the caller has selected a title to sample, VRU 104 requests product information for that title from interactive transaction database 112. Interactive transaction database 112 returns this title product information to VRU 104. This occurs in a step 224.

In one embodiment, interactive transaction database 112 also retrieves additional information relating to the selected title. For example, there may be a jacket for sale featuring the artist of the title. Interactive transaction database 112 returns this information as well so that VRU 104 can offer this item for sale to caller 182. In another example, there may be concert information available for the artist and there may also be tickets for that concert available for sale by the automated product purchasing system. Interactive transaction database 112 forwards this information to VRU 104, and VRU 104 provides this information to caller 182 and offers him or her the opportunity to purchase the tickets.

In a step 228, VRU 104 plays all or part of the title product information to caller 182 so that caller 182 can determine whether to purchase the title based on this title product information. The title product information can include, for example, cost, product availability, delivery information, etc. for the titles sampled. In one embodiment, the title product information is played to caller 182 after a title has been sampled.

In an embodiment where additional information is available (such as related products for sale, ticket and concert information, etc.), this additional information is played to caller 182 as well. In one embodiment, the additional information is stored in interactive transaction database 112 in the form of scripts. In this embodiment, interactive transaction database 112 simply passes the scripts along to VRU 104 and they are played to caller 182.

Flowline 286 illustrates that caller 182 may choose to listen to several samples and obtain title product information on these samples. If at any time during the process, caller 182 determines that he or she wishes to purchase a title sampled, caller 182 may do so by pressing the appropriate keypad key as indicated by step 232. After a purchase is made, caller 182 has the option of going back and listening to additional selections as illustrated by Flowline 288 or completing the transaction.

Note that at any time during the process the caller may complete the transaction, return to the main menu, or return to the previous menu (Step 214) and continue browsing.

In one embodiment, when the caller purchases a title, the information is provided to interactive transaction database 112, as illustrated by step 234. In this embodiment, interactive transaction database 112 keeps track of the titles ordered by caller 182. The order can be tracked using an order number. The order number can be based on the membership number, ANI, a sequential number list, a random number, etc.

During the operation described above, any of the titles selected by caller 182 in step 232 can be canceled from the caller's order. Alternatively, caller 182 may choose to finalize the purchase of the selected titles.

2.1.2 Completion of a Purchase

Figure 3:
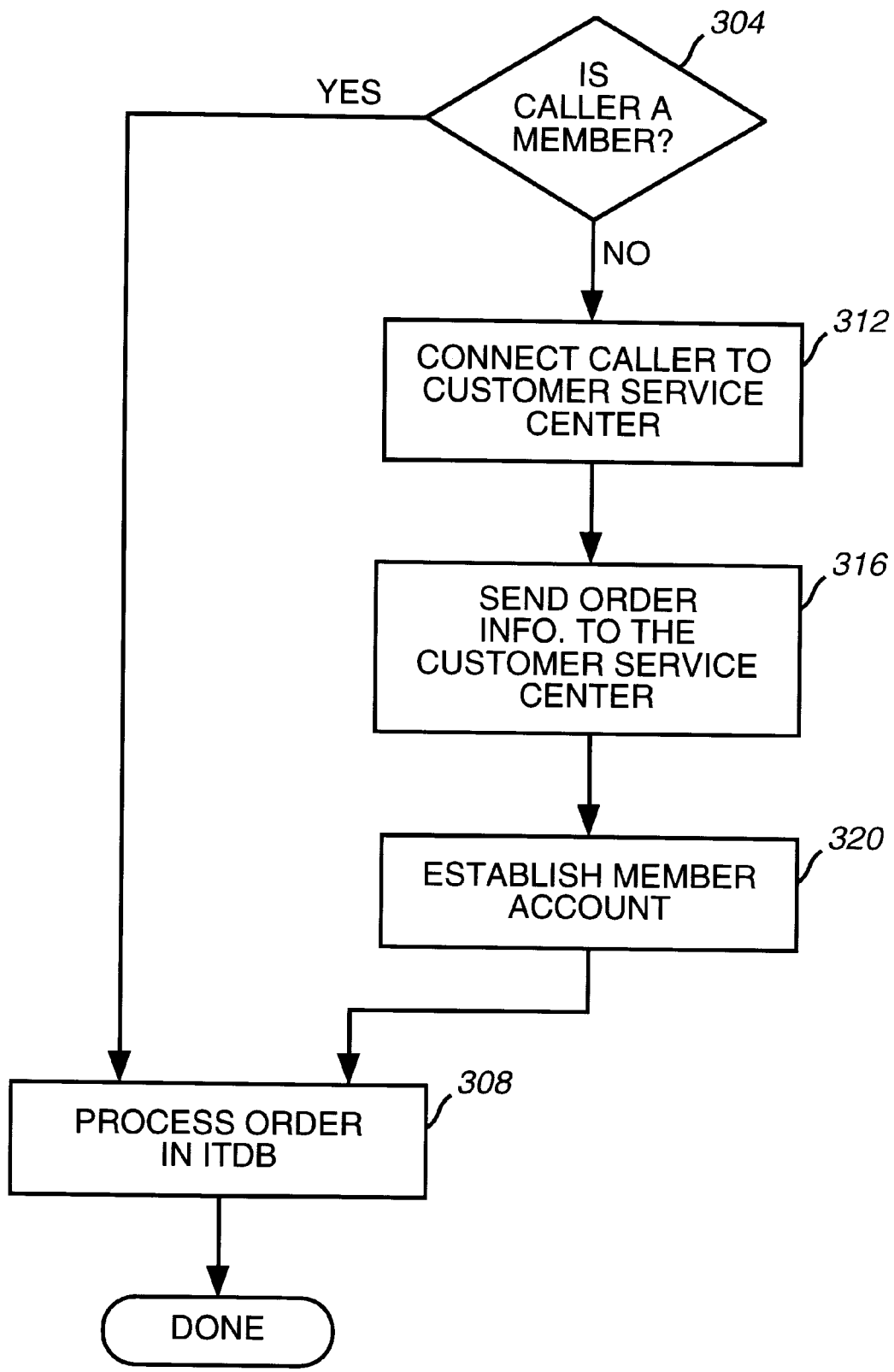
FIG. 3 is an operational flow diagram illustrating a high level scenario for the completion of a purchase according to one embodiment of the invention.

FIG. 3 is an operational flow diagram illustrating the process by which the purchase of the titles is completed according to one embodiment of the invention.

Referring now to FIG. 3, in a step 304, VRU 104 determines if caller 182 is a member. This determination can be made in a number of ways. For example, as stated above, when caller 182 first accesses the system, VRU 104 can prompt the caller for a membership identification in step 208. At this point, if caller 182 is a member, caller 182 enters his or her membership number. In an embodiment where PINs (personal identification numbers) are used, caller 182 is also prompted for his or her PIN.

In one embodiment, the browsing feature allowing callers 182 to listen to music samples is available to non-members as well as members. In this embodiment, it is not required that caller 182 enter a membership number in response to the request made in step 208. Thus, where caller 182 does not enter a membership number upon entry into the system, that caller 182 is again prompted for a membership number to complete the purchase transaction.

In yet another embodiment, VRU 104 does not prompt for a membership identification until the shopper determines that he or she wishes to purchase a product, or until he or she wishes to complete a purchase.

If a membership number is provided at some point during the process, the order processing continues at a step 308. In one embodiment, membership number is verified. Such verification can be performed, for example, by verifying the membership number against the entered PIN.

In a step 308, interactive transaction database 112 processes the order. In one embodiment, interactive transaction database 112 maintains a membership profile for caller 182. This membership profile is maintained in one embodiment based on the membership ID number. This membership profile can include information such as delivery preferences, music style preferences, shipping address, credit card information and other like customer information. Because all this information is maintained in the membership profile, interactive transaction database 112 can process the purchased items without the member having to speak with an operator. The processing is done automatically based on the selections made by caller 182 prior to the time that the order was finalized.

If, however, caller 182 is not a member, caller 182 is connected to customer service center 108. This occurs in a step 312. In step 312, VRU 104 transfers the caller's phone call to customer service center 108. This connects caller 182 to a customer representative in customer service center 108.

In a step 316, order information is sent to customer service center 108 as well. Preferably, this occurs at roughly the same time that the caller 182 is being transferred to customer service center 108. In this manner, the sales and service representative receives the caller's order information at the time the representative is connected to caller 182.

Once customer service center 108 has received the data transfer and is connected with caller 182, in a step 320, caller 182 works with the sales and service representative to establish a new account for caller 182, or to pay for the product without establishing an account. Once an account is established or the order paid for, the operation returns to step 308 where the order is processed in interactive transaction database 112. Once an account is established for a caller 182, the caller is issued a membership ID. In one embodiment, with the establishment of an account, caller 182 is sent a membership packet which can include, for example a product catalog.

The above description with reference to FIGS. 1, 2 and 3 is provided as an example of how architecture 100 allows a caller 182 to browse through the available titles, select samples to be played and purchase titles that he or she desires.

2.2 Example Architectures

Figure 4:
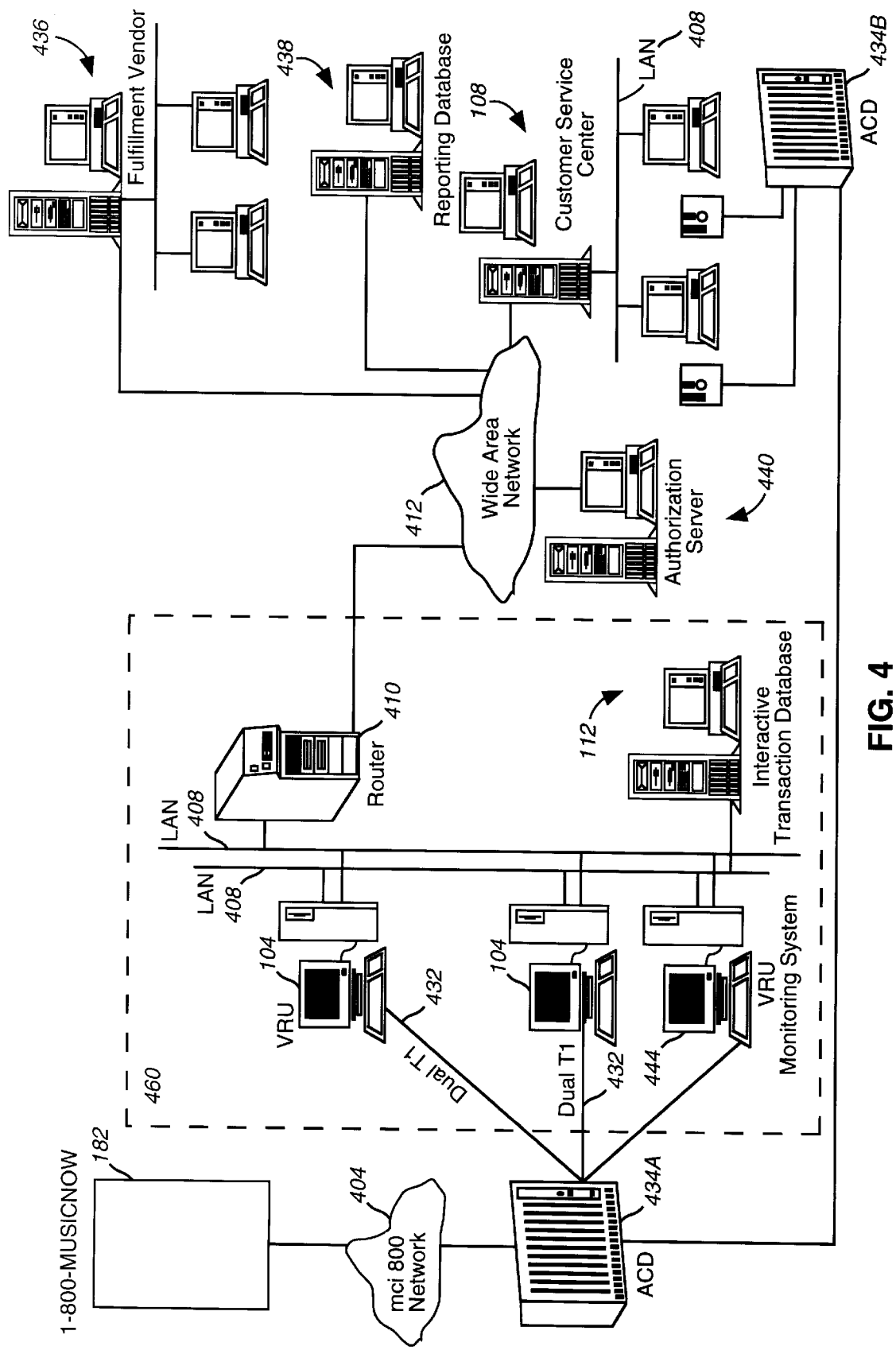
FIG. 4 is block diagram illustrating an example architecture of an automated product purchasing system for use in telephone environment according to one embodiment of the invention.

The architecture of automated product purchasing system 100 is now described in further detail. FIG. 4 is a block diagram illustrating an example architecture of automated product purchasing system 100 for use in the telephone environment. Referring now to FIG. 4, the architecture comprises the components illustrated in FIG. 1: interface units 104 (VRUs in the embodiment) interactive transaction database 112, and customer service center 108. In addition the architecture depicted in FIG. 4 further comprises an automatic call distributer (ACD) 434 a long distance network 404, a local area network 408, a wide area network (WAN) 412, and one or more routers 410.

Also depicted in FIG. 4 are authorization server 440, a reporting data base 438, and a fulfillment vendor 436.

A call made by caller 182 is routed to VRUs 104 via long-distance network 404. Illustrated in FIG. 4 as an example long-distance network 404 is an MCI 800 network 404. MCI 800 network allows caller 182 to enter a designated 800 number for the purchasing system and to have the call routed to an available VRU 104. In the architecture illustrated in FIG. 4, an automatic call distributor (ACD) 434 receives the incoming call and distributes it to an available VRU 104. In one embodiment, the interface between automatic call distributor 434 and VRUs 104 is via a T1 link 432.

2.2.1 Example Interface Unit Architecture

Figure 5:
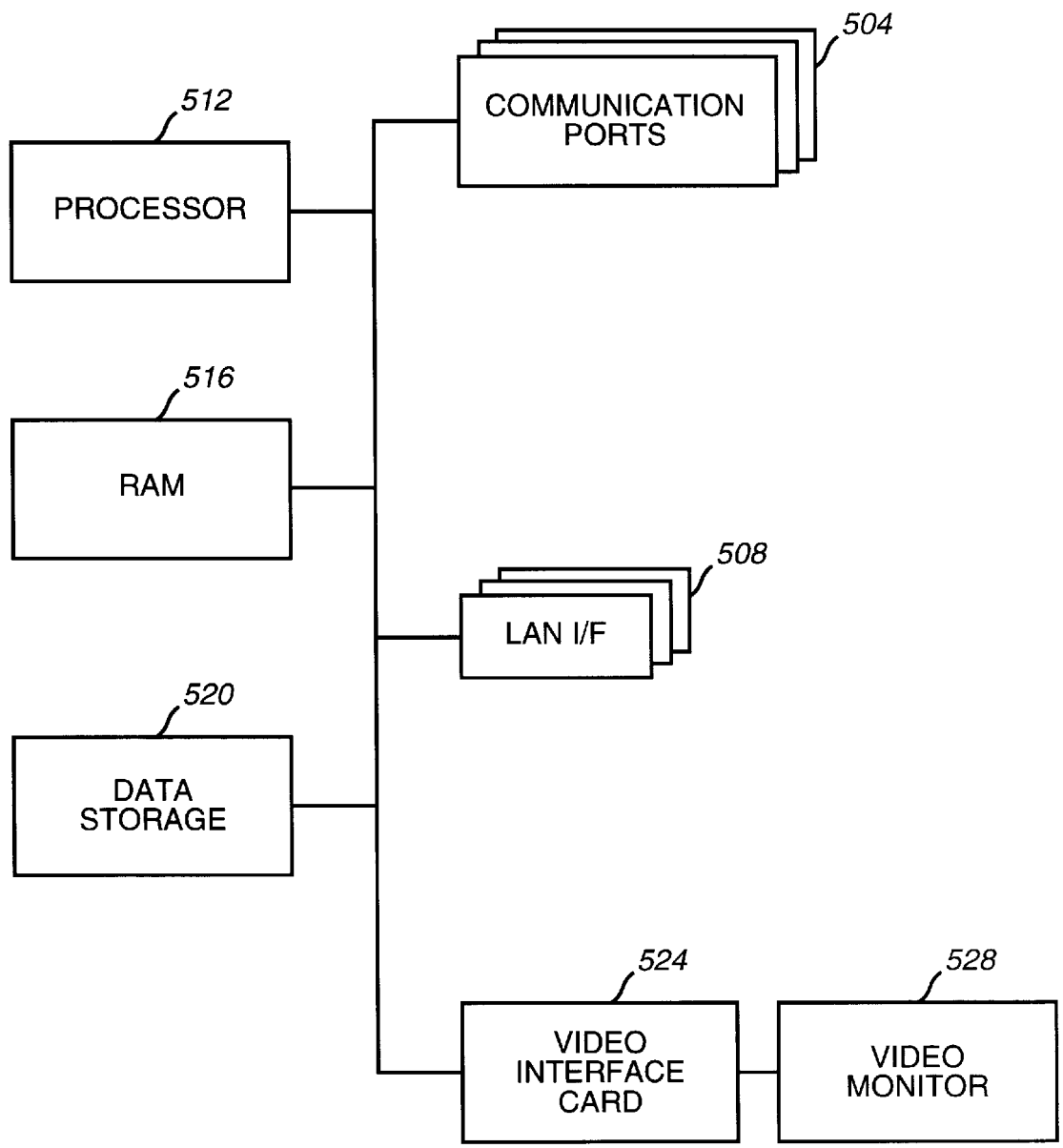
FIG. 5 is a block diagram illustrating an example architecture for an interface unit according to one embodiment of the invention.

FIG. 5 is a block diagram illustrating an example architecture for interface unit 104. Referring now to FIG. 5, this example architecture includes communication ports 504, a LAN interface 508, a processor 512, Random Access Memory (RAM) 516 and local data storage 520. Also included are a video interface card 524 and video monitor 528. Also included are an interface card and input devices, such as a keyboard, a mouse and other input devices.

Referring now to FIGS. 4 and 5, where interface unit 104 is capable of supporting a voice connection to the shopper, communications ports 404 are audio communications ports which, in one embodiment, comprise a T1 interface. In one embodiment, interface unit 104 is equipped with voice recognition and speech synthesis capabilities.

In one embodiment, interface unit 104 is implemented using a personal computer. In this embodiment, audio communication ports or audio interface cards can be inserted into available slots in the personal computer. Where the interface to the interface unit 104 is other than audio, an alternative interface can be provided, such as for example a modem interface or a network connection.

LAN interfaces 508 are used to interface the interface unit 104 to Local Area Network 408. Data storage 520 is local storage such as a hard disk used to store the VRU data as described below. Note that in the embodiment illustrated in FIG. 4, VRU 104 communicates with interactive transaction database 112 via local area network 408 using LAN interface 508. In an alternative architecture where interactive transaction database 112 is not a stand-alone database server as provided in the architecture illustrated in FIG. 4, interactive transaction database 112 can be accommodated internal to VRU 104 within data storage 520 or as additional data storage.

It will become apparent to a person skilled in the relevant art how interface units 104 can be implemented using other platforms, other technology, and other memory and storage devices. It is not essential that the interface units 104 be implemented as described above. However, this implementation provides an excellent platform for the interface unit functionality and provides highly fault-tolerant operation.

2.2.2 VRU's

In one embodiment of this example architecture, VRUs 104 (as interface units 104) are based on a personal computer platform. VRUs 104 can be implemented entirely using software or using a hardware/software combination installed in and/or running on the PC. In one embodiment, VRUs 104 utilize a Dialogic hardware and software product set to provide standard VRU functionality.

Further in this embodiment, the Dialogic voice processing technology is supplemented with the latest in PC technology to provide fully redundant VRU systems. Specifically, in this embodiment, VRUs 104 are configured with mirrored hard disks, uninterruptible power supplies (UPS) or hot-standby power supplies, and solid-state system monitoring boards to provide highly reliable VRU systems.

To achieve high performance requirements of a real-time interactive system, VRUs 104 utilize a multi-threaded operating system. Further, VRUs 104 can be provided with adequate RAM and disk caching to ensure that music selections are first cached to memory before being played to interested callers. The amount of RAM installed and the amount of cache space will vary depending on the application. In one embodiment, 16 megabytes of RAM and 16 megabytes of cache are used. This allows VRUs 104 to be responsive to caller 182 and to allow voice scripts and music samples to be played to caller 182 in a virtually seamless manner.

In one embodiment, each VRU 104 is implemented such that it can process forty-eight incoming calls simultaneously. Redundant VRUs 104 or additional capacity can be provided to ensure that calls can be handled in the event of a failure.

In the example architecture depicted, VRUs 104 are monitored by a VRU monitoring system 444. VRU monitoring system 444 monitors VRU hardware for system or component failures. In the event of such a failure, VRU monitoring system 444 generates an audible alarm and automatically disables the lines into the defective VRU 104. Thus, calls are routed around the defective VRU 104 by automatic call distributor 434. This rerouting is described in greater detail below.

2.2.3 VRU Sites

Figure 6:
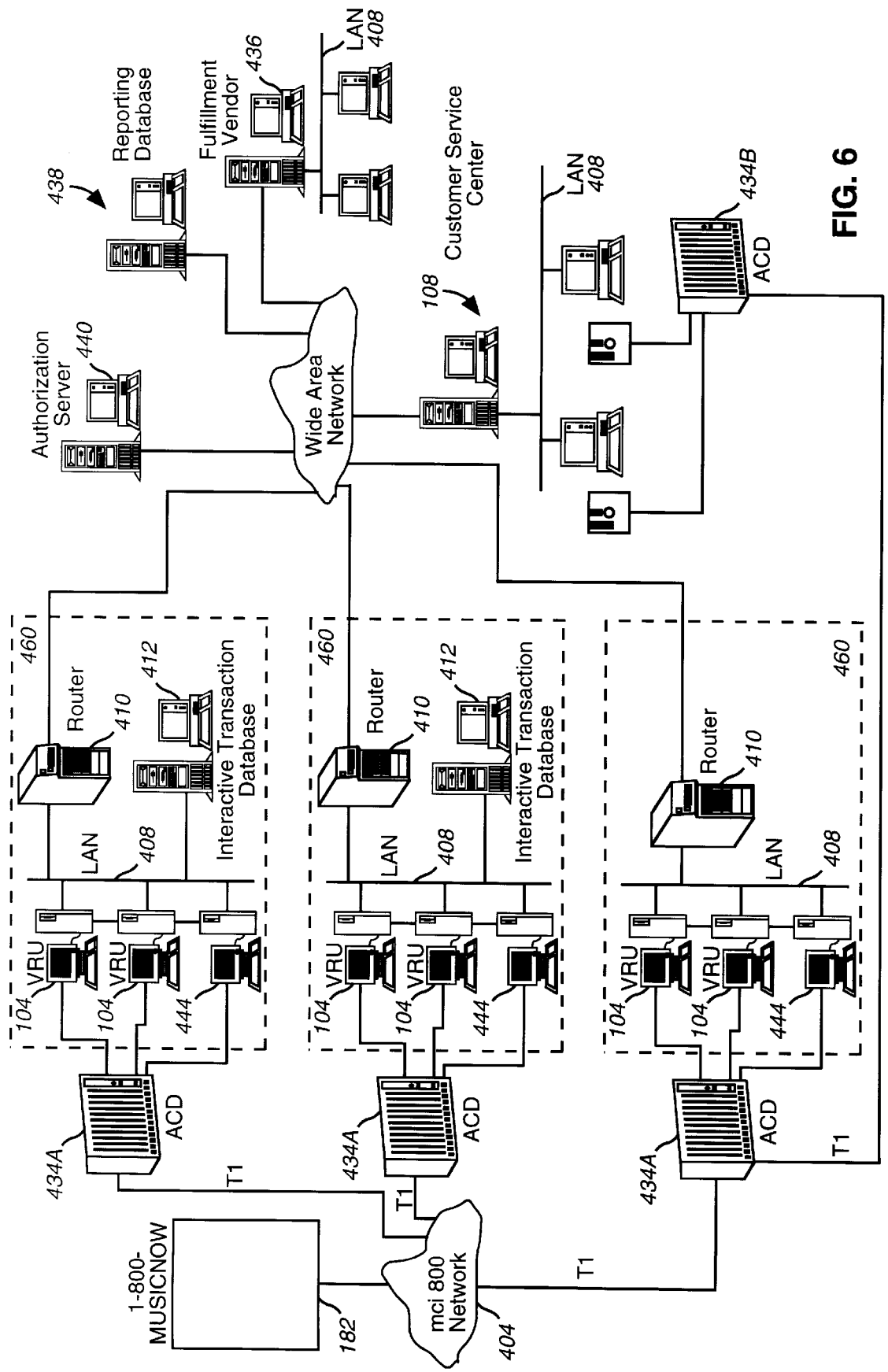
FIG. 6 is a block diagram illustrating an example of an expanded version of the architecture illustrated in FIG. 4 according to one embodiment of the invention.

A VRU site 460 is comprised of one or more VRUs 104, a router and interactive transaction database 112. The architecture depicted in FIG. 4 is depicted for a single VRU site 460. For purposes of redundancy, it may be desirable to have multiple sites 460 at the same location or in different locations. Where additional sites 460 are desired, the sites can be duplicated and connected between the network 404 and wide area network 412. This concept is illustrated in FIG. 6 which is discussed in further detail below.

Within a single site 460, redundant VRUs 104 and a redundant LAN 408 are used to ensure system reliability. Redundant LAN 408 utilizes independent routers 410 to connect to wide area network 412. In one embodiment LAN 408 is an Ethernet LAN.

The example architecture allows for updating VRUs 104 via local area network (LAN) 408. In this manner, an operator is not required to replace hard drives on individual VRUs 104. A down load from a server on the LAN 408 allows new music selections and voice application updates to be easily loaded onto VRU 104.

Note that where multiple sites are provided, the duplicate sites do not need a duplicate instance of interactive transaction database 112.

2.2.4 Additional VRU Embodiment

Because the automated product purchasing system is primarily described below in terms of an embodiment where the customer accesses the automated product purchasing system via a telephone network, the user interface is described in terms of a voice response unit 104. However, as described throughout this document, alternative communications media can be used to allow a customer to access the automated product purchasing system. Thus, a more generic description of VRU 104 is that it is a user interface to the automated product purchasing system. As such, it is not necessary that a voice response unit be implemented as the user interface to the automated product purchasing system. A more generic interface can be used without requiring traditional VRU functionalities. Such an interface can include a network file server or other processor-based systems having the appropriate interfaces to the appropriate communications medium.

2.2.5 Interactive Transaction Database

Interactive transaction database 112 in one embodiment is maintained on an RS/6000 transaction server. In one embodiment, the transaction server is configured as a high availability system with mirrored disk drives, multiple CPUs, and redundant power systems. In the preferred embodiment, an AIX operating system is run on IBM's High Availability software which consistently monitors all components in the system and automatically switches activity to backup components in the event of a component or system failure. Because the systems are fully redundant, in the event of a failure either system can support the application if the other one fails.

Although interactive transaction database 112 is described as being maintained on an RS/6000 platform, it will become apparent to a person skilled in the relevant art how to implement the functionality and features of interactive transaction data base 412 using alternative platforms with alternative hardware and peripherals. Additionally, redundancy is not required but is a highly desired feature of this system.

2.2.6 Automatic Call Distributor

In one embodiment, automatic call distributor 434 is a fully redundant dedicated system. It is provided with battery backup, disk mirroring technology, and dual processors to ensure constant switch availability. Incoming calls placed by a caller 182 are routed to VRUs 104 using automatic call distributor 434. In a preferred embodiment, automatic call distributor 434 distributes incoming calls evenly to the ports on VRUs 104 and provides overflow and re-routing capabilities to alternative VRUs 104 or to an alternative site 460 in the event of an overflow condition or system failure.

Calls received by callers 182 are routed via telephone network 404 to one of the available sites 160. In one embodiment, the routing is performed regardless of the actual location of sites 160 but is actually is based on the availability of sites. During periods where a single site 460 is saturated with incoming calls, the network 404 can provide load balancing to distribute calls to sites 460 with available capacity.

Depending on specific marketing requirements, in-bound call queuing can be implemented at sites 460 to allow callers to wait in turn for available ports. During the waiting time, callers can be reminded to have certain order information available using standard ACD messaging capabilities. Alternatively, or additionally, callers can be informed of certain specials or promotions in advance of their access into the service. This time can also be used to provide advertisements of products to the client. Thus, the automated product purchasing system could provide advertising or other information for it's own purposes or the available time could be sold to third parties to convey their messages to the shoppers.

For calls that are to be routed to customer service center 108, these calls are transferred by ACD 434 supporting the VRUs 104 transferring the call. In one embodiment, ACD 434 is configured with DS3 circuits connected to the switch of customer service center 108. In one embodiment, for calls being transferred, VRUs 104 transfer the call to customer service center 108 using a standard hook flash, transfer sequence. However, in one embodiment, VRU 104 will not complete the transfer until a sales and service representative actually answers the call. At that time, in one embodiment, VRU 104 uses WHISPER technology to silently inform the sales and service representative of the order number for the caller and then complete the transfer allowing the call center representative to handle the call.

Alternatively, computer telephony integration (CTI) technology can be used as described in more detail below. An advantage of CTI technology is that it allows the transfer to be completed to an ACD queue instead of waiting for an available sales and service representative, thereby improving the utilization of VRU ports.

ACDs 434 supporting sites 460 are interconnected to allow for transferring load balancing functionality. Transferring load balancing ensures that calls transferred by the CRU are transferred to sites that have available sales and service representatives.

ACDs 434 supporting sites 460 can provide a vast array of functionality. The actual functionality implemented depends on the functionality desired by the system architect. Presented now is a description of desired ACD functionality according one embodiment.

Note that in the architecture depicted in FIG. 4, there are two types of ACDs 434. ACD 434A is used to queue calls into VRU sites 460, while ACD 434B is used to queue calls to customer service center 108. As such, the prompting played to callers 182 during queuing may be very different. For example, while accessing a VRU site 460, caller 182 may be provided with announcements of a general or specific nature pertaining to the automated product purchasing service. On the other hand, while the caller 182 is being forwarded to customer service center 108, he or she may be provided with information pertinent to the customer service aspects of the service.

ACDs 434 provide ANI, and optionally Dialed Number Identification Service (DNIS), information via in-band T1 circuits. This information can be used by VRUs 104 to block particular calls. For example, where an ANI indicates that a caller is an abuser of the system (e.g., one who calls more than a predetermined number of times without purchasing), VRU 104 can decide to take specific actions such as provide a special message to the caller 182, hang-up, or forward caller 182 to customer service center 108. The in-bound ANI can also be used to determine radio station commissions and calling patterns for users. It will become apparent to a person skilled in the art how the in-bound ANI can be used for numerous features.

As stated above, ACDs 434 balance in-coming calls between VRU sites 460 to accommodate overflow and high traffic situations. If a particular site 460 is saturated, the ACD for that site 434 notifies network 404 of that situation. In this event, calls can be routed by network 404 to an alternative site with sufficient capacity to handle the call.

ACD 434 additionally provides the functionality to perform transfer load balancing between customer service centers 108. The ACDs 434 between these centers 108 are interconnected so that they can do a look-ahead to customer service center 108 to determine which center should get the call. Ideally, if agents are available at a particular customer service center 108, that center will get the call. However, where that center is saturated, the call may be transferred to an alternative customer service center having sufficient capacity.

In the event that all of the sites 460 are saturated and the caller 182 is asked to wait in a queue, ACD 434 informs the caller of how much time they can expect to wait in the queue before being serviced.

ACDs 434 are implemented as fully redundant systems to ensure system reliability. According to one embodiment, ACD 434 provides 120 T1 circuits per site 460 and a DS3 to customer service center 108. Of course, this number can be scaled depending on the application and projected usage.

2.2.7 Customer Service Center

Customer service center 108 is also preferably implemented on a PC platform. In one embodiment, customer service center 108 is also implemented using an RS/6000 transaction server. Call center representatives can access interactive transaction database 112 via wide area network 412. If a caller 182 needs to be transferred to an open (live) agent, they are transferred to customer service center 108. When such a transfer occurs, VRU 104 instructs automatic call distributor 434 to transfer the call to customer service center 108. This can be accomplished by re-routing the call via ACD 434A and ACD 434B as illustrated in FIG. 4.

When information about a caller's order needs to be transferred to customer service center 108 along with the phone call, this information is provided by site 460. In one embodiment, WHISPERCOM technology is used to transfer an order between VRU 104 and customer service center 108. In an alternative embodiment, computer telephony integration (CTI) technology is used to coordinate data with the transferred call so that the appropriate data is transferred from interactive transaction database 112 to customer service center 108.

In this CTI embodiment, the information "pops up" on the screen of the customer service representative when the call is delivered to customer service center 108. CTI technology can include features such as pop-up screen displays and screen prompts that provide pertinent information to the sales and service representative. Such pertinent information can include information about the caller and the status of his or her order as well as information pertaining to the offered products and their price, availability and delivery information.

The customer service center 108 described in this Section is staffed with sales and service representatives to handle customer calls. In an alternative embodiment, an automated or partially automated customer service center 108 handles customer service calls without need for human intervention. In such an embodiment, a caller 182 is prompted to enter membership information using the telephone keypad to spell out his or her name, address, credit card information, etc. In the event of an error in entry, the call can be transferred to a sales and service representative (at the same or other location) to resolve the error.

For embodiments using Internet or other data access, the establishment of a membership account can be done in a wholly automated fashion without need for a representative to speak to customer 182. Al of the pertinent information can be provided via the data connection (via Internet or other data connection) and downloaded into interactive transaction database 112.

2.3 Expanded Example Architecture

FIG. 6 is a block diagram illustrating an expanded version of the architecture illustrated in FIG. 4. Additional components illustrated in FIG. 6 are an authorization server 440, a reporting data base 438, and a fulfillment vendor 436. Authorization server 440 performs authorization and/or validation of purchase information. For example, authorization server 440 can perform credit card authorization to verify that the purchaser's credit is valid.

2.3.1 Reporting Database

Reporting database 438 maintains transaction information relating to usage of the service. Although reporting database 438 could be implemented using any of a variety of computer platforms (e.g., Windows™, Unix™, etc.), in one embodiment reporting database 438 is based on the RS/6000 transaction server platform to maintain commonality of platforms. Transaction information maintained on reporting database 438 can be downloaded periodically for reporting purposes to interactive transaction databases 112.

Data stored in reporting database 438 can be used to generate reports to track usage and to assist marketing and other personnel in operational and performance decisions. All available information can be maintained in a reporting database and can include information such as browsing and purchasing statistics for a particular caller (based on ANI or membership ID), browsing and purchasing statistics by region, statistics by music style, etc. The various reports that can be generated are limited only by the amount and types of data that the system architects choose to maintain in reporting database 438. Note that these statistics and other information can be maintained on interactive transaction database 112, thus obviating the need for reporting database 438.

2.3.2 Fulfillment Vendor

As described above with reference to FIG. 1, an order fulfillment center is provided in one embodiment to fill the customer order. One example of an order fulfillment center is fulfilment vendor 436, which, according to the example architecture is separated from the rest of the automated product purchasing system via wide area network 412. When an order is completed by a customer it is sent to fulfillment vendor 436 for fulfillment of the order. Fulfillment vendor 436 receives the order via wide area network 412 and processes and ships the order. Fulfillment vendor 436 can be an actual part of the automated product purchasing system, or alternatively, fulfillment vendor 436 can be an independent service contracted to perform order fulfillment-related services such as warehousing, inventory control and shipping functions. In one embodiment, fulfillment vendor 436 is an independent contractor.

Inventory updates to reflect new stock received and orders shipped are provided to interactive transaction database 112 via wide area network 412. In this manner, local instances of inventory information can be maintained within interactive transaction database 112, without the need for VRU site 460 to retrieve data from across the WAN 412 each time availability information is needed. As a result, when a caller 182 chooses to sample a particular title, interactive transaction database 112 can provide VRU 104 with availability information without the need to query fulfillment vendor 436 for each call. The inventory updates can be performed periodically (e.g., daily, weekly, hourly, etc.) depending on the system requirements.

2.3.3 WAN Example Architecture

This section describes an example architecture for wide area network 412 and a few example operational scenarios to aid in understanding this architecture.

2.3.3.1 Example Architecture

Figure 7:
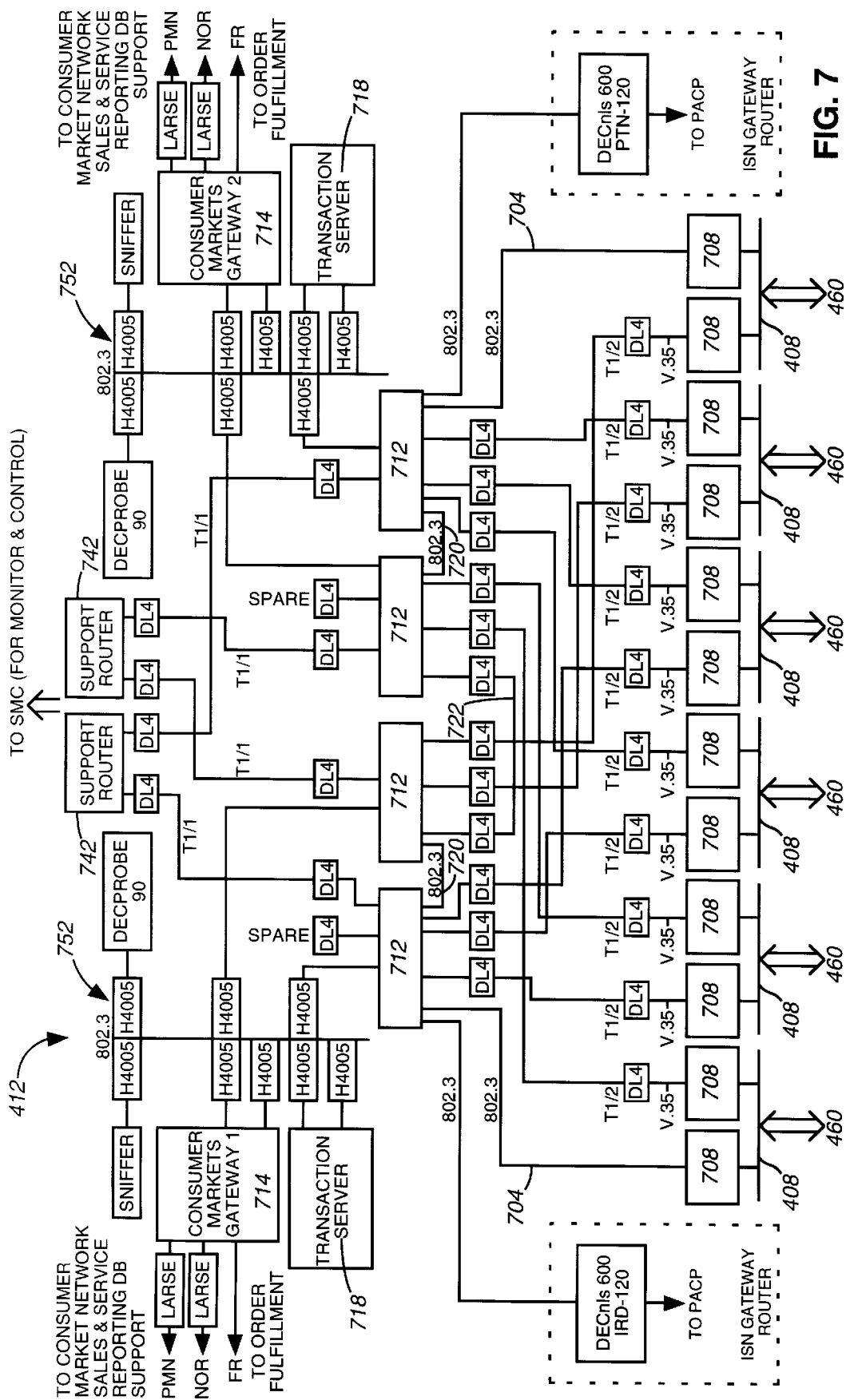
FIG. 7 is a block diagram illustrating an example of implementation of a wide area network such as can be used in the architecture illustrated in FIG. 6 according to one embodiment of the invention.

Although numerous wide area network topologies and architectures can be used to implement wide area network 412, the mesh and star topologies are considered to be the most desirable. In one embodiment, a modified version of the star topology with a central data interchange hub is implemented for a wide area network 412. FIG. 7 is a block diagram illustrating an example architecture for wide area network 412. The architecture illustrated in FIG. 7 is a modified star topology providing a robust configuration and future expandability. This topology permits modifications, including addition, deletion and relocation of components without a need for traditional flash-cut scenarios. In addition, a future bandwidth expansion is easily facilitated and will not affect operational integrity during expansion activities.

Advantages of using a modified star topology over the mesh topology include simplified administration and monitoring, pre-identified distant ends, minimal router hopping, and easier future growth management.

In one embodiment, use is made of the integrated services network (ISN) production access control point (PACP), backbone and PACP gateway routers to facilitate software uploads and other administrative and maintenance functions. In an embodiment where WAN 412 is implemented in an existing ISN network, this may necessitate the addition of LAN cards to the existing ISN PACP routers.

As stated above, in one embodiment wide area network 412 can be implemented as an expansion of an existing ISN communications network. In this embodiment, it may be desirable to collocate VRU sites 460 with existing ISN ACD sites. For example, in the embodiment illustrated in FIG. 7, there are six VRU sites 460. These sites may be chosen to be collocated with existing ISN ACD sites.

WAN 412 architecture depicted in FIG. 7 is comprised of site routers 708, hub routers 712, local area networks 712 and various interconnects. LAN rails 704 are attached to two end-node routers 708 using two direct Ethernet connections. In one embodiment, LAN rails are implemented using an Ethernet 802.3 standard. This configuration enables an increase in the traffic capacity between routers 708 and hub routers 712 by a factor 2T1 up to eleven times—8T1 for future expansion. The installation and implementation of additional T1 capacity can be accomplished on line without affecting network operation.

For routers 708, a single V.35 link connects to dual diverse Ti circuits (designated by reference numeral T1/2) via a multiplexer DL4. In one embodiment, multiplexer DL4 is a DigiLink DL3804 diverse mux. This connection establishes a primary data path between routers 708 and the respective hub routers 712.

In the architecture illustrated in FIG. 7, two wide area network routers 708 are connected directly to their respective hub routers 712 via an Ethernet connection as they are collocated. The use of dual diverse data paths for each interconnect and a fully redundant configuration duplicated the primary data path ensures redundancy.

Dual T1 connections T1/2 are provided in each pair of muxes DL4 in the event of a T1 failure. The failover is accomplished using muxes DL4 and is not propagated to routers 708, 712. As a result, data transmission can continue uninterrupted in the event of a T1 failure. Note, however, that the bandwidth will be decreased by one-and-a-half megabytes for a T1 outage, but the data path integrity is maintained.

In one embodiment, routers 708 and hub routers 712 are implemented using DECnis 600 routers available from the Digital Equipment Corporation. The local area networks at VRU sites 460 communicate with servers across wide area network 412 via two pairs of hub routers 712. Thus, in this embodiment, WAN router 410 illustrated in FIGS. 4 and 6 is implemented, in FIG. 7, using a pair of routers 708. Primary advantages of this configuration are central fire walling of VRU site 460 networks, centralized access to transaction servers on a wide area network 412, and a provision for centralized access to VRU site 460 networks by customer service center 108. Additionally, the network is easily expandable or modified without necessitating flash cuts.

Note that hub routers 712 are provided in two pairs of two routers. Each pair of hub routers 712 is connected to each other by a network connection 720. This connection 720 is an Ethernet 802.3 connection in one embodiment.

Each pair of hub routers 712 is co-located with a pair of LAN routers 708 at a VRU site location 460. The pair of hub routers 712 at the first site are connected to the pair of hub routers 712 at the second site using a T1 connection designated as 722. This provides for full redundant data paths in the event of a hub router 712 failure, a router failure 708, or a data link failure.

Expansion of this architecture is attainable by adding high speed WAN circuit cards to hub routers 712 and by adding additional hub routers 712.

Note that a dual router configuration is implemented for both WAN routers 708 and hub routers 712. These are implemented as a primary and a backup data path. The functioning of the primary and backup data paths are rotated on a timely basis in order to exercise the backup data paths to verify functional integrity. The band width showing across the data paths is optional.

Gateway routers 714 are used to provide connectivity to other entities such as authorization server 440 and fulfillment vendor 436. In one embodiment, gateway routers 714 are CISCO gateway routers. Gateway routers 714 are also used to connect customer service center 108 to wide area network 412.

Hub routers 712, gateway routers 714, and transaction servers 718 are interconnected using a pair of network backbones 752. In one embodiment, network backbones 752 are implemented using an Ethernet 802.3 backbone. Note that this is expandable to a fibre distributed data interconnect (FDDI) backbone. This expandability provides for exceptional future router-to-gateway-to-server data communications.

Support routers 742 are provided as an interface to monitor and control. Support routers 742 are connected to hub routers 712 by T1 connections and multiplexers DL4. In one embodiment, these are not dual T1 connections.

The above-provided wide area network example architecture was described to illustrate an example architecture that can be used to implement wide area network 412. After reading the above description, it will become apparent to a person skilled in the relevant art how to implement wide area network 412 using alternative architectures with alternative topologies, hardware, software, and interconnections. The key functionality of automated product purchasing system is not dependent on a particular WAN architecture, but can be implemented using an WAN architecture that provides adequate band width and reliability.

Support organizations tasked with network traffic monitoring fault detection and isolation access the network via attachment to the PACP gateway and hub routers. This provides comprehensive network management.

2.3.3.2 WAN Scenarios

Figure 8:
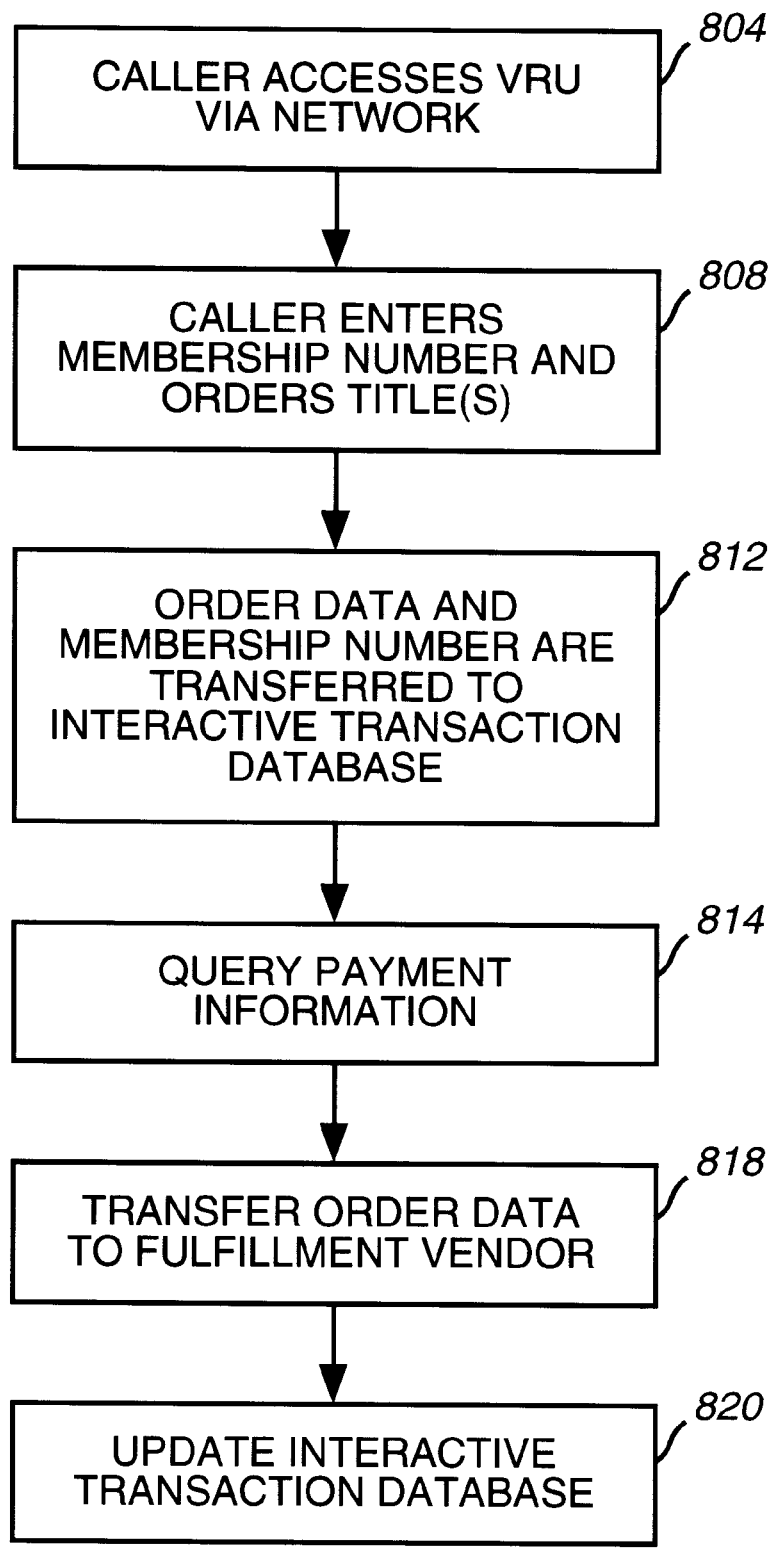
FIG. 8 is an operational flow diagram illustrating an example process by which a customer orders a product and that product information is transferred across a wide area network according to one embodiment of the invention.

The wide area network architecture depicted in FIG. 7 and described with reference thereto is now described in terms of an operational scenario in which a caller 182 orders a product. FIG. 8 is an operational flow diagram illustrating the process by which caller orders a product and that data is transferred across wide area network architecture as illustrated in FIG. 7.

Referring now to FIGS. 4,6 and 8, in a step 804, caller 182 accesses VRU 104 via network 404. As illustrated by the example architecture in FIG. 6, this connection is accomplished via ACD 434 to a VRU audio channel.

In a step 808 caller 182 enters his or her membership identification number and orders one or more titles.

In a step 812, order data identifying the caller's selections and the caller's membership number are transferred to interactive transaction database 112. In one embodiment as illustrated in FIG. 4, interactive transaction database 112 is collocated with VRU 104 at VRU site 460. According to one alternative embodiment, interactive transaction database 112 can be implemented using a transaction server such as transaction server 718. In this embodiment, access to interactive transaction database 112 is accomplished by routing the information from router 708 across T1 connection T1/2 through hub router 712 and across local area network 712 to transaction server 718.

In a step 814, the automated product purchasing system makes the appropriate payment query to verify the caller's payment information. In this step, interactive transaction database 112 makes the query via gateway routers 714 to the appropriate credit approval service, such as authorization server 440. Authorization server 440 can be a credit card authorization service, a debit card service, a traditional ATM type of debit service, or other payment service. The appropriate approval or denial is returned to interactive transaction database 112 via the same path.

In a step 818, once the payment information has been verified, the order can be transferred to the fulfillment vendor 436 to fulfill the order. Where a fulfillment vendor 436 is an external vendor, transaction server 112 transfers the order data via gateway router 714 to fulfillment vendor 436.

In a step 820, interactive transaction database 112 is updated at the time of order fulfillment. This update is provided by fulfillment vendor 436 to interactive transaction database 112 via gateway router 714.

3.0 Data Types and Data Files

In order to enable automated product purchasing system to respond to browse and order queries, certain information can be maintained at VRU 104 and at interactive transaction database 112. The organization of data types according to one embodiment of the invention is illustrated in FIGS. 9 and 12. The data structure described herein is provided as one embodiment only. It will become apparent to a person skilled in the relevant art how to implement VRU 104 and interactive transaction database 112 using alternative data structures.

3.1 Interface Unit Data Types

FIG. 9 illustrates example data types used to implement user interface 104 according to one embodiment of the invention.

Generic system scripts are stored in VRU 104. Generic system scripts are the scripts used to walk caller 182 through the menu selections, so the caller 182 can browse the selections. Generally, generic system scripts do not change with changes in the titles and styles offered by the automated product purchasing system. For example, the generic system scripts may be the scripts that welcome caller 182 to the automated product purchasing system, that prompt caller 182 for membership information, that prompt caller 182 in completing an order, ordering a title, or deleting an order title from an existing order. Generic system scripts are stored in a data file or database on VRU 104, called up, and played to caller 182 at the appropriate time.

Additional scripts stored at VRU 104 are called environment scripts. These scripts are scripts that are more likely to change on a regular basis. Examples of environment scripts include scripts provided by a local radio station disk jockey (or DJ) describing such selections as the featured artist, radio play list, and radio station top hits. Environment scripts also can include scripts announcing promotional items, scripts announcing top hits nation-wide, scripts announcing featured artists nation-wide, and so on. As these examples illustrate, environment scripts, in contrast to generic scripts, are likely to change on a regular and periodic basis to reflect current offerings of the automated product purchasing system. Like generic scripts, environment scripts are accessed by VRU 104 and played to caller 182 at the appropriate time.

Also stored at VRU 104 are the music samples. Music samples are portions of titles offered for sale by automated product purchasing system. Music samples are typically brief highlights of the tracks on the titles offered by the automated product purchasing system. In one embodiment, each music sample is a file of digital data representing a music sample. In this embodiment, there is one file for each sample from each title.

According to one embodiment, music samples can be described as comprising two categories: browsers and teasers. A browser is a string of separate samples of songs from a single album. A teaser is a sample of a single song from one album. For example, where a top-five list is compiled for caller 182 to sample, the caller 182 is played a series of teasers: one sample from each of the five tracks that make up that top-five list. Caller 182 may decide that he or she likes a particular track on the last teaser and hear samples from other songs on that album, or "browse" the album.

Also included at VRU 104 are catalog lists. Catalog lists are a complete listing of each title available through automated product purchasing system. An example format for catalog lists is illustrated in FIG. 10. The example illustrated in FIG. 10 provides an example data structure 1000 for the catalog lists. This example data structure includes an artist identification 1004, a catalog identification 1008, an artist's name 1012, and a title 1014. Artist identification 1004 is an identification of a particular artist. In this embodiment, each artist has a unique artist identifier. For the example illustrated in FIG. 10, artist identifier 1004 is 10060, identifying "10,000 Maniacs" as the artist. Identifier 1004 corresponds to the DTMF signals input by the user to spell out the artists name.

Catalog ID 1008 identifies each title available. In one embodiment, catalog ID 1008 comprises artist ID 1004 plus an appended string indicating one of one or more titles available by the given artist. For example, in data file 1000, the first title available by the artist 10,000 Maniacs is "The Wishing Chair," which has a unique catalog ID, 10060001. This catalog ID uniquely identifies "The Wishing Chair" from the other 10,000 Maniacs titles.

In one embodiment, music samples are stored with identifiers based on the catalog ID number 1008. For example, a browser providing a sampling of the songs on the title "The Wishing Chair" in this embodiment is given a filename, 10060001.vox. Thus, when VRU 104 plays a browser for a selection having a given catalog ID number 1008, VRU 104 simply retrieves the filename [catalogid].vox. This simplifies data retrieval within VRU 104.

Similarly, a script providing a description of the title played can also be stored in a filename based on the catalog ID number. For example, this might be stored in a file named [catalogid].scr. Still further, additional scripts or sound bites that need to be played after a user selects a particular title and that are customized for a particular title can similarly be named with a filename based on catalog ID number for that title and a given extension (the extension being the portion of the filename after the dot). In this manner, once caller 182 has selected a title, all VRU 104 simply has to do is look up the catalog ID number 1008 for that title, and then retrieve various files stored under that catalog ID number.

Additional information can be included in this list data structure depending on a system architect's preferences. For example, the list data structure can include a uniform product code (UPC) for each title, a release date for each title, and other potentially pertinent information. Additionally, it will become apparent to a person skilled in the relevant art how different list structures can be adopted to identify the titles available within automated product purchasing system and to allow samples and scripts to be retrieved and played to a caller 182. It is not necessary that the particular data structure illustrated in FIG. 10 and described herein be implemented.

The final VRU data type included in this embodiment is a listing of the top hits. There can be several top-hits lists stored in VRU 104. For example, there may be a top-hits list for each style in each separate geographic area, and there may be a top hits list for nationwide hits. In its simplest embodiment, illustrated in FIG. 11, top hits list 1100 is simply a listing of the catalog ID numbers 1008 that describe the titles that make up that top-hits list. In this embodiment, when a caller 182 selects the top-hits list to listen from, each of the relevant files identified by the catalog ID numbers 1008 in that list are retrieved by VRU 104 and played to caller 182.

In addition to a top-hits list, featured artist lists, radio play station lists, and promotional offerings lists can be maintained in a similar fashion. The top hits list described in this embodiment is structured to operate well with the data structure illustrated in FIG. 10. It will become apparent to a person skilled in the relevant art how other list structures can be utilized to implement the described listing functionality. It is not required that a top hits list data structure 1100, as illustrated in FIG. 11, be implemented with the automated product purchasing system.

3.2 Interactive Transaction Database 112 Data Types

Interactive transaction database data types are listed in FIG. 12 according to one embodiment of the invention. These data types include mapping information, customer information, order information, commission information, tax calculation data, credit calculation data, and profiling/cost statistics information.

Mapping information is used to provide information relating to geographic features of the automated product purchasing system. As described above, one feature of the automated product purchasing system is that it allows caller 182 to browse selections such as the featured artists, the top-hits list, and radio play lists for a particular radio station in the caller's geographic area. Determination of the caller's geographic area is made using mapping information stored in interactive transaction database 112.

In one embodiment, the mapping information used is based on a radio metro area. The radio metro area is an area defined by the Arbitron Radio Service to define a particular radio area. This mapping information is not only used to tailor the caller's browsing to his or her geographic area, but can also be used to track album sales to a particular area, and to compile user preferences and other statistics based on the mapping area.

Customer information in the interactive transaction database 112 is referred to in this document by the moniker "membership profile." Customer information stored in a membership profile can include information pertaining to a particular customer's shipping information, billing information, music preferences and other relevant customer information. The membership profile is maintained in interactive transaction database 112, and is not generally required to be accessed by VRU 104.

In one embodiment, customer information is initially provided by caller 182 to a sales and services representative in customer service center 108. This information is downloaded from customer service center 108 to interactive transaction database 112. When a caller 182 completes an order, interactive transaction database 112 uses information in the membership profile to verify or validate the payment information, and sends the order along with delivery information obtained from the membership profile to the fulfillment vendor 436. Thus, it is not necessary in this embodiment that VRU 104 access the membership profile. Caller 182 can request changes to his or her profile via the sales and service representative at customer service center 108.

An alternative embodiment is envisioned wherein a caller 182 can enter membership profile information via the telephone keypad without having to speak with a sales and services representative in customer service center 108. In this embodiment, caller 182 will be provided with scripted menus prompting him or her to enter the necessary information.

Numeric information is a straightforward entry process. Introduction of letters, however, would require a scheme to identify which of the three letters a keypad key is used to designate. For example, the "2" key can be pressed once to designate the number two, twice to designate the letter A, three times to designate the letter B, and four times to designate the letter C. A separation between letters can be provided with, for example, the star (*) key, while spaces can be provided with, for example, the pound (#) key. Thus, a caller 182 can set up an account (i.e., can become a "member") without ever having to speak to a sales and services representative.

Interactive transaction database 112 also maintains order information. Order information is simply a list of all the titles ordered by the caller 182. Order information preferably also includes an identification of the caller 182 such as the caller's ANI or the caller's membership number. Each time caller 182 indicates that he or she wishes to purchase a title, the catalog ID number for that title is appended to that caller's order information. If caller 182 later decides that he or she does not wish to purchase that title, that catalog ID number 1008 can be deleted from the order information list. Once the order is completed, the order information list can be sent to fulfillment vendor 436 to fill the order.

In one embodiment, the order information maintained in interactive transaction database 112 embodies a "virtual shopping cart" where titles being purchased by caller 182 are kept until he or she is done shopping and finalizes the purchase by "checking out."

3.3 Commissions Information

Commissions information is information used to identify commissions that may be paid to a radio station or another third party in conjunction with sale of a title. For example, in one embodiment, when a caller 182 places a call to the automated product purchasing system, enters a music style, and purchases a title, the radio station associated with that music style in the caller's geographic area (as determined by the mapping information) can be designated to receive a commission from the completed sale. The commissions information included in interactive transaction database 112 may include information such as the radio stations participating in the commissions program and the commission that they receive, be it a flat rate or a percentage of the sale.

Commissions can be automatically calculated by interactive transaction database and used to trigger payment of a commission to the appropriate third party. For example, each time the sale of a title results in a commission to a particular third party, that commission can be calculated and stored as commissions information in interactive transaction database 112. Additional commissions can be added to that commission information for that particular third party. At periodic intervals, the information can be downloaded to or retrieved by the appropriate entity responsible for determining those commissions. Thus, commissions can be automatically calculated and maintained on a cumulative basis for each third party.

3.4 Tax Computation

Interactive transaction database 112 also maintains tax calculation information. The tax calculation information allows the appropriate sales tax to be computed for each sale of a title. An on-line sales tax server calculates sales tax for any location in the United States. Sales tax rates vary across the United States, as do the way sales tax is calculated and the types of items that are taxed. Sales tax typically is based on the ship-from and ship-to locations. The ship-from location is the place from which an order is shipped, for example, the location of a fulfillment vendor 436. The ship-to location is the location to which the order is shipped, such as the customer's shipping address. Sales tax typically uses the ship-to location for determining the tax rate. In some instances, the ship-from location is also used. Information pertaining to both the ship-from and ship-to location, as well as the tax rates, are included in the tax calculation information. Additionally, it is important to note that some jurisdictions charge sales tax on shipping and handling charges, while others do not. Therefore, this information is also included in tax calculation information.

Tax calculation information also includes a tax register record. The tax register record contains all information needed to report sales tax charges for payments to the various states. A tax register record is returned from each call to the tax function. Because sales tax is only paid to the states after a product is shipped, tax calculation information may have to refer to completed order information provided by fulfillment vendor 436.

Periodically, sales tax reports are generated listing sales taxes that are due to each jurisdiction from orders that have been shipped during the reporting time. These reports are generated based on the information maintained in the tax calculation information.

3.5 Profiling and Statistics

Profiling information and cost statistics are also maintained by interactive transaction database 112. Profiling information can include profiles on individual callers 182 and profiles on callers in general, callers in particular music categories, or callers from a particular geographic area, and so on. Profiles can include statistical information such as preferred music styles, quantity and frequency of browses, quantity and frequency of purchases, types of purchases, responses to promotional offerings, whether purchases are from the Music Mall or from other categories such as top-hits list, featured artist, play list, etc. This profiling and statistical information can be used to enhance the system functionality, and can be used by marketing professionals to improve the marketability of the products offered by the automated product purchasing system.

3.6 Data Structure Summary

Described above with reference to FIGS. 9 and 12 was a particular data structure according to one embodiment of the automated product purchasing system. It will become apparent to a person skilled in the relevant art how alternative data structures can be implemented. For example, it is not necessary that tax calculation information be maintained by interactive transaction database 112. In this example, tax calculation information can be maintained, and the taxes computed, by an external tax server which maintains the tax calculation information and performs the tax calculation. This is only one example of how the listed data structure can be altered.

4.0 Automated Product Purchasing System Operation

A feature of automated product purchasing system is that it allows callers 182 to purchase products such as music titles via telephone without the need to speak with a live sales representative. This service can be made available to customers 24 hours a day, seven days a week. In one embodiment, automated product purchasing system is a scripted-menu-based system where a caller 182 is prompted through the operations of perusing various titles, listening to sample cuts from one or more of those titles and ordering titles he or she is interested in. The prompts are provided through the use of scripted menus played by VRU 104.

4.1 Introduction to Menu-Driven Shopping

Figure 13:
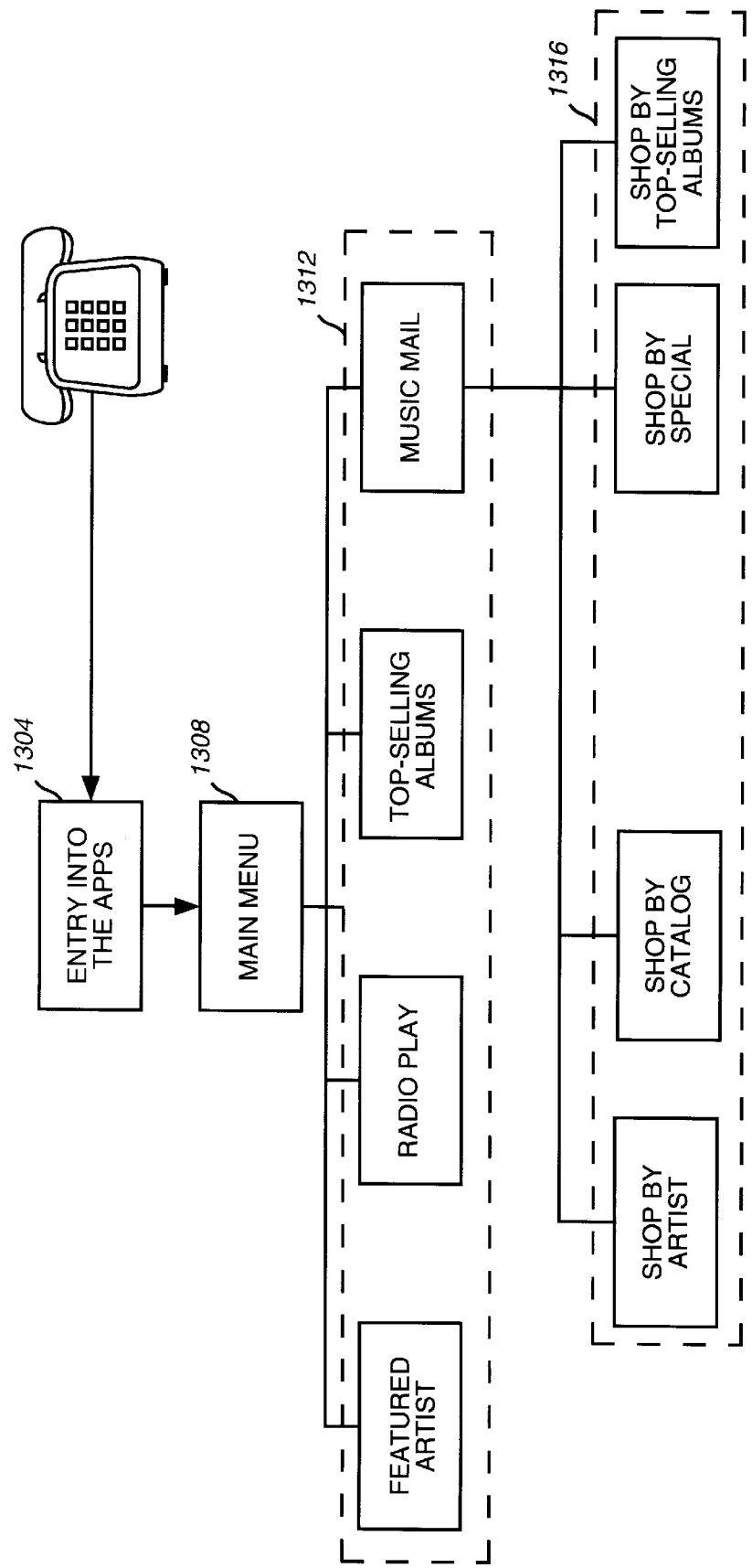
FIG. 13 is a block diagram illustrating an example hierarchy of a menu driven embodiment of the automated product purchasing system in an environment where the automated product purchasing system is used for purchasing musical title.

As stated above, callers accessing the automated product purchasing system can browse through available music selections to create their order. FIG. 13 is a diagram illustrating a high-level hierarchy of the menu-driven options provided in one embodiment of the automated product purchasing system. Box 1304 illustrates entry of caller 182 into the automated product purchasing system. In this step, caller 182 connects to VRU 104. Upon entry, the caller is first provided with a main menu 1308. In one embodiment, main menu 1308 introduces the service, asks the caller 182 for a membership ID, and provides caller 182 with options to begin shopping. One of the options provided to the caller 182 is to select the style of music which he or she wishes to browse.

Once the caller has selected a music style, the caller can choose to hear selections from a featured artist, a radio play list, top-selling albums. Alternatively, caller 182 may choose to shop by artist name or catalog identification. If the caller chooses this alternative selection, he or she enters the "Music Mall". These selections are illustrated by hierarchy level 1312. If caller 182 decides to enter the Music Mall, caller 182 may choose to shop by artist, shop by catalog number, shop based on special or promotional items, and shop by top-selling albums. These selections are illustrated by hierarchy level 1316. Alternative embodiments may include a different menu hierarchy and different selections at each level, to tailor user shopping, to a particular product or market.

In the above-provided descriptions, high-level discussions of processes followed by a caller 182 and the automated product purchasing system in shopping and completing a sale are generally described. A detailed process followed in allowing a caller 182 to browse the selections and order items is now described.

4.2 Access via the User Interface

Figure 14:
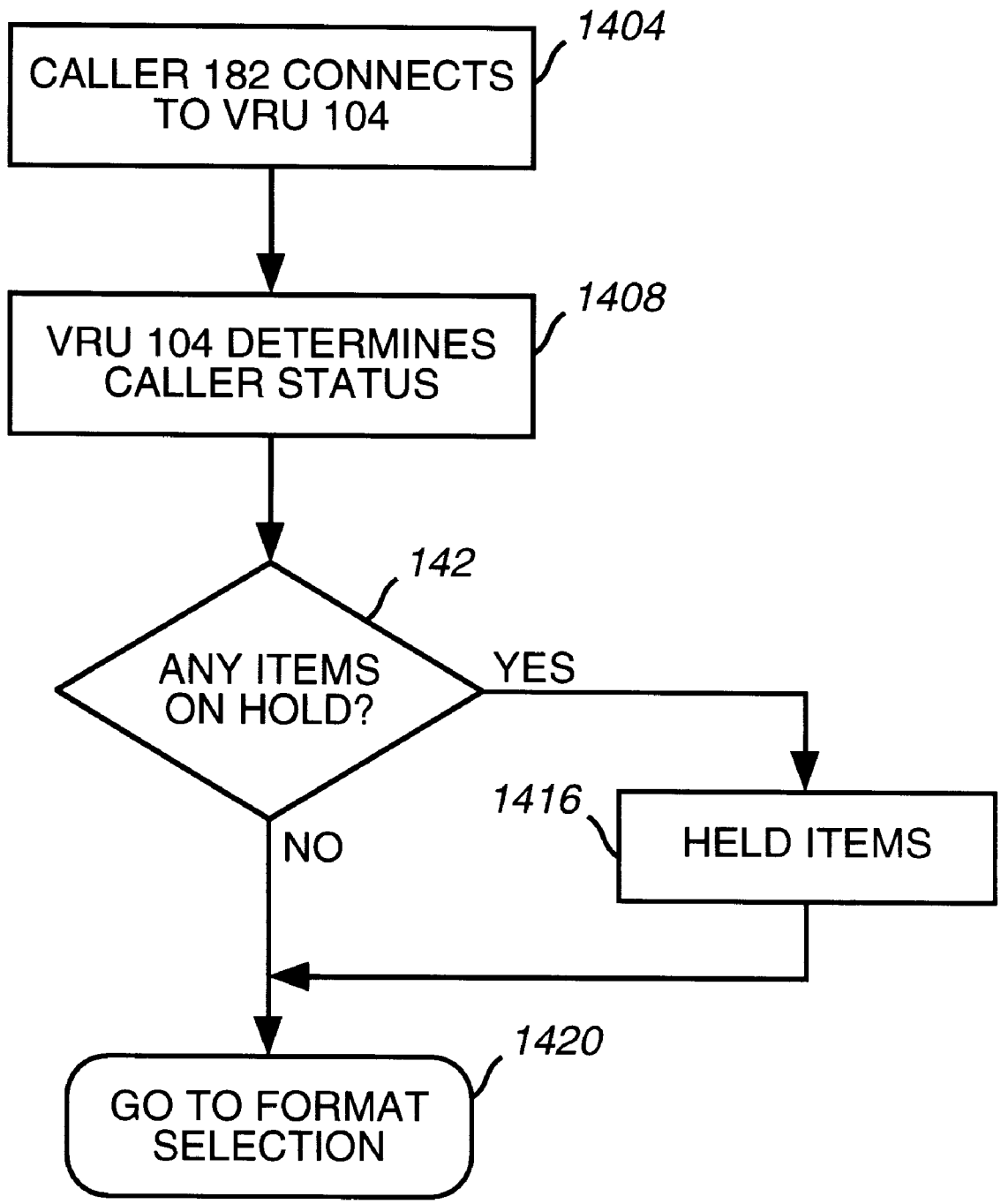
FIG. 14 is an operational flow diagram illustrating an example of a process followed to allow the customer to access the automated product purchasing system. Specifically.

FIG. 14 is an operational flow diagram illustrating a process that is followed according to one embodiment when the caller's call enters into voice response unit 104. In a step 1404, caller 182 connects to VRU 104. As described above, this can be accomplished by placing a telephone call to an 800 number dedicated to the automated product purchasing system which causes caller 182 to be connected to a VRU 104. In a step 1408, VRU 104 determines the status of caller 182. This caller status can include status such as whether the caller is a member or a non-member of the automated product purchasing system.

Additionally, information can be maintained to determine whether the caller is an abuser of the system or a non-abuser. Abuser information may be important from a business perspective to avoid abuses of the browsing function of the automated product purchasing system. For example abuser information may be used to minimize the number of times a particular caller 182 calls to browse the selections, listens to samples of titles, and does not purchase a product. Callers 182 who excessively browse through the selections without making purchases are termed "abusers" in this document. The threshold established for an abuser may vary from application to application. For members, abuser status may be based on membership identification. For non-members, abuser status may be determined based on the call's originating ANI.

Once caller status is determined, the VRU 104 next optionally determines whether any items are on hold from a previous call. This occurs in a step 1412. In other words, in this step, it is determined whether this particular caller, 182, was in the process of ordering selections during a previous phone call which was terminated before the order was completed. If there are items on hold, in a step 1416, the status of those items is determined. This status may result in those held items being maintained in a current order, or deleted. For example, VRU 104 may prompt the caller to either put the selections which are on hold back into the virtual shopping cart or to delete the selections from the list of items on hold.

If no items are on hold, or once the status of held items is determined, the process can continue to allow a format selection process to begin, as illustrated in step 1420. A more detailed discussion of the process by which items on hold are treated is provided below with reference to FIG. 37.

Figure 15:
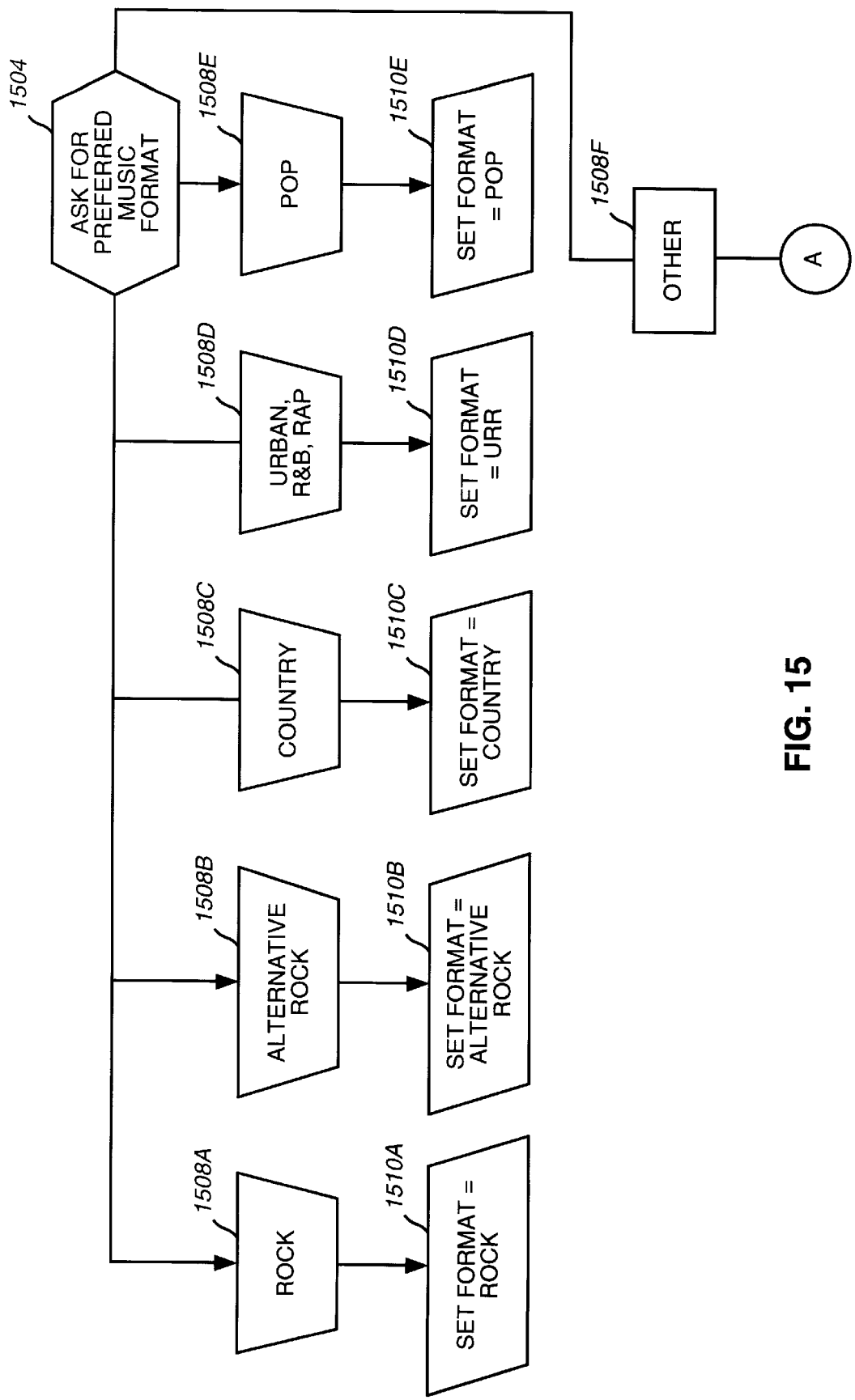
FIG. 15 is an operation flow diagram illustrating a process by which the automated product purchasing system prompts a customer to enter product selections according to one embodiment of the invention.
Figure 16:
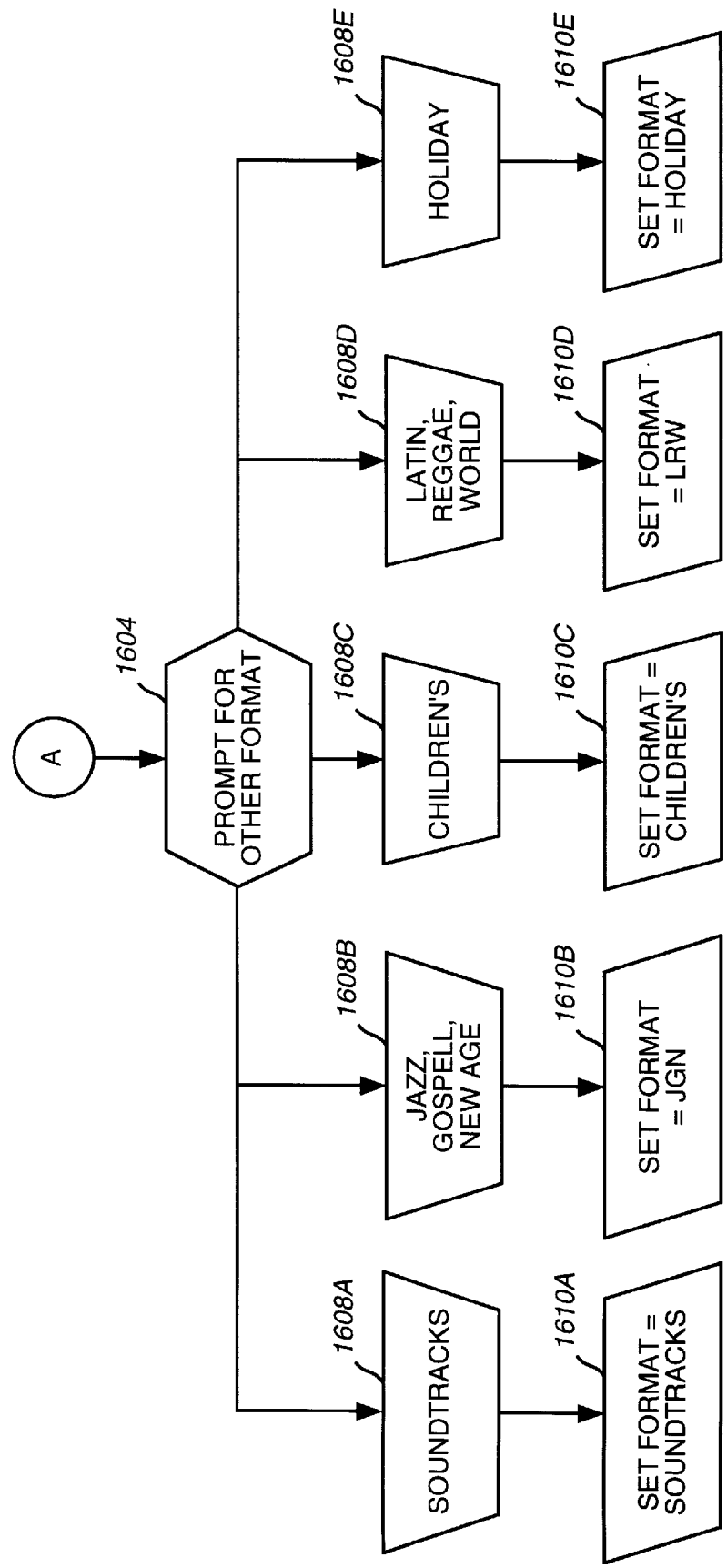
FIG. 16 is an operational flow diagram illustrating a process for entering product selections where the selection menu is divided into two levels.

The format selection process is illustrated in FIGS. 15 and 16. Referring now to FIG. 15, in a step 1504, VRU 104 plays a script asking caller 182 to enter the preferred music format. An example script prompts caller 182 to enter a keypad keystroke corresponding to the appropriate format selection. For example, to follow the embodiment illustrated in FIG. 15, the script may prompt caller 182 to:

Press one for Rock. Press two for Alternative Rock. Press three for country. Press four for Urban, Rhythm and Blues and Rap. Press five for Pop. Press six to hear additional selections.

and so on. The format selections and keystrokes in an example embodiment are illustrated by input steps 1508A through 1508F. Based on the keystroke entered by caller 182, VRU 104 sets the format for the call to the selected style. This is illustrated by steps 15010A through 1510E.

In one embodiment, where more styles are provided than the keypad can accommodate, the menu may be divided into two levels, the second level of which is accessed by caller 182 selecting the menu choice enabling him or her to hear additional styles. This is illustrated by input step 1508F in FIG. 15. If, in this embodiment, caller performs input step 1508F, selecting additional styles, the process continues as illustrated in FIG. 16.

Referring now to FIG. 16, in a step 1604, VRU 104 plays a script prompting caller 182 to enter a keystroke corresponding to the additional styles provided under the "other" formats. These are illustrated by input steps 1608A through 1608E. In response to the keystroke entered by caller 182, VRU 104 sets the appropriate format as illustrated by steps 1610A through 1610E. Additional styles can be offered by adding additional levels of hierarchy through the use of an "additional formats" key at each level subsequent level except the last level.

In the embodiment described herein, format selection is done before caller 182 is allowed into the system to browse through the available selections. In this embodiment, browsing is performed based on the music style selected unless caller 182 opts to shop via some other attribute such as artist name, title, catalog identification, and the like. Alternative embodiments can include embodiments where the format selection is not required before browsing begins.

Figure 17:
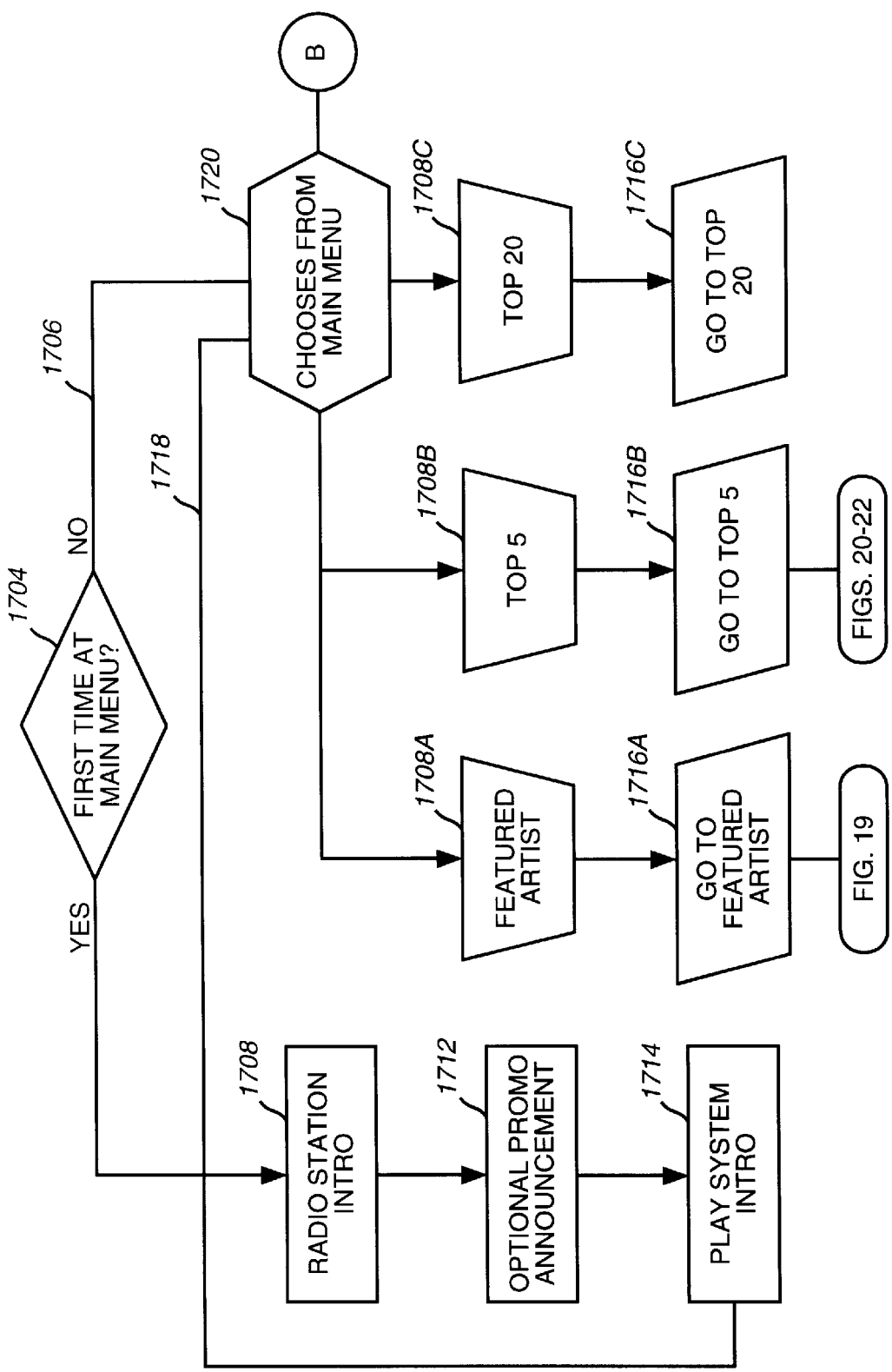
FIGS. 17 and 18 are an operational flow diagram illustrating example process by which a music category selected to one embodiment of the invention.
Figure 18:
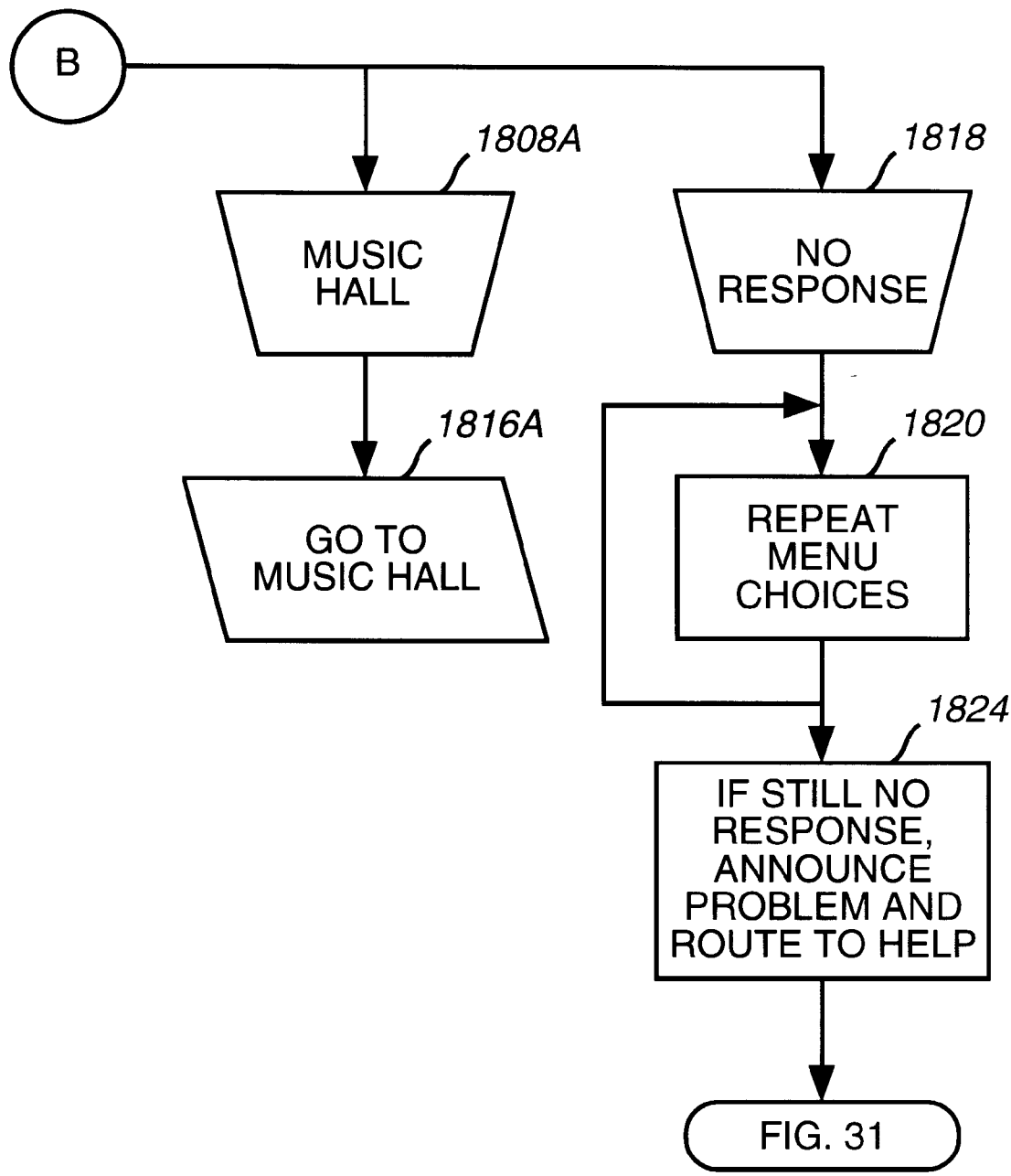

FIGS. 17 and 18 are operational flow diagrams illustrating the music selection process that occurs after the format selection has been made. Referring now the FIG. 17, once the format selection has been made, the caller 182 is provided with a main menu by VRU 104. In one embodiment, before the main menu script is played, VRU 104 first determines whether this is the first time that caller 182 is at the main menu for this call. This is illustrated by decision step 1704. If this is the caller's first visit to the main menu for this call, VRU 104 optionally plays a radio station introduction script as illustrated by step 1708.

In one embodiment, the radio station introduction script is an introduction of the radio station in the caller's geographic area and that is associated with the format selected by caller 182. This radio station introduction can be a script recorded to introduce the radio station, and it can be recorded by a disk jockey from that radio station. This optional step is purely promotional and designed to spark interest in automated product purchasing system.

In a step 1712, additional promotional information scripts can be read (i.e., played to caller 182) by VRU 104. Such scripts for the optional promotional announcements may also be recorded by the disk jockey at the local radio station and can provide radio station promotional information. Additionally, these promotional scripts can provide caller 182 with nationwide or generic promotional information.

In a step 1714, a simple introductory script can be played. In one embodiment, this script is simply a promotional script for the automated product purchasing system service that introduces the automated product purchasing system. In addition, it may be advantageous to provide the caller with generic instructions at this time. For example, the caller can be instructed that to purchase the music he or she is hearing at any time, simply press a particular key. An example of this script may be:

To purchase the music you are hearing at any time, just press 6.

To return to the previous menu, press the star key. Or, if you'd like some help, press zero.

Again, the wording of these scripts is optional and may be tailored to the particular product being offered the particular marketing audience, or numerous other attributes.

The operation now progresses to step 1720. Note that in the embodiment illustrated in FIG. 17, if caller 182 arrives back at the main menu, and it is not his or her first time at the main menu for this call, the operation proceeds immediately at step 1720 as illustrated by decision box 1704 and flow line 1718.

In step 1720, VRU 104 plays a script prompting caller 182 to enter a selection using a keypad keystroke. In accordance with the embodiment illustrated in FIG. 17, an example script may prompt the caller to:

Press one to hears songs by this week's featured artist, [featured artist's name inserted here]. Press two to hear selections from this week's top five hits. Press three to hear selections from this week's top twenty nationwide hits. Or, press four to enter the Music Mall and shop for your favorite albums by artist name or catalog number.

The keystrokes entered by caller 182 in response to the menu are illustrated by input steps 1708A through 1708C and 1808A. In response to the DTMF tone resulting from the caller's selection, VRU 104 jumps to a portion of the process that allows caller 182 to browse music selection in the area he or she selected. This is illustrated by process steps 1716A through 1716C and 1816A. Additionally, VRU 104 may play a script to caller 182 announcing to the caller the selection that he or she has made. For example, if the caller enters the keystroke "1" to select the "featured artist," VRU 104 may play a script to caller 182 announcing, "You have selected this week's featured artist, Tom Petty."

If no response is detected by caller 182, the menu choices are repeated, as illustrated by step 1820. When the menu choices are repeated, VRU 104 may play a script to caller 182 announcing that no selection was received. Step 1820 may be repeated a designated number of times. If there is still no response, in one embodiment caller 182 is forwarded to a help routine, or to customer service center 108. This is illustrated by step 1824. An example help process is described below with reference to FIG. 31.

Figure 19:
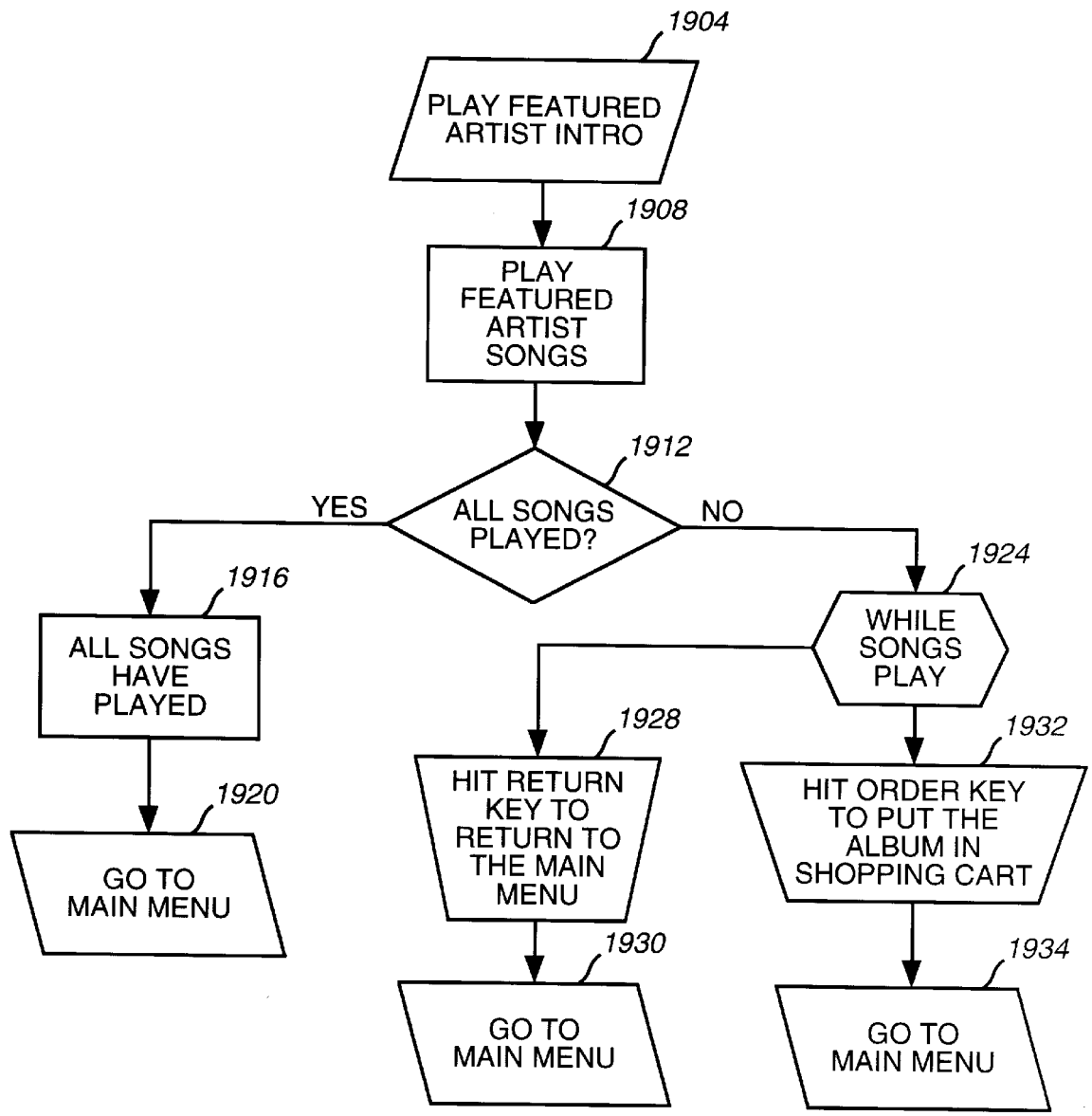
FIG. 19 is an operational flow diagram illustrating a process by which a customer samples music selections available featured artist.

The music samples played for caller 182 will likely vary depending on whether caller 182 selected the featured artist or one of the top hits selections. If caller 182 selected the featured artist, the operation continues by allowing caller 182 to listen to sample selections by the featured artist. FIG. 19 is an operational flow diagram illustrating a process by which the automated product purchasing system allows caller 182 to sample songs from a featured artist according to one embodiment of the invention. Referring now to FIG. 19, in a step 1904, VRU 104 plays a script for the featured artist introduction. This featured artist introduction can include several scripts to introduce the artist, introduce one or more titles featured by that artist, and provide availability, price and delivery information for featured titles. As described above, in one embodiment, availability, price and delivery information are retrieved from interactive transaction database 112 and played to caller 182 by VRU 104.

In a step 1908, VRU 104 plays the segments from the featured artist songs. When all the songs have been played, as illustrated by decision step 1912, VRU 104 plays a script announcing that all the songs from that title have been played. This is done in a step 1916. If caller 182 has not made any purchases, the operation continues back at the main menu (step 1704 of FIG. 17), as illustrated by a step 1920. Once at the main menu, caller 182 can then select alternative choices. Of course, in accordance with embodiments described above, caller 182 may always choose to return to the previous menu or exit the system at any time.

While the featured artist songs are playing, as illustrated by step 1924, caller 182 can enter keystrokes as originally prompted by the script played in step 1714. For example, caller 182 can hit the pound (#) key to return to the main menu, as illustrated by input step 1928, or the "6" key to order the title from which the song is being played, as illustrated by input step 1932. If caller 182 elects to return to the main menu, the operation continues again at 1704, as illustrated by process steps 1930 and 1934.

Figure 20A:
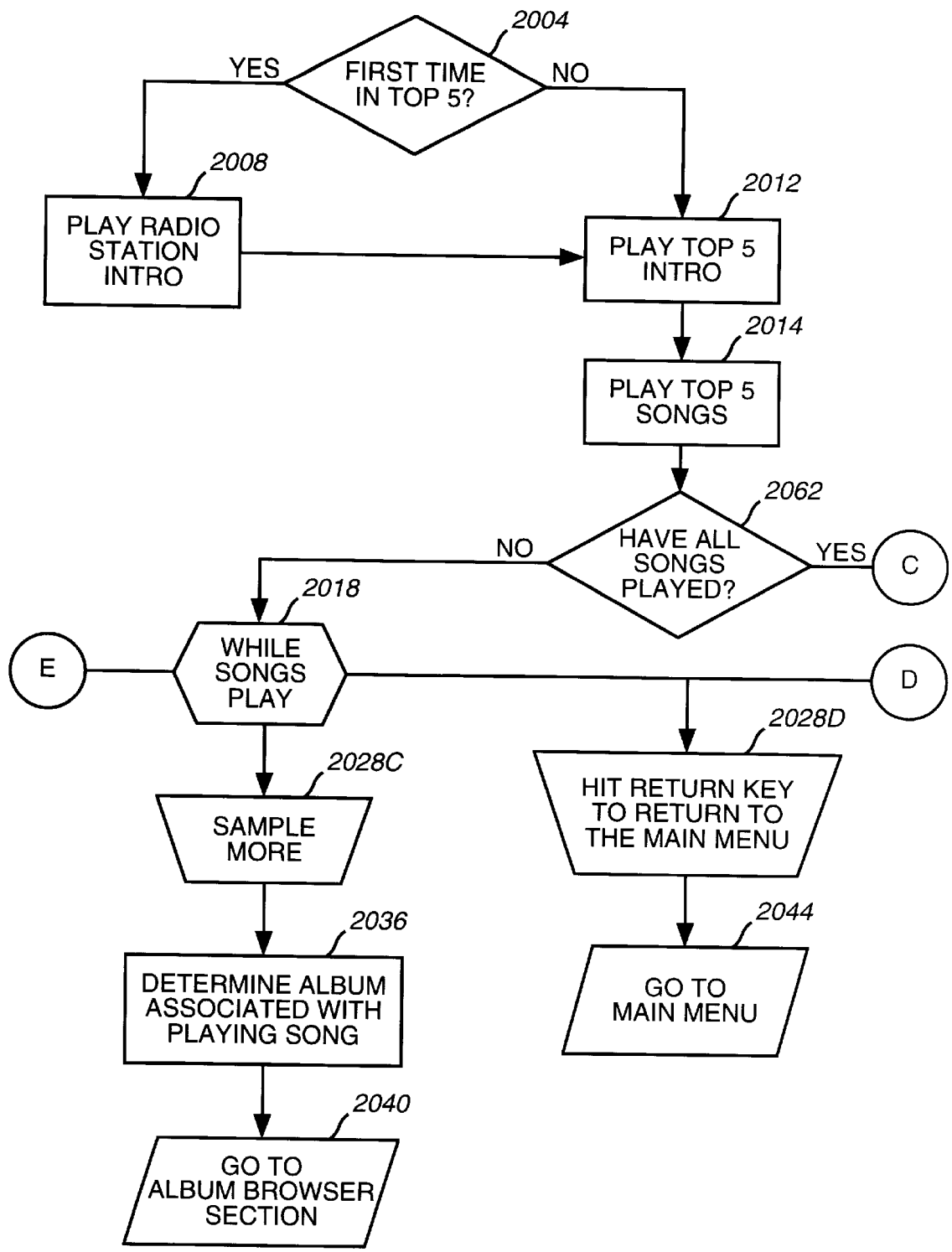
FIGS. 20A, 20B and 20C, is an operational flow diagram illustrating an example process by which a customer samples music available in a "type-5 hits" category.
Figure 20B:
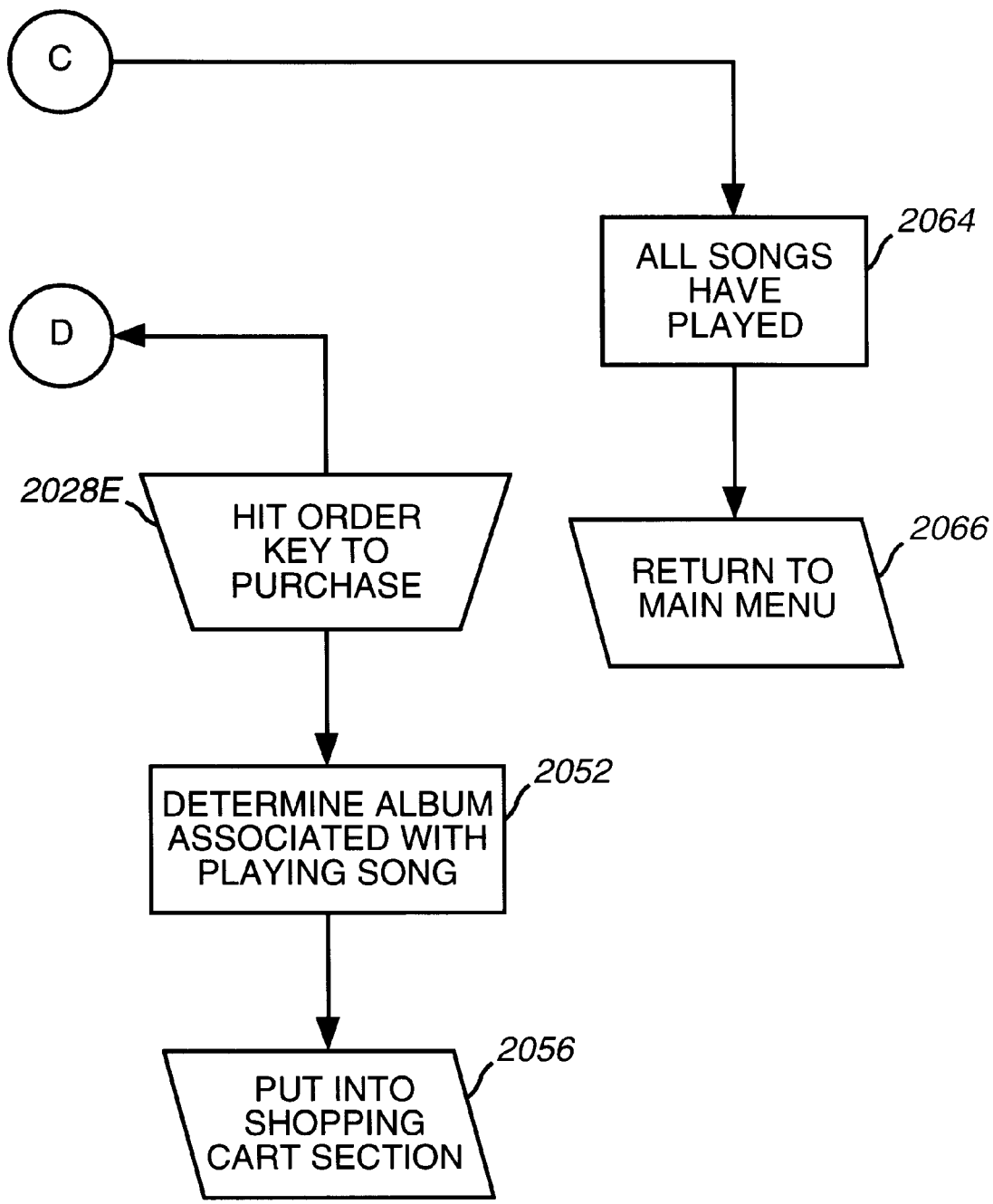
Figure 20C:
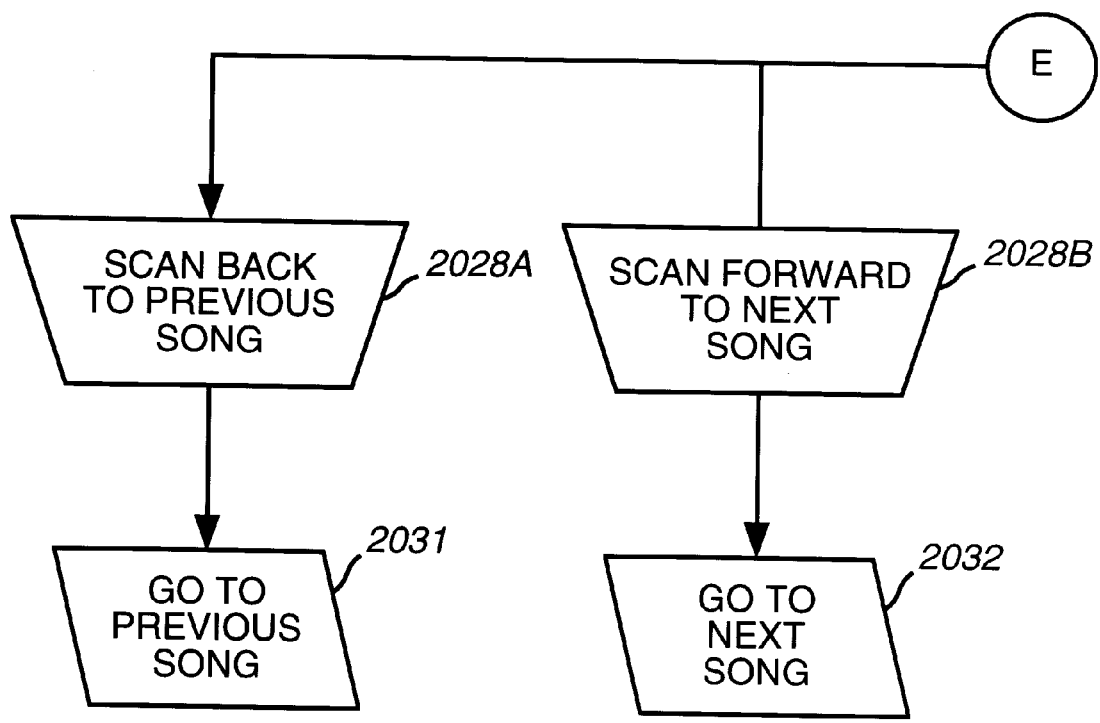

However, if caller 182 elects to order the title sampled, VRU 104 adds this title to caller 182's order. Recall that in one embodiment, the order is maintained in interactive transaction database 112. In this embodiment, information identifying the title ordered is added to the order data for this particular caller. Also recall that in one embodiment briefly introduced above, when a title is ordered by caller 182, that title is placed in the caller's virtual shopping cart and the purchase is not finalized until caller 182 electronically "checks out of" the automated product purchasing system. One or more embodiments of this virtual shopping cart concept are described in further detail below with reference to FIGS. 29, 30 and 36.

Where caller 182 selects to sample the top-five selections by entering a keystroke "2" at the main menu, the operation continues at FIGS. 20A, 20B, and 20C. In the top-five selection, VRU 104 first determines whether this is the caller's first time in the top-five menu. This is illustrated by decision step 2004. If this is the caller's first time, an optional radio station introductory script is played in a step 2008. As with other radio station scripts, this one can be announced by a disc jockey or local radio personality.

The operation then continues at a step 2012, where a top-five introduction script is played. The top-five introduction script introduces the top five songs for that radio station. In a step 2014, VRU 104 plays segments from the top five songs, announcing the artist and title for each song. In accordance with a data structure embodiment described herein, this is accomplished by stringing together (or retrieving and playing in sequence) files containing: the recorded music segment to be sampled, an announcement of the artist's name, and an announcement of the title. In one embodiment, no price or delivery information is announced as the top five songs are being played.

While the songs are playing, VRU 104 is ready to accept input keystrokes from caller 182, as illustrated by process step 2018. In one embodiment, standard scanning keys can be defined to allow caller 182 to scan through the selections being played. For example, these scanning keys can allow caller 182 to scan forward or backward in the list, look for additional songs from a particular title, return to the main menu, and, of course, order a title. The use of these standard scanning keys need not be limited to top-hits scanning, but can be used where caller 182 is sampling more than one selection.

These scanning keys are now described in greater detail with reference to FIGS. 20A, 20B and 20C. In one embodiment, caller 182 can scan back to a previous song played in the song list, scan forward to the next song on the song list, sample additional songs, return to the main menu, or depress the order key to purchase the selection. These input keystrokes are illustrated by input steps 2028A through 2028E.

When caller 182 depresses scan keys as illustrated by input steps 2028A and 2028B, VRU 104 skips either forward or backward to the previous or next song on the song list, as illustrated by process steps 2031 and 2032.

If caller 182 selects the "sample more" selection as illustrated by input step 2028C, VRU 104 determines the title associated with the song playing while caller 182 has made that selection, as illustrated by process step 2036. In a step 2040, VRU 104 retrieves additional music samples from that title so that these samples can be played for caller 182. In one embodiment, this is accomplished by invoking an album browser process allowing caller 182 to browse (sample) selections featured on that title. An example album browser process is described in detail below with reference to FIG. 28.

If caller 182 selects an input key requesting to return to the main menu (process step 2028D), the process continues back at step 1704, as illustrated by process step 2044. If caller 182 enters a keystroke to order a title, as illustrated in step 2028E, VRU 104 determines the title associated with the song playing while the key is depressed, as illustrated by step 2052. At this point, VRU 104 adds the selected title to the caller's order, as illustrated by step 2056.

If all the songs have been played, as determined by decision step 2062, VRU 104 plays a script indicating that all the songs have been played, and returns the process to the main menu at step 1704. This is illustrated by steps 2064 and 2066.

Although this description was provided in terms of playing the top five songs for a radio station, a similar process can be followed for a different number of songs and for a list of songs not necessarily associated with a particular radio station. Where the songs are not associated with a particular radio station, step 2008, where the radio station is introduced, may be deleted or changed to introduce the top-five selection in a different manner. Similarly, other changes to and additions and deletions of the process steps can be made to tailor the top-hits sampler to suit a particular application.

Where caller 182 selects to sample selections from among the top 20 selections, as illustrated by input step 1708C, a similar process is followed to that depicted in FIGS. 20, 20B, and 20C. Because, in the depicted embodiment, the top-20 song list is format-specific, as opposed to radio-station-specific, there is no need to determine whether this is the caller's first time in this menu selection and to play a radio station introduction for this selection. Instead, the operation can proceed directly to step 2012, where an introduction script may be played announcing that caller 182 has selected the top 20 selections browse feature. Again, in step 2014, the artist, album, and song are announced as each song is played. There is no need to provide availability, price and delivery information at this time.

Caller 182 may again enter scanning key selections as illustrated by input steps 2028A through 2028E. Once caller 182 decides to order a product, and VRU 104 determines the title associated with the song playing when caller 182 orders the product (step 2052). At this point, VRU 104 obtains availability, price and delivery information from interactive transaction database 112.

These top-hits examples are provided in terms of a scenario where a top-five hit list for a particular station and a top-twenty nationwide hits list is sampled. Other lists such as radio station play lists (for example, a list of songs played on the associated radio station during the past half hour) other top-hits lists, promotional items lists, etc. can be sampled as well.

4.3 Music Mall

If at the main menu, caller 182 elects to go to the "Music Mall", he or she is allowed to browse among music samples from any title available in automated product purchasing system. This browsing can be performed based on artist, catalog ID number, promotional specials, and other categories. Browse by artist and browse by catalog ID number are described in detail in this section of the document.

In keeping with the music embodiment described above, this description of the Music Mall is provided in terms of a system for automated shopping for music titles. It is important to note that, as with other portions of the automated product purchasing system, the Music Mall embodiments are not limited to use with music titles but can be implemented to offer any of a number of virtually unlimited product types.

4.3.1 Browse by Artist

Figure 21:
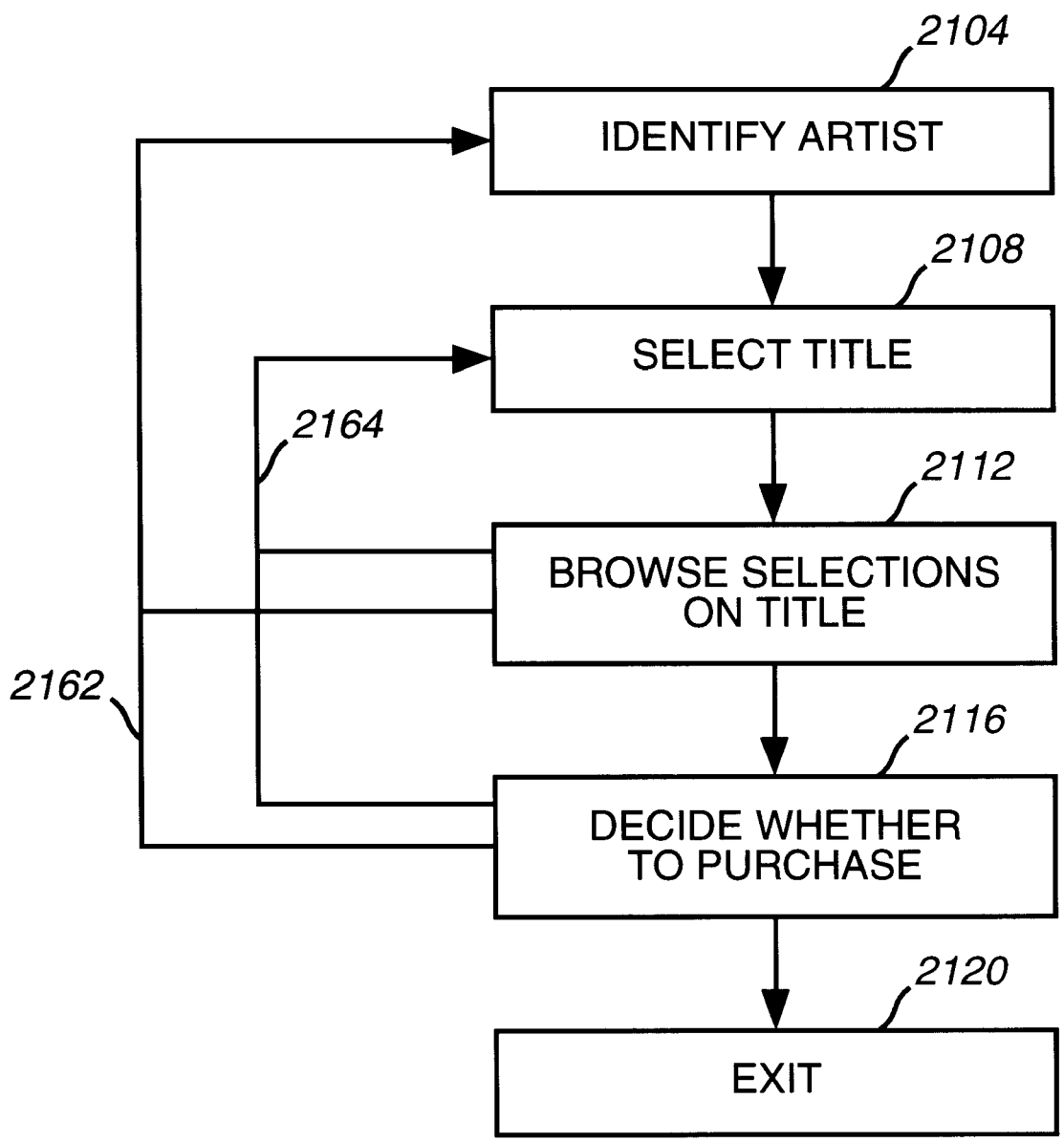
FIG. 21 is an operational flow diagram illustrating an example process by which a customer browses selections available on a music title according to one embodiment of the invention.

According to one embodiment, selecting, sampling and purchasing in the Music Mall is done according to the artist. FIG. 21 is high level block diagram illustrating a general process of browsing though the Music Mall according to this embodiment. Referring now to FIG. 21, in a step 2104, the caller 182 identifies an artist whose titles he or she would like to sample. In a step 2108, VRU 104 plays a script to caller 182 identifying the titles available for that artist. Caller 182 selects a title which he or she would like to browse (in one embodiment, caller 182 can elect to hear a "browser" of that album.

In a step 2112, selections on the title can be browsed by caller 182 utilizing the browse features of VRU 104. After browsing a title, in a step 2116 caller 182 decides whether to purchase the title browsed. At any point in time while in the Music Mall, caller 182 may decide to identify a different artist to browse or select a different title of the artist to browse. This is illustrated by flow lines 2162 and 2164. When caller 182 is finished browsing and/or purchasing titles, caller 182 exits the Music Mall as indicated by a step 2120. Having thus described a high-level process of the Music Mall according to one embodiment, the Music Mall is now described in greater detail in accordance with this embodiment.

Figure 22:
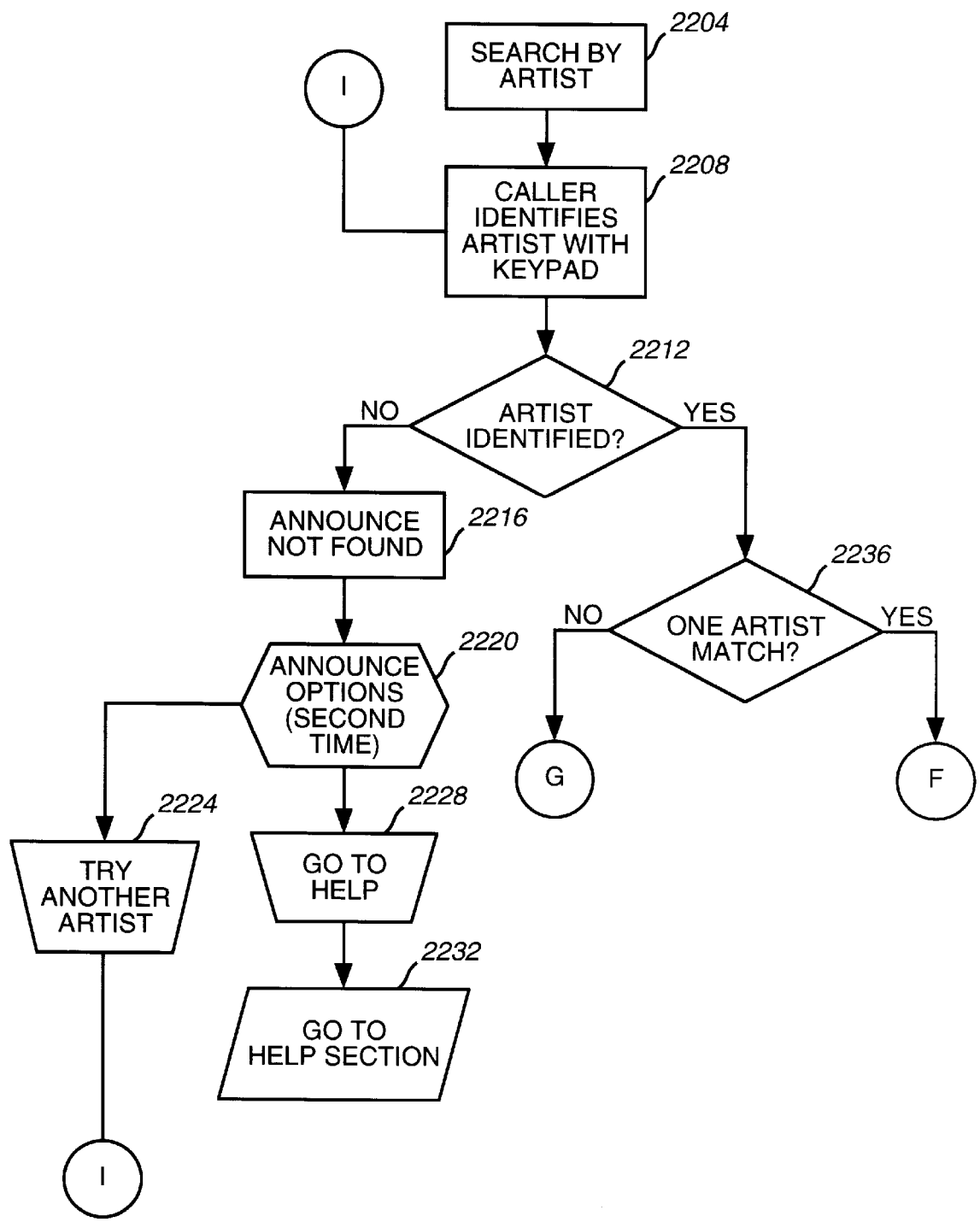
FIGS. 22 and 23 are an operational flow diagram illustrating a process by which a particular artist is identified from among a group of artists according to one embodiment of the invention.
Figure 23:
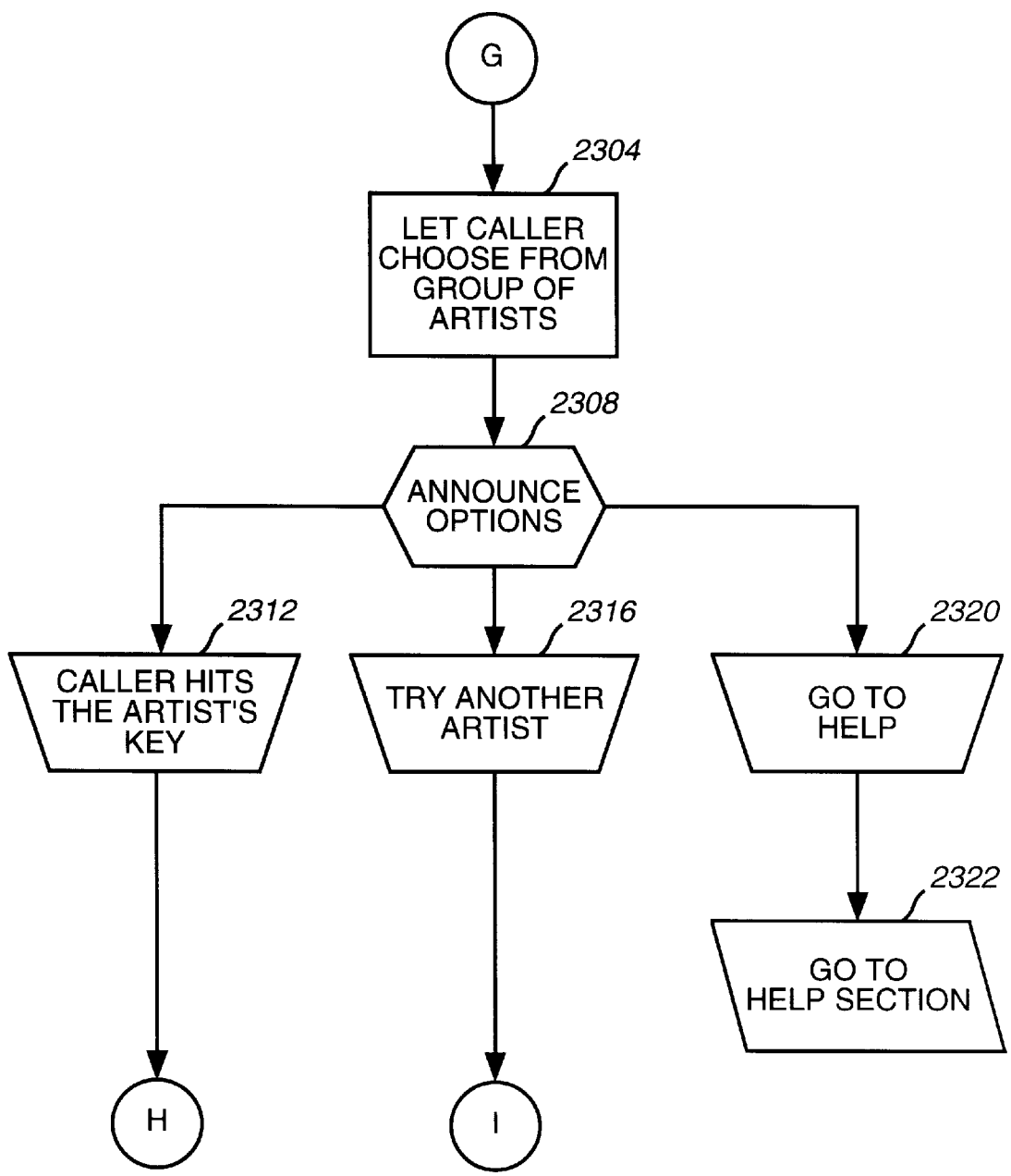

FIGS. 22 and 23 are detailed process flow diagrams illustrating the manner by which an artist is identified according to one embodiment of the invention. Referring now to FIG. 22, in a step 2204, VRU 104 enters the Music Mall allowing caller 182 to search the titles by artist name. In a step 2208, VRU 104 plays a script to caller 182 asking the caller to identify an artist using the telephone key pad. Specifically, in one embodiment, the caller uses the telephone key pad to enter in the artist's name. This is done by using the alphanumeric designations on the keypad to spell the artist's name.

VRU 104 interprets the DTMF tones resulting from the key pad entry to determine whether an artist can be identified. This is illustrated by decision step 2212. If an artist is not identified, the operation continues at a step 2216. In a step 2216, VRU 104 plays a script announcing to the caller that the artist keyed in has not been found in the data base. At this point, caller 182 can key in a new artist as indicated by input step 2224.

Optionally, if an artist is still not identified, the caller is provided with the option to access the "Help" feature of the automated product purchasing system. This is illustrated by input step 2228 and step 2232.

If an artist is identified by the keypad entry, VRU 104 determines whether one artist matches the keypad entry or several artists match the keypad entry. This is illustrated by decision step 2236. If only one artist is identified matching the keypad entry, the identification of the artist portion of the Music Mall is completed and the operation continues at a step 2404 in FIG. 24, as described below.

If, on the other hand, a number of artists are identified which match the keypad entry, the operation continues as illustrated in FIG. 23, where VRU 104 attempts to identify which artist caller 182 selected among the group of artists identified. Referring now to FIG. 23, in a step 2304 VRU 104 plays scripts indicating to caller 182 that he or she needs to choose from a group of possible artists identified. In one embodiment, the scripts played read:

I have located the following artists. For [first artist name] press 1. For [second artist name] press 2. For [third artist name] press three.

The script continues in this manner for each artist found. In a situation where more artists are identified than the number of keys, the caller may be provided with the option of hearing these additional artists by a script reading, for example:

To hear more artists, press nine.

In a step 2308, VRU 104 plays a script announcing options to caller 182. For example, in one embodiment, the script reads:

Please make your selection now, or to try again, press the star key.

If you need help, press zero.

This prompts caller 182 to enter the keypad key corresponding to the artist he or she desires. In one embodiment, only a limited number of artists can be selected in this manner due to the limited number of keypad keys. In alternative embodiments, a hierarchical approach can be used where additional artists can be listed by having caller 182 select a number corresponding to a selection allowing caller 182 to hear additional artists found in this search.

If caller 182 hears the artist that he or she wishes to access, the caller 182 hits the keypad key corresponding to that artist. This is illustrated by input step 2312. If caller 182 decides that he or she would like to try inputting the artist's name again or try a different artist, caller 182 depresses the appropriate key as indicated by input step 2316. This results in the caller being returned to the top of the search by artist process at step 2208.

Figure 24:
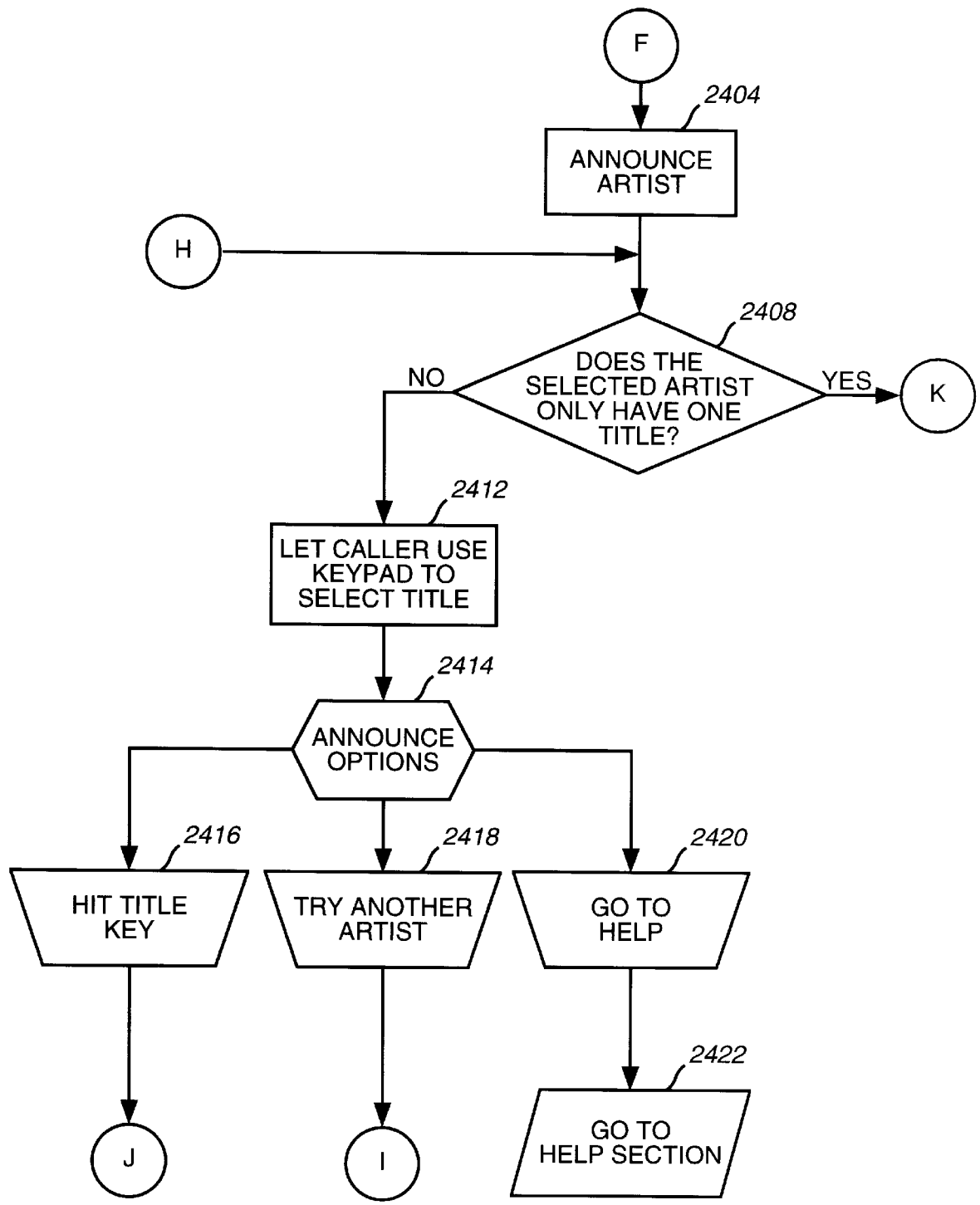
FIG. 24 is an operational flow diagram illustrating a process by which a particular idol of a chosen artist is selected according to one embodiment of the invention.

If, alternatively, the caller wishes to access the "Help" section, he or she depresses the key corresponding to the help option in input step 2320 which causes VRU 104 to invoke the "Help" feature as indicated by step 2322. Note that steps 2322 and 2232 both invoke the "Help" section but are arrived at by different routes. Similarly, this applies to additional steps in which the "Help" section is invoked by VRU 104.

Where the caller identifies an artist using a keystroke entry in input step 2312, the operation continues as illustrated in FIG. 24. FIG. 24 is an operation flow diagram illustrating a process by which a particular title of the chosen artist is selected according to one embodiment of the invention.

Referring now to FIGS. 22, and 24 in a step 2404 where the artist is identified via one-artist match as illustrated in FIG. 22, decision step 2236, VRU 104 announces the artist by playing a script for that artist. Where the artist is identified by the caller 182 choosing one artist from a group of found artists as illustrated by input step 2208, this announcement of the artist is not needed and the process can commence at decision step 2408.

In decision step 2408, VRU 104 determines whether the artist selected has one title only. In an embodiment implementing the data structure described above with reference to FIG. 29, this is accomplished by searching for all catalog ID numbers 1008 beginning with the artist I) 1004 identifying that artist.

Where the selected artist has more than one title, the operation continues at a step 2412 where VRU 104 prompts the caller with scripts to use the keypad to select the desired title. For example, VRU 104 may play scripts reading:

The following albums are available in the Music Mall. For [first album name] press one. For [second album name] press two.

And so on for each album found in the Music Mall by that artist. Once the available titles are read to caller 182, VRU 104 prompts the caller to select a title, try another artist or advance to the help feature, as illustrated in step 2414. Caller 182 responds by either selecting a title, or entering a key to bring him or her to try another artist or to go to the help mode. This is illustrated by steps 2416, 2418 and 2420, respectively. Note that the operation of prompting caller 182 to select the title based on a list of titles is quite similar to the steps illustrated in FIG. 23 where caller 182 was asked to select one artist from the grouping of artists. The only difference in this instance is that the scripting prompts caller 182 to select the appropriate title from the list of titles as opposed to the appropriate artist from the list of artists. If one of the grouping of titles is selected, the operation continues as illustrated in FIG. 25.

Figure 25:
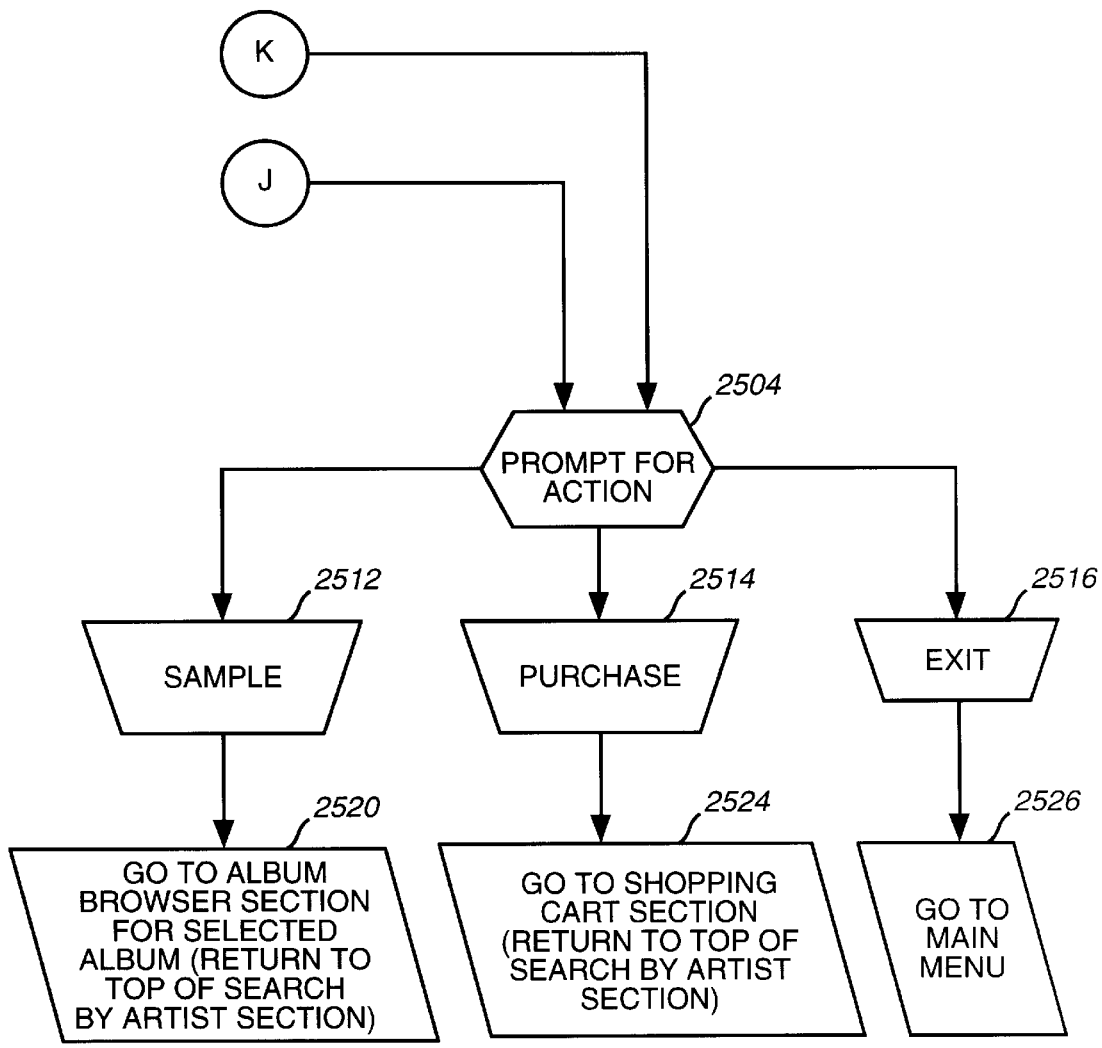
FIG. 25 is an operational flow diagram illustrating an example process by which a selected artist only has one title according to one embodiment of the invention.

If the selected artist only has one title as determined by decision step 2408, the operation continues in accordance with the process illustrated in FIG. 25. Additionally, if it was determined at step 2408 that only one title exists for the selected artist, the operation also proceeds with the process illustrated in FIG. 25.

Referring now to FIG. 25, in a step 2504, VRU 104 plays scripts to prompt caller 182 for action. These actions can include browsing the selected title, purchasing the title, or returning to the main menu. For example, the scripts may read:

I have found [selected album name]. To listen to samples from this album now press 8. To purchase this album at the price of [state CD price received from interactive transaction database 112] for CD or [cassette price] for cassette, press six. To return to the main menu, press the star key now.

Caller 182 makes the selection by entering a keystroke on the keypad as illustrated by input steps 2512, 2514, and 2516. Where caller 182 decides to browse selections from the titles selected, as indicated by step 2512, VRU 104 invokes an album browser process to play samples of selections from the title for the caller 182 as illustrated by a step 2520. One embodiment of an album browser is described below with reference to FIG. 28.

Where a caller elects to purchase the title as illustrated by input step 2514, VRU 104 enters the selection in an order for the caller 182. This is illustrated by a step 2524. If caller 182 chooses to exit, he or she is returned to the main menu, as shown in step 2526. In one embodiment, the selection of a title for purchase by caller 182 results in that title being placed in that caller's virtual shopping cart. One embodiment of the process by which a title is placed in the caller's virtual shopping cart is further described below with reference to FIGS. 29 and 30.

4.3.2 Selection According to Catalog Number

In the embodiment of the Music Mall described above with reference to FIGS. 21 through 25, caller 182 selected titles from among the selections available from automated product purchasing system in a search by an artist's name. In one alternative embodiment, caller 182 can select available titles by entering a catalog number. This embodiment is useful where caller 182 has access to a product catalog listing catalog numbers for the titles offered. For example, where caller 182 is a member he or she may receive a catalog of titles as a part of a "membership package." The process of browsing the available titles based on catalog number is now described.

Figure 26:
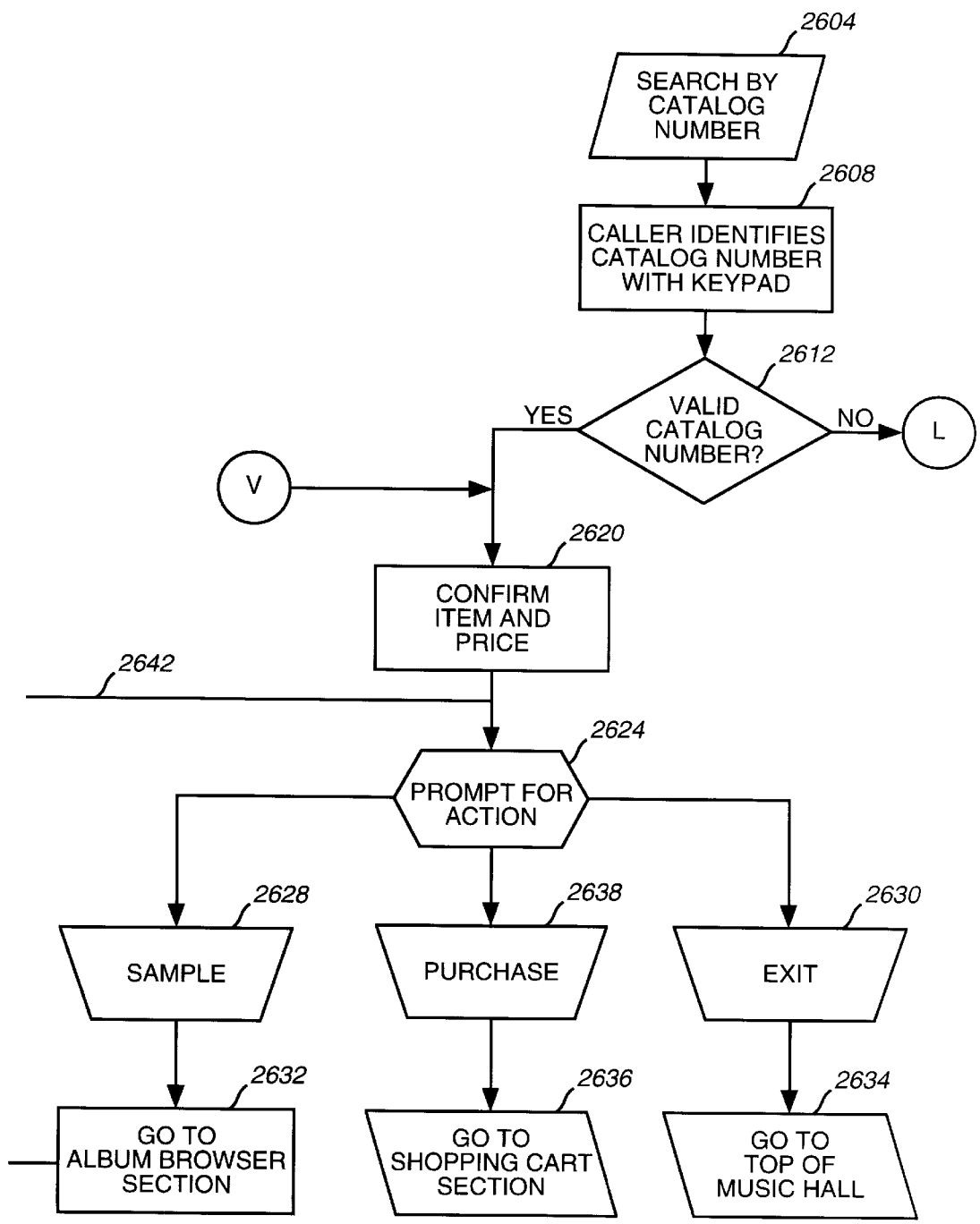
FIGS. 26 and 27 are an operational flow diagram illustrating an example process by which a VRU determines a correct catalog number based on customer inputs according to one embodiment of the invention.

Referring now to FIG. 26, in a step 2604 when caller 182 indicates that he or she wishes to select a title by catalog number, VRU 104 plays an introductory script asking caller 182 to enter the catalog number of the selection. In response to this prompt, caller 182 identifies the catalog number using the telephone key pad as indicated by input step 2608. In one embodiment, this catalog number entry is followed by an entry of the pound key.

In a step 2612, VRU 104 accepts the entered catalog number and determines whether it is a valid number. If the catalog number entered is valid, VRU 104 sends a request to interactive transaction database 112 to retrieve price information for the title corresponding to the catalog number. This is illustrated by a step 2620. Additionally, VRU 104 may ask interactive transaction database 112 to check item availability at this time.

In a step 2624, VRU 104 plays a script prompting caller 182 to make a selection. Specifically, VRU 104 asks caller 182 to either sample the selected title, or to purchase the title in cassette or CD form. Caller 182 chooses one of these selections by keypad entry as illustrated by input steps 2628 or 2638.

Additionally, caller 182 may choose to exit this portion of the Music Mall as illustrated by input step 2630. This would cause caller 182 to be returned to the beginning of the Music Mall shopping process as illustrated by a step 2634.

Figure 28:
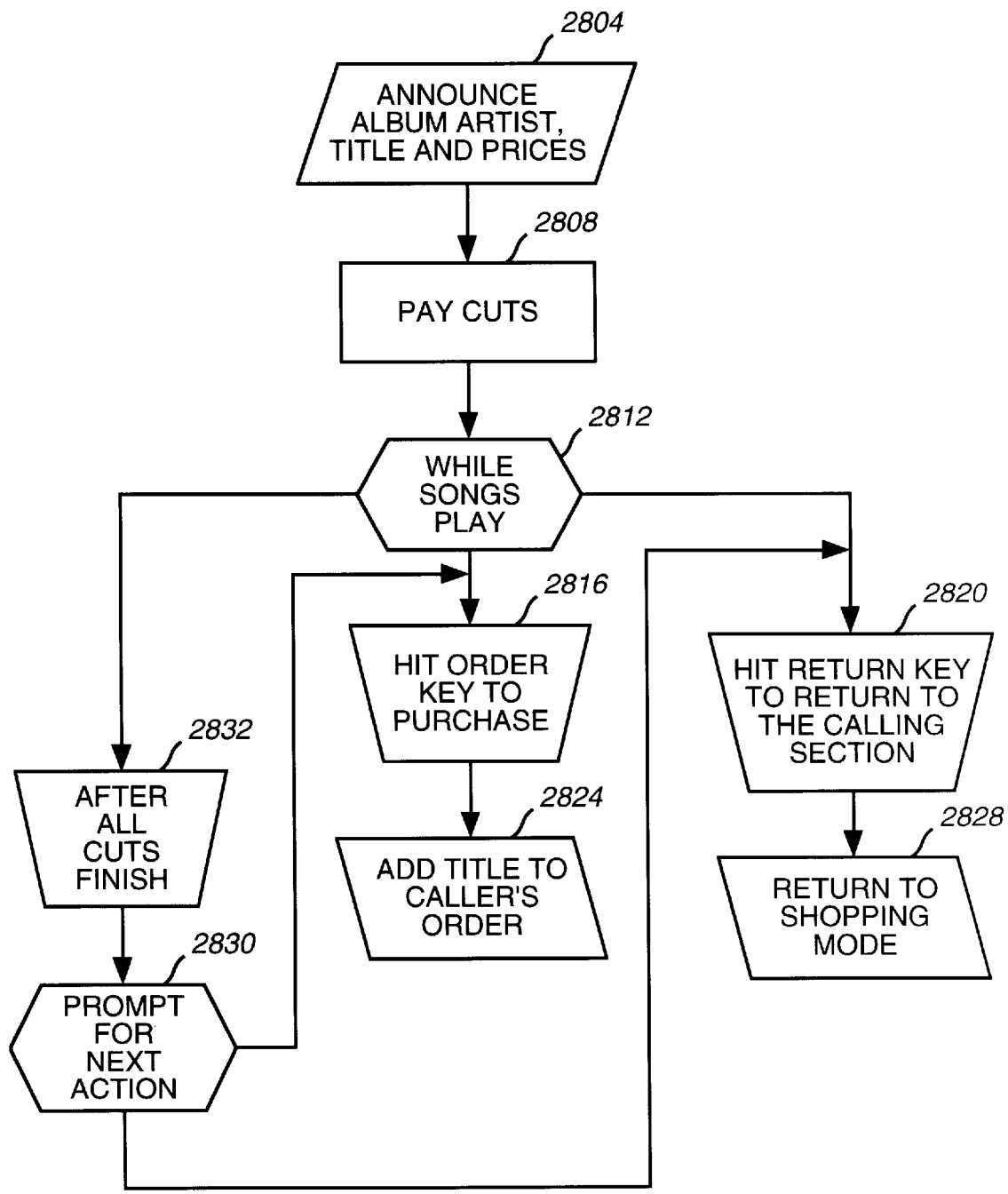
FIG. 28 is an operational flow diagram illustrating a process by which a customer is permitted to sample selected cuts from a music title according to one embodiment of the invention.

If caller 182 decides to browse the title (input step 2628), in a step 2632 VRU 104 provides cuts from the tracks on the selected title allowing caller 182 to listen to samples of the music on that title (i.e., to browse that title). The process by which VRU 104 allows caller 182 to browse the title according to one embodiment is illustrated in FIG. 28.

41

Once caller 182 has browsed the selection, VRU 104 again prompts caller 182 for action as illustrated by Flowline 2642 feeding back into step 2624.

If caller 182 decides to purchase the selected item (illustrated by input step 2638), VRU 104 puts the selected item into the caller's virtual shopping cart as illustrated by a step 2636. The process by which purchased items are placed into the caller's virtual shopping card according to one embodiment is described below with reference to FIGS. 29 and 30.

Figure 27:
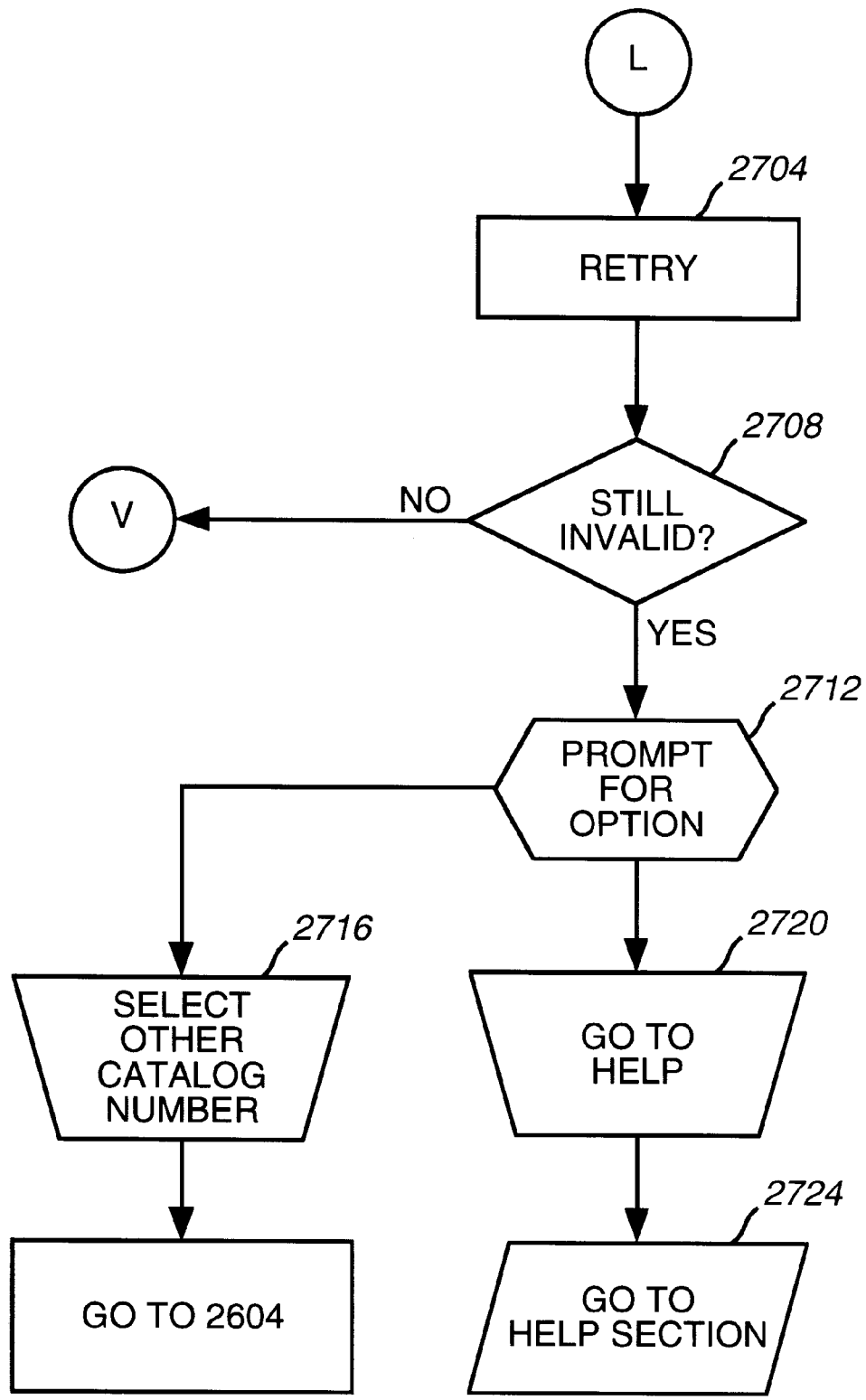

If, however, back in step 2612 it is determined that the catalog number entered by caller 182 is invalid, the operation continues as illustrated by the process flow diagram of FIG. 27. FIG. 27 is an operational flow diagram illustrating a process by which VRU 104 attempts to determine the correct catalog number. Referring now to FIG. 27, in a step 2704, VRU 104 plays a script to the caller asking the caller to reenter the catalog number. In one embodiment, VRU 104 allows caller 182 to reenter the number a predetermined number of times only. If a valid number is entered (decision step 2708), the operation continues at step 2620 in FIG. 26.

If, however, the number entered is still invalid (decision step 2708), the operation continues at a step 2712 where VRU 104 prompts caller 182 to either select a different catalog number or to proceed to the help feature.

If caller 182 elects to select another catalog number as indicated by input step 2716, the operation returns to step 2604 where VRU 104 plays a script to caller 182 asking him or her to enter the catalog number.

If caller 182 enters a keystroke indicating that he or she wishes to proceed to the help feature, as indicated by input step 2720, VRU 104 invokes the help section as indicated by step 2724. The help function, according to one embodiment is illustrated by the process flow diagram illustrated in FIG. 31.

5.0 Additional Features 5.1 Browser

Throughout the process of shopping for titles using the automated product purchasing system, caller 182 has the option of browsing a particular title. The term "browsing" in this context is used to refer to caller 182 listening to sample cuts from various tracks on a selected title. As defined above, the term "browser" in this context refers to a selection of cuts from a particular title. FIG. 28 is an operational flow diagram illustrating a process by which caller 182 is permitted to sample selected cuts from a title (i.e., browse a title) according to one embodiment of the invention. Browsing can be accomplished using a number of different techniques. The manner in which browsing is accomplished according to one embodiment of the invention is now briefly described with reference to FIG. 28.

Referring now to FIG. 28, in a step 2804, VRU 104 announces the title which caller 182 is going to be browsing. This announcement can include an announcement of the artist, title, and price of the title as well as delivery information. In a script-based embodiment, this is accomplished by playing scripts to caller 182. For example, the scripts read can state:

You have selected [title name], available at the price of [CD price] for CD or [cassette price] for cassette. Here are some of the cuts from the album.

In a step 2808, VRU 104 plays selected cuts from songs on the title selected by caller 182. In one embodiment, this is accomplished by playing cuts stored in a datafile in VRU 104. An announcement can be interleaved with these cuts announcing each cut and indicating, for example, the title of the song from which the cut is made.

42

Using the data structure described above, this is accomplished by retrieving a browser file having a listing of file names for the sample cuts. The browser may be stored in a file named according to the catalog ID number 1008 for that title. VRU 104 reads the file names listed in the browser file and retrieves and plays each file to caller 104. Where text scripts are interleaved, these too are listed in the browser file.

In a step 2812, VRU 104 is poised to accept input from caller 182. Caller 182 may depress a particular key to purchase the title as indicated by input step 2816. Alternatively, caller 182 may depress a return key to return to the calling selection. This is illustrated by input step 2820.

In one embodiment, these input keys for ordering or returning to the calling selection can be announced to caller 182 when caller 182 first accesses the automated product purchasing system, when caller 182 is introduced to the selections that he or she is going to be browsing, or at other appropriate times.

If caller 182 decides to order the title by entering the order key as illustrated by step 2816, VRU 104 adds the ordered title to the caller's order information in interactive transaction database 112, as illustrated in step 2824. In one embodiment, this has the effect of placing the title into the caller's virtual shopping cart. In one embodiment, the process by which titles are entered into the virtual shopping cart is performed as illustrated by the process described in FIGS. 29 and 30.

If caller 182 presses a return key as indicated by input step 2820, caller 182 is returned to the shopping mode as illustrated by step 2828.

After all of the cuts have been played to caller 182, as illustrated by a step 2832, VRU 104 prompts caller 182 to either purchase the title or return to the browsing mode. This step of prompting caller 182 is illustrated by a step 2830.

5.2 Virtual Shopping Cart

As described above, caller 182 is provided with numerous opportunities to purchase a title that he or she has selected and/or sampled. As briefly mentioned above, in one embodiment, this results in a catalog ID for the selected title being provided to interactive transaction database 112 as part of the order information for that caller's order. This is referred to as placing the title in the caller's virtual shopping cart. Also, as stated above, items placed in the shopping cart can later be removed before the purchase is completed or they can be left in the shopping cart until such time as caller 182 decides that he or she has finished shopping and wishes to complete the purchase of the selected items (i.e., until the caller checks out).

Note that the virtual shopping cart and virtual checkout station are analogous to a real shopping cart and checkout station used by a shopper in a grocery store. In the grocery store, the shopper browses among the items on the shelves. When the grocery shopper sees an item he or she wishes to purchase, the item is placed in the shopping cart. The shopper does not pay for the items until he or she is finished shopping and proceeds to the checkout station. The grocery shopper can remove items from the shopping cart before he or she checks out.

Figure 29:
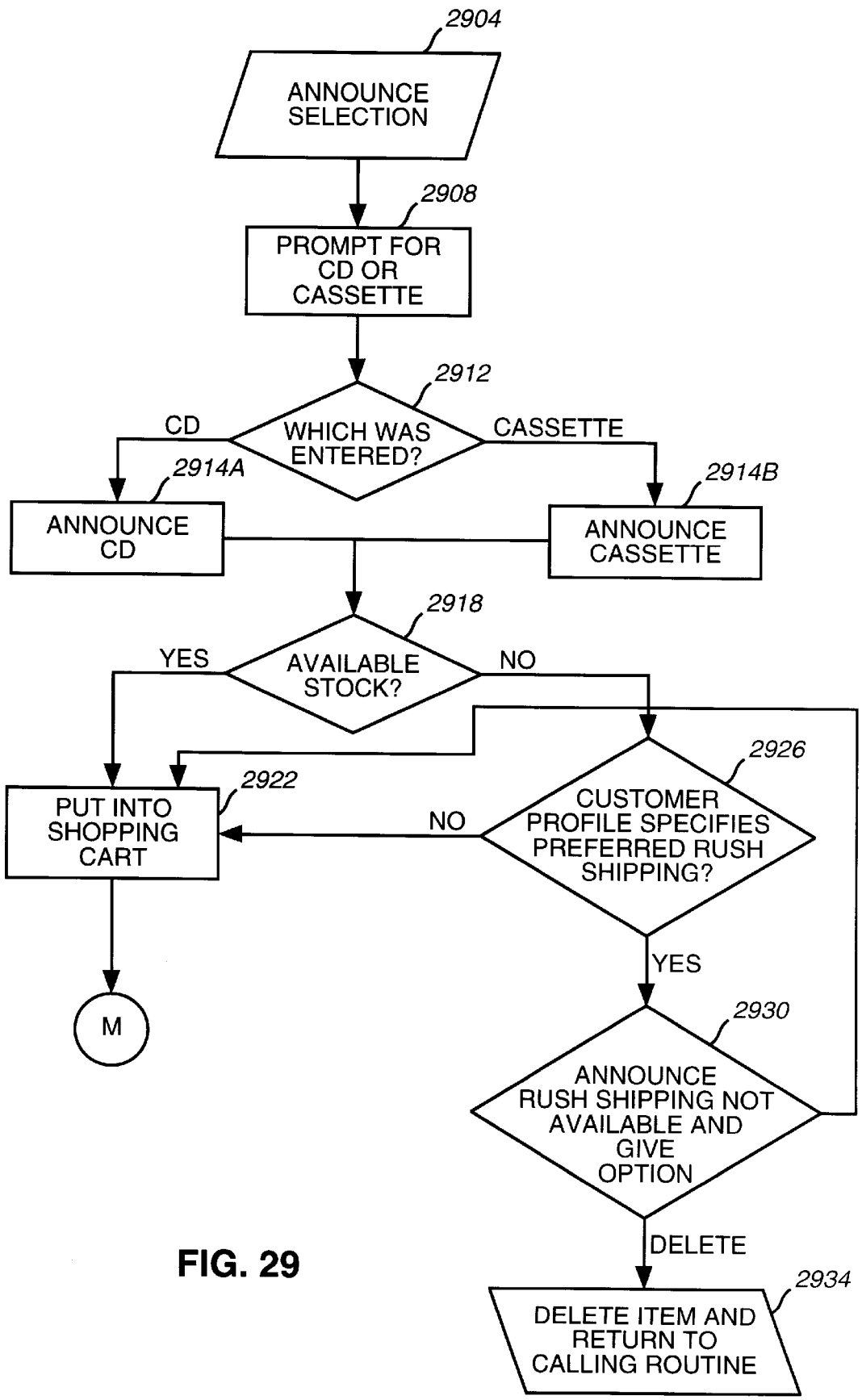
FIGS. 29 and 30 are an operational flow diagram illustrating an example process by which selected item are placed into a customers virtual shopping cart according to one embodiment of the invention.
Figure 30:
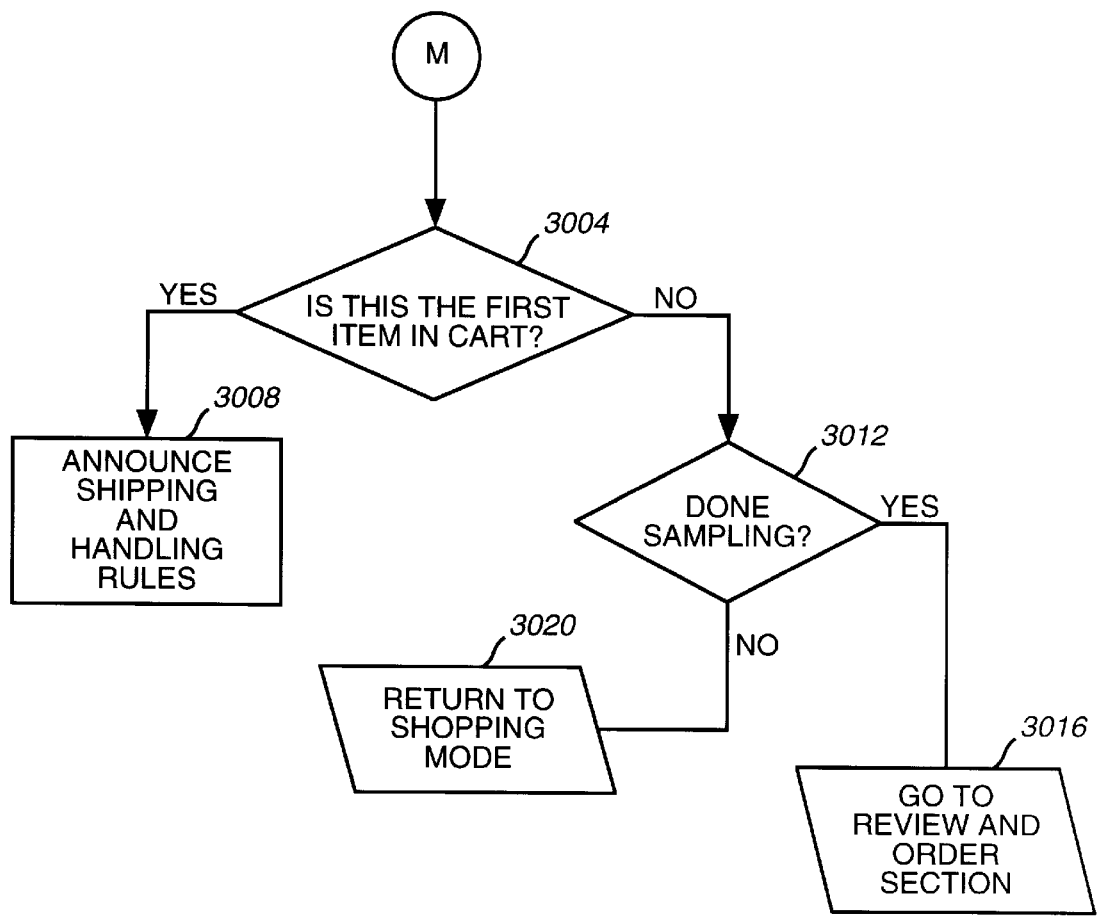

FIGS. 29 and 30 are operational flow diagrams illustrating a process by which selected items are placed into the shopper's virtual shopping cart according to one embodiment of the invention. In a step 2904, VRU 104 plays a script announcing the selection made by caller 182. In a step 2908, VRU 104 plays a script prompting caller 182 to select the type of medium on which he or she would like the title. For example, the script may prompt the caller to:

Press 1 to select a CD or press 2 to select a cassette.

In a step 2912, VRU 104 interprets the DTMF tones entered by caller 182 to determine whether the caller selected a cassette or a CD version of the title. Based on this decision, a script is played announcing which version caller 182 has selected as illustrated by steps 2914A, 2914B.

If the selected title on the selected medium is available in stock, as illustrated by decision step 2918, the item is placed into the shopper's virtual shopping cart as illustrated by a step 2922. As described above, according to one embodiment, this is accomplished by appending the catalog ID of the selected title to order information for the caller 182 stored in interactive transaction database 112. A script may be played announcing that the item has been placed in the caller's virtual shopping cart.

If the item is not available in stock for immediate delivery, VRU 104 checks the membership profile stored in interactive transaction database 112 to determine whether the caller 182 prefers rush shipping. This is illustrated by decision step 2926. If the caller 182 does not prefer rush shipping, the item is placed into the caller's virtual shopping cart as illustrated by step 2922. If, on the other hand, caller 182 prefers rush shipping VRU 104 plays a script announcing to caller 182 that the item is not available for rush shipment and to please enter a keystroke indicating whether he or she wishes to still order the item, as shown in step 2930.

If the caller 182 still wishes to order the selected title, the title is placed into the caller's virtual shopping cart in step 2922. If, on the other hand, caller 182 decides not to keep the item, VRU 104 deletes or discards the item selection and plays a script informing caller 182 that his or her selection has been canceled. This occurs in a step 2934.

The process that occurs according to one embodiment once an item has been placed into the shopper's virtual shopping cart, is illustrated by the process flow diagram of FIG. 30. Referring now to FIG. 30, when an item is placed into the caller's virtual shopping cart, VRU 104 first determines whether this is the first item placed in the caller's virtual shopping cart. This is illustrated by a decision step 3004. If this is the first item, VRU 104 announces shipping and handling rules to caller 182. These shipping and handling rules may indicate times and method of shipment and may also provide shipping options such as next-day delivery, five-day delivery, or other options. Where options are provided, scripts can also be played indicating the cost associated with each option and telling the caller which keys to press to select the desired options. All of this is illustrated by a step 3008.

Note that certain shipping and handling rules and certain delivery options can be provided to caller 182 upon entry of each item into the shopping cart. Alternatively, the shipping and handling rules can be provided to caller 182 only upon entry of the first item into the virtual shopping cart. In still another alternative, these rules can be provided to the caller before he or she "checks out."

In a step 3012, VRU 104 determines whether caller 182 is done shopping. This can be accomplished by playing a script to caller 182, asking whether he or she would like to continue shopping or whether he or she would like to go to the register and check out, and waiting for an input key in response. If caller 182 would like to continue shopping, he or she is returned to the shopping mode, as illustrated in step 3020, where selections can be browsed as described in this document. If, on the other hand, he or she would like to check out, VRU 104 begins review and order processing, as shown in step 3016. Review and order processing according to one embodiment is described further with reference to FIG. 32.

5.3 VRU Help Mode

To provide the highest level of customer support available, a help mode can be provided in VRU 104 allowing caller 182 to obtain additional instructions throughout the shopping and ordering process. Although numerous features can be provided by a help service, one embodiment allows caller 182 to obtain a system overview, listen to questions and answers about the automated product purchasing system, or allowing the caller to request to be forwarded to a customer service representative. This embodiment is illustrated in the operational flow diagram of FIG. 31.

Figure 31:
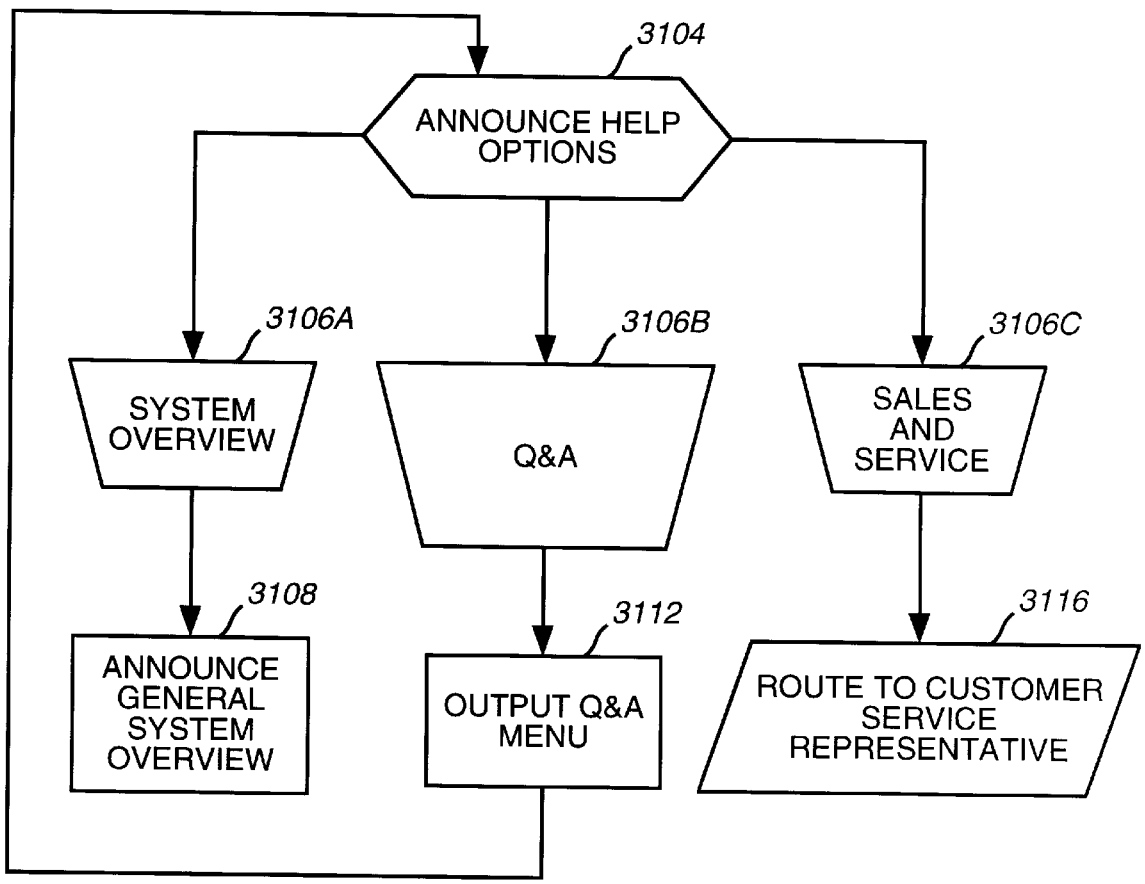
FIG. 31 is an operational flow diagram illustrating the example processed by which a help feature of the automated product purchasing system is divided according to one embodiment of the invention.

Referring now to FIG. 31, in a step 3104, when the help mode is entered, VRU 104 announces help options. For example, with the embodiment just described VRU 104 may play the following script:

To hear a brief description of how the store works, press 1. To hear answers to frequently asked questions, press 2. To become a member or to speak to a customer representative, press 0. To return to your previous location, press * now.

In response to this scripted menu, caller 182 enters the appropriate key to take him or her to the desired help feature. This is illustrated by steps 3106A, 3106B, and 3106C. Depending on the feature selected, VRU 104 may provide an announcement of a general system overview as illustrated by a step 3108, provide a list of frequently asked questions and answers as illustrated by step 3112, or route caller 182 to a sales and service representative in customer service center 108 as illustrated by step 3116.

If caller 182 selected either the system overview or the questions and answers list, once these scripts are provided, caller 182 is returned to the beginning of the help menu where help options are announced once again. Note that it may be useful to provide a help option which allows caller 182 to press a key bringing him or her back to the shopping mode.

5.4 Review and Order Processing

As described above, as caller 182 is shopping among the selections available in the automated product purchasing system, he or she may decide to purchase one or more of these items and thus place these items in the virtual shopping cart. At this point, the items are in the caller's virtual shopping basket but the purchase has not yet been completed. This situation is analogous to a customer in a grocery store who selects items for purchase from the shelves and places them in his or her shopping cart. These are items that the shopper wishes to purchase, but the purchase is not complete until the shopper proceeds to the checkout aisle and actually checks out.

Figure 32:
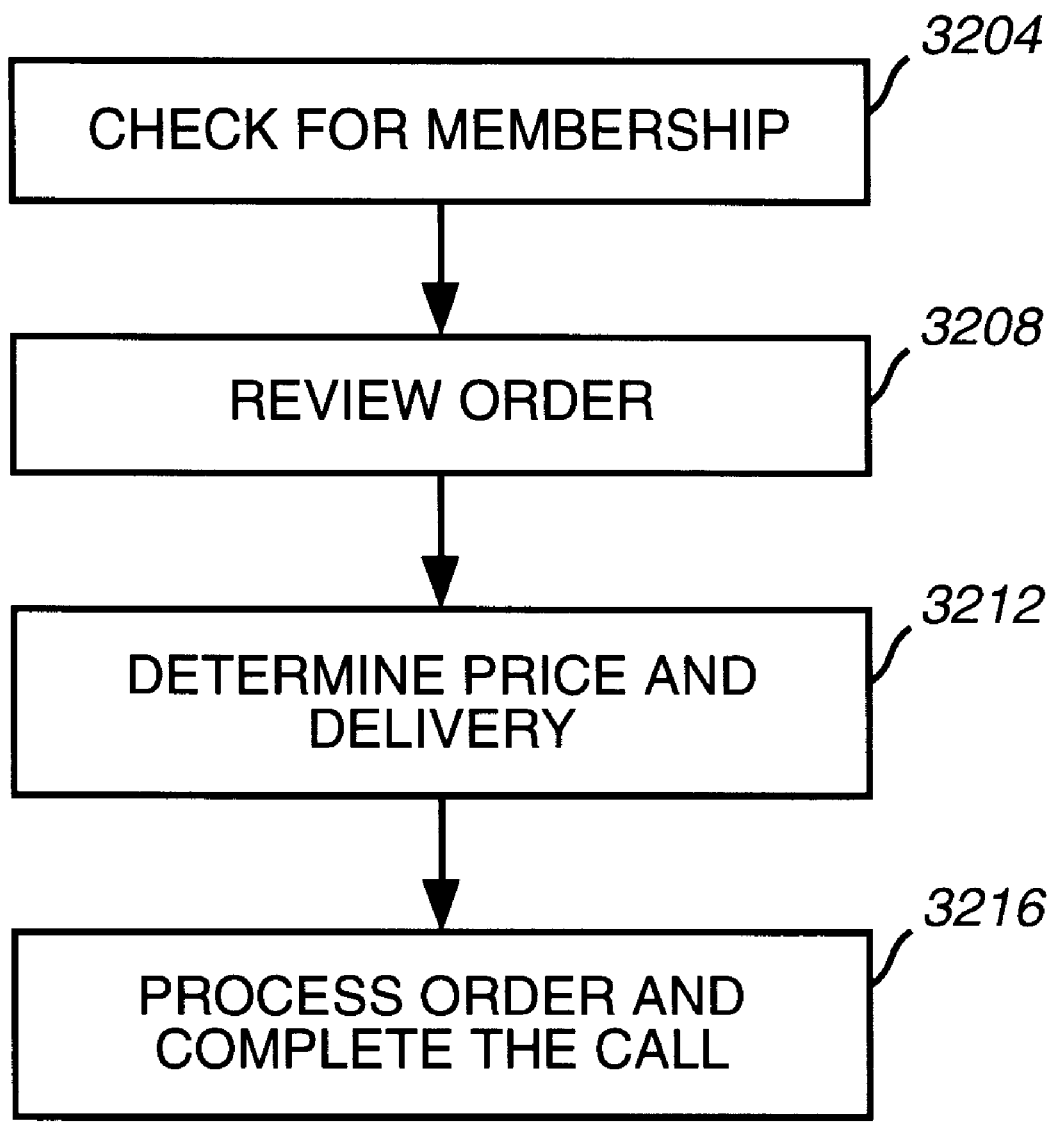
FIG. 32 is an operational flow diagram illustrating an example process by which the purchase of the order is completed according to one embodiment of the invention.

Similar to the grocery store analogy, with the automated product purchasing system, caller 182 does not actually purchase the items until he or she has "checked out." The process of checking out, according to one embodiment, is now described. FIG. 32 is an operational flow diagram illustrating a process by which a caller 182 checks out.

Referring now to FIG. 32, in a step 3204, VRU 104 checks for membership of caller 182. As described above, in one embodiment, VRU 104 prompts the caller for membership information when the caller first enters the automated product purchasing system. Alternatively, VRU 104 checks the caller for membership when an item is placed in his or her virtual shopping cart or when caller 182 proceeds to the checkout process.

Associated with a membership ID may be a PIN for security purposes. In this embodiment, VRU 104 checks the PIN and compares it with the membership ID. The system may also store an additional security code to be entered by the user to verify his or her identity.

Where caller 182 is not a member, he or she is transferred to customer service center 108 to complete the order with a customer service representative and to optionally become a member.

In one embodiment, before a caller 182 is transferred to customer service center 108, that caller's order is reviewed and caller 182 is provided with his or her order number. The process by which this review of the order is accomplished is described in further detail below with reference to FIG. 33.

Where caller 182 is a member, the automated product purchasing system continues to complete the transaction. Where caller 182 is a member, VRU 104 may retrieve membership information and prompt caller 182 to enter any profile changes if he or she desires. Member information can also be used to determine whether the membership ID is marked for possible fraud. If an indication of fraud exists, caller 182 is transferred to customer service center 108 to resolve the question. Fraud may exist where caller 182 has previously provided invalid credit card or other payment information (whether intentionally or not) or has otherwise previously attempted to defraud the system.

In a step 3208, the order is reviewed with caller 182 to verify that the items in the caller's shopping cart are the items that he or she actually wishes to purchase. In an alternative embodiment, this process of reviewing the order and providing the caller with an order number is not performed where caller 182 is a member, but is only performed where the order must be completed by a sales and service representative in customer service center 108.

In a step 3212, interactive transaction database 112 determines price and delivery information for the items in the caller's shopping cart. In one embodiment, interactive transaction database 112 calculates shipping and handling costs and also calculates a tax for the items purchased and returns this information to VRU 104. VRU 104 announces the total purchase price, the shipping price, the amount of tax on the order, and the grand total to caller 182. Finally, in a step 3216, the order is processed and the call is completed.

5.5 Order Review

Figure 33:
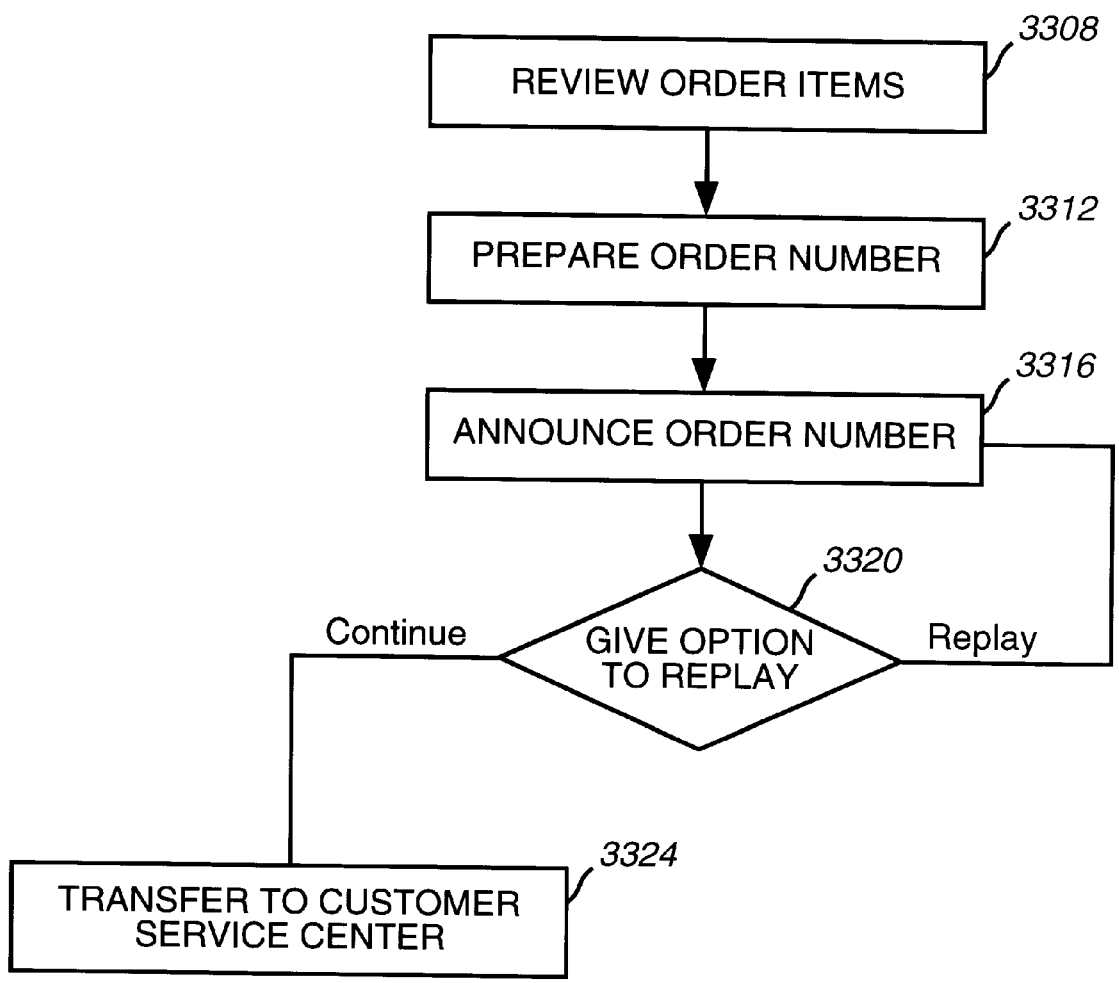
FIG. 33 is an operational flow diagram illustrating an example process by which a customer is transferred to a customer service center according to one embodiment of the invention.

As described above, in a step 3208, the order is reviewed with caller 182 before order processing is finalized. This step can be accomplished for all orders placed by a caller 182, or only for orders placed where caller 182 must first be transferred to customer service center 108 to complete the transaction. FIG. 33 is an operational flow diagram illustrating a process by which the order is reviewed, according to one embodiment of the invention. FIG. 33 specifically illustrates the review process for a situation where caller 182 is a non-member and needs to be transferred to a customer service representative after the review is completed.

Referring now to FIG. 33, in a step 3308, VRU 104 plays a script listing the items in caller's virtual shopping cart. This script informs the caller of the items that he or she selected and, optionally, the medium for each of those titles. In a step 3312, VRU 104 queries interactive transaction database 112 for an order number associated with the caller's order. In this step, VRU 104 may announce to the caller that he or she needs to prepare to take the order number and write it down in case there is a question about the order when the caller 182 is transferred to the customer service center 108.

In a step 3316, VRU 104 plays a script to caller 182 announcing the order number of the caller's order. If for some reason caller 182 did not understand the order number, he or she is given an option to replay the order number as illustrated step 3320.

Once caller 182 has the order number, the call is transferred to the customer service center by a step 3324. Note that in embodiments where the order is reviewed even where there is no need to transfer caller 182 to customer service center 108, step 3324 is skipped and the operation continues at step 3212 as illustrated in FIG. 32.

Note that where caller 182 is transferred to customer service center 108 a script is played telling caller 182 that he or she is now being transferred to a sales and service representative.

In addition to this process for order review, caller 182 may elect to review the items in his or her shopping cart so that one or more of the items may be removed from the cart prior to purchase. A process by which this is accomplished in one embodiment is described below with reference to FIG. 36.

5.6 Order Processing

During the order processing step 3216, interactive transaction database 112 verifies the caller's payment information. For example, where caller 182 is paying by credit card, interactive transaction database 112 verifies that the caller's credit is valid. In one embodiment, this is accomplished by sending a message across WAN 412 to authorization server 440. Authorization server verifies the credit information and replies with a message indicating the validity of the credit. Where the credit is not valid, caller 182 is transferred to a sales and service representative at customer service center 108. Where, on the other hand, the credit or payment information is valid, the order is processed and the transaction is completed.

Where caller 182 is purchasing the items on an account maintained by automated product purchasing system, or via a debit account maintained by automated product purchasing system, interactive transaction database 112 can do an internal check of the validity of the payment method. Such internal account information can be maintained at interactive transaction database 112 or at customer service center 108.

5.7 Shopping Time-out

In one embodiment of the automated product purchasing system, a time-out feature is included to limit the amount of time a given caller 182 is permitted to shop the selections available by automated product purchasing system. A system timer in VRU 104 keeps track of the elapsed time that caller 182 is connected to VRU 104. Additionally, VRU 104 keeps track of the actual time that caller 182 is sampling music. This is referred to as "sample time." Thus, for example, if a caller 182 is connected to VRU 104 for a minute and a half and during this time samples five selections each with a sample length of ten seconds, that caller's elapsed time is ninety seconds and his or her sample time is fifty seconds.

Time-out can be based on either the total elapsed time for the caller or by a caller's sample time. The amount of time selected for the time-out period can depend on a number of factors such as the volume of calls being handled by the automated product purchasing system as compared to the number of calls the automated product purchasing system can handle simultaneously. The time-out period can be set at different levels for different times to account for dynamics in call volume. For example, if it is determined that call volume is highest during business hours, the time-out period can be set shorter during these hours.

Additionally, different time-out periods can be established for different callers 182. For example, if caller 182 is an abuser of the system, rather than denying that caller 182 access to the system entirely, he or she may be provided limited access by shortening his or her time-out period. On the other hand, quantity buyers may be provided with additional browsing time by lengthening their time-out period.

Figure 34:
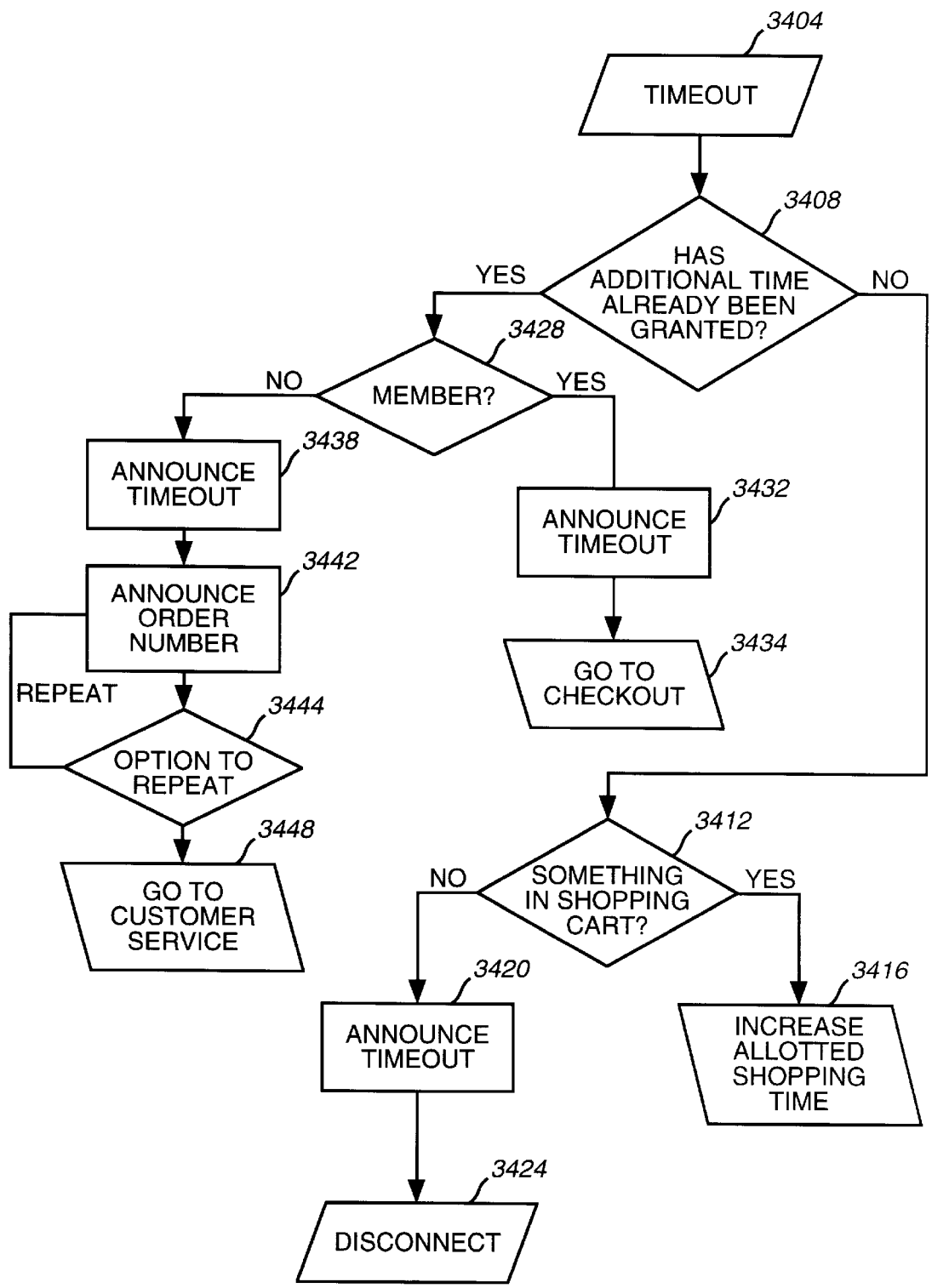
FIG. 34 is an operational flow diagram illustrating a timeout process according to one embodiment of the invention.

The manner in which the time-out period is implemented according to one embodiment of the invention is illustrated in FIG. 34. Referring now to FIG. 34 in a step 3404, VRU 104 determines that the caller's time-out period has expired. In one embodiment, additional time may be granted to the caller 182 where he or she has items in his or her virtual shopping cart. Therefore, in a step 3408 VRU 104 determines whether additional time has already been granted to caller 182.

If additional time has not already been granted, VRU 104 determines whether caller 182 has any items in his or her virtual shopping cart. This is illustrated by decision step 3412. In one embodiment, this is accomplished by VRU 104 querying interactive transaction database 112 to retrieve order information for that caller 182. If there are items in the caller's virtual shopping cart, the sampling time is increased as indicated by step 3416. If, on the other hand, there are no items in the caller's virtual shopping cart, VRU 104 plays a script announcing to caller 182 that his or her time-out period has expired. This occurs in a step 3420. In a step 3424 caller 182 is disconnected from VRU 104.

If additional time has already been granted, as determined by step 3408, or in an embodiment where the time-out period is not extended, the operation proceeds to decision step 3428 where VRU 104 determines whether caller 182 is a member.

For members, in a step 3432, VRU 104 announces to the member that his or her time-out period has expired. Additionally, if there are items in the caller's shopping cart, VRU 104 announces that it will take the caller's shopping cart to check out now. In this event, VRU 104 begins the check out process as illustrated by a step 3434.

For non-members, the occurrence of a time-out is announced as illustrated by a step 3438. Additionally, because a nonmember must speak to a customer service representative to check out any items in his or her shopping cart, VRU 104 provides caller 182 with his or her order number. This is illustrated by a step 3442. Additionally, VRU 104 provides caller 182 with an option to repeat the order number in case he or she missed the number during the first announcement. This is illustrated by a step 3444.

In a step 3448, caller 182 is forwarded to customer service center 108.

Note that in an embodiment where additional time is not granted to callers 182 regardless of whether there are any items in their cart, VRU 104 can still determine whether there is something in the shopping cart before completing the timeout process. In this manner VRU 104 knows whether to proceed to the check-out process before disconnecting the caller 182.

5.8 Check-out Process for a Timed-Out Caller

As described above, in one embodiment caller 182 may be forwarded to the checkout process as a result of his or her time-out period expiring. To accommodate this situation, during the checkout processing VRU 104 may first determine whether caller 182 arrived at the checkout register as a result of a time-out. This is illustrated by a decision step 3504. If caller 182 did not arrive at the checkout line because of a time out, order processing can continue normally as described above. If, on the other hand, caller 182 is arriving at the check out process due to a time-out, a special time-out order preprocessing process can be followed.

Figure 35:
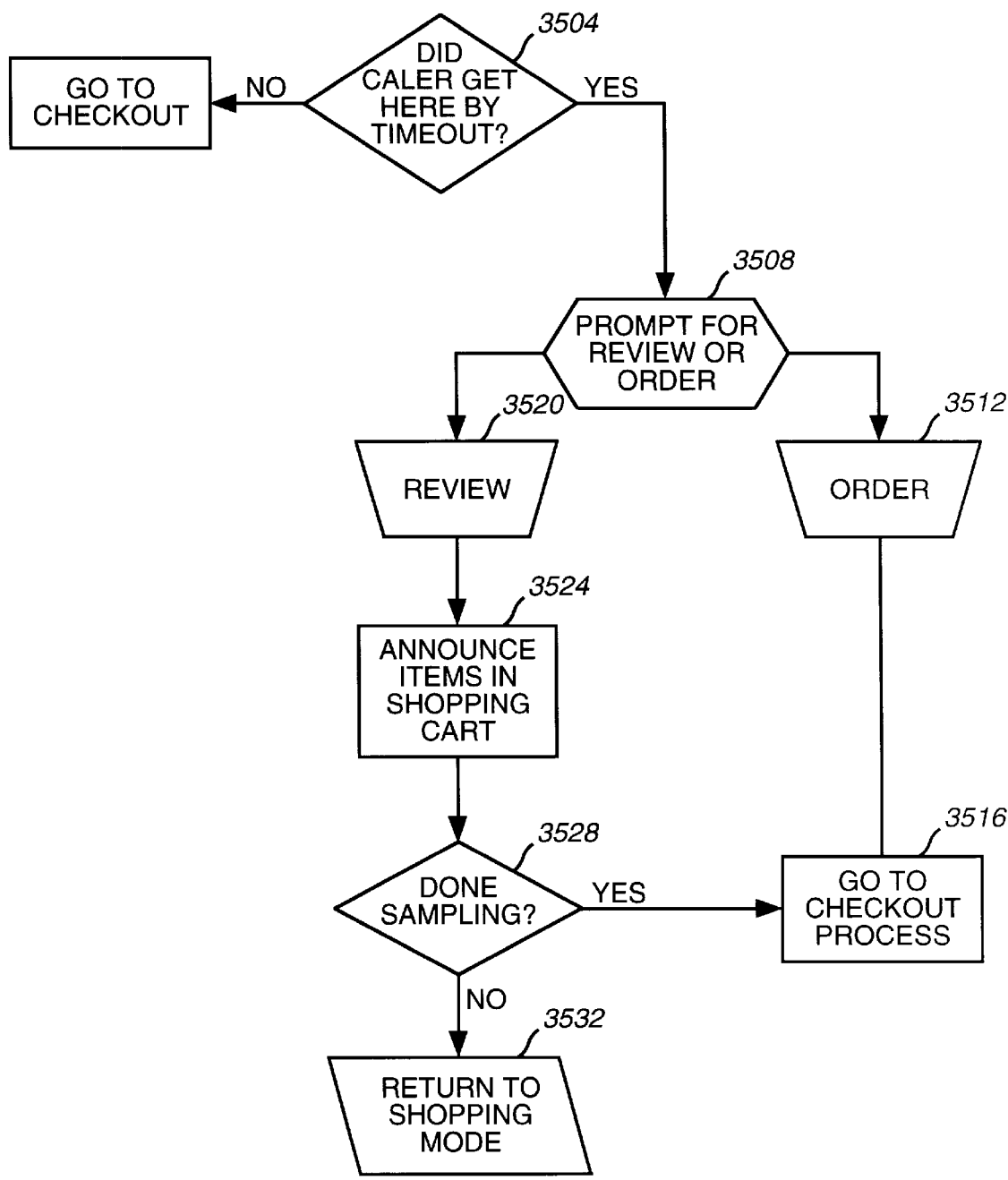
FIG. 35 is an operational flow diagram illustrating one embodiment of a process for handling a customer when his or her timeout period has expired.

FIG. 35 is an operational flow diagram illustrating time-out order preprocessing according to one embodiment of the invention. In a step 3508, VRU 104 prompts caller 182 to determine whether he or she would like to review the items in the virtual shopping cart before ordering. If caller 182 elects to order the items as illustrated by input step 3512, caller 182 is advanced to the checkout process to complete the transaction. This is illustrated by step 3516.

If, however, caller 182 elects to review the items in the virtual shopping cart, he or she presses the appropriate input key as illustrated by input step 3520. In response, in a step 3524, VRU 104 announces the items in the caller's virtual shopping cart.

In a step 3528, VRU 104 queries caller 182 to determine whether he or she is done shopping and wishes to complete the transaction. If the caller wishes to complete the transaction, the operation is continued as illustrated by a step 3516. If, however, the caller wishes to continue shopping, the caller is returned to the shopping mode as indicated by a step 3532. Note that this optional step of returning the caller to the shopping mode provides the user with additional sampling time above and beyond his or her original time-out period.

5.9 Removing Items from the Virtual Shopping Cart

Figure 36:
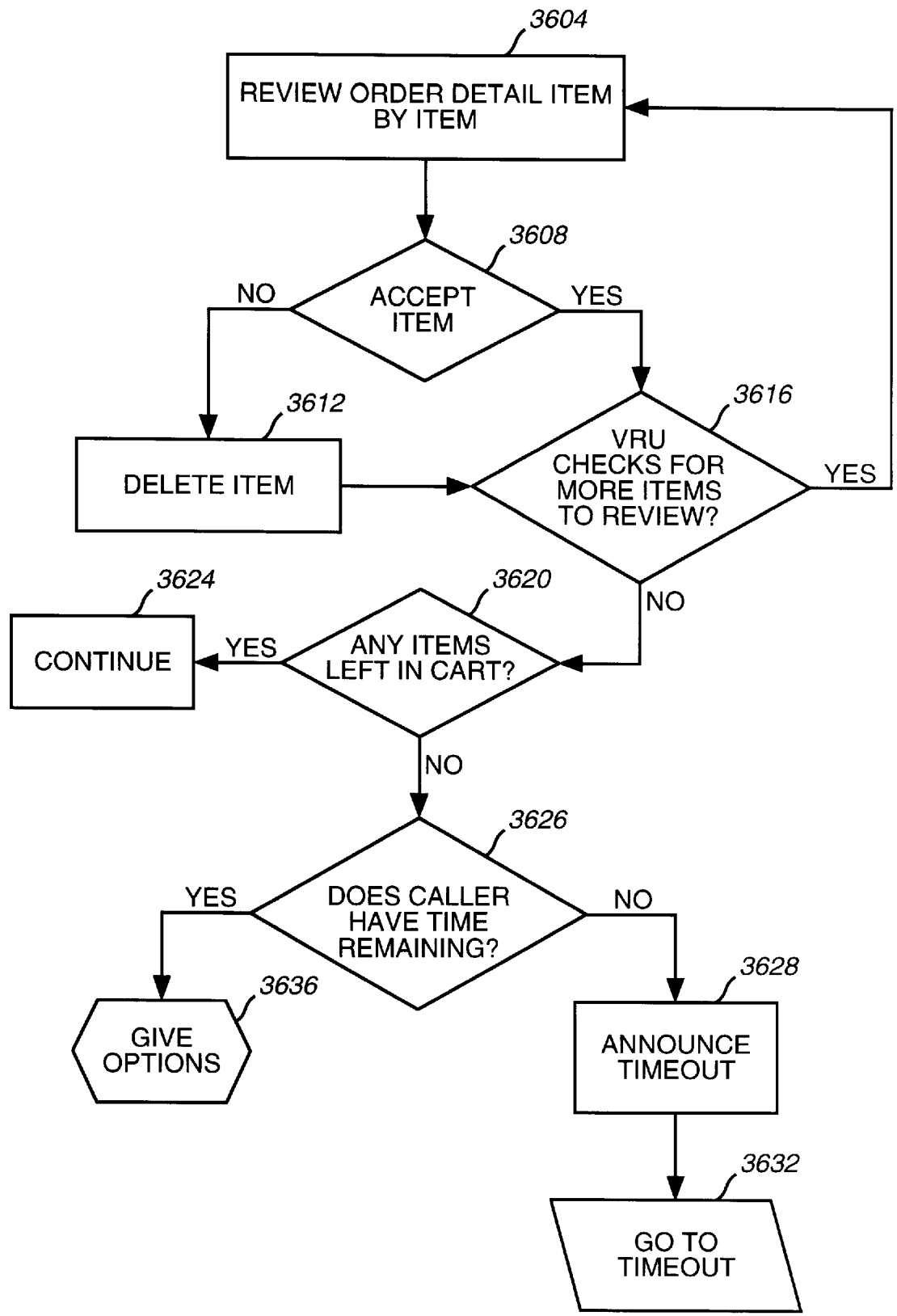
FIG. 36 is an operational flow diagram illustrating a process for editing a customer's electronic shopping cart according to one embodiment of the invention.

During the check-out process, caller 182 may be provided with scripts reviewing the items in his or her virtual shopping cart. In one embodiment, the caller may additionally be queried as to whether he or she wishes to keep those items in his or her virtual shopping cart and purchase them during the check-out process. FIG. 36 is an operational flow diagram illustrating a process by which caller 182 may be allowed to edit his or her virtual shopping cart according to one embodiment. This process can be incorporated into the item review steps described above during the routine check out process. Alternatively, this process can be invoked at any time by giving the user the option to make changes to his or her virtual shopping cart selections during the time he or she is connected to the automated product purchasing system.

Referring now to FIG. 36, in a step 3604, VRU 104 announces the items in the caller's virtual shopping cart one at a time. After each item is announced, VRU 104 queries caller 182 as to whether he or she wishes to accept this selection or to remove it from the order (i.e., from the virtual shopping cart). This is illustrated by a decision step 3608.

If caller 182 elects to remove the item from the shopping cart in a step 3612, VRU 104 deletes the item from the caller's order. In one embodiment, this is accomplished by sending a message to interactive transaction database 112 deleting the catalog ID number from the caller's order information.

After the item has been either deleted or retained, VRU 104 checks the order information to determine whether there are any additional items in the shopping cart that need to be reviewed. This is illustrated by a decision step 3616. If there are additional items in the virtual shopping cart, the operation returns to a step 3604 where the next item is reviewed and caller 182 can either accept or delete the item. This process continues until there are no more items left to review.

At this time, all items that are in the virtual shopping cart have been reviewed by the caller and accepted or deleted. In a step 3620, VRU 104 determines whether there are any items at all left in the virtual shopping cart. If there are, caller 182 is allowed to continue with the call where he or she left off. For example, if this review order process was occurring as a result of the check out process, in a step 3624, VRU 104 continues with the check out process. If, alternatively, this review process was commenced while the caller was shopping among the selections, in step 3624 VRU 104 allows the caller to continue shopping.

If, on the other hand, as a result of the changes made to the virtual shopping cart there are no more items, the call can be either terminated at that time or the caller 182 may be allowed to shop further. In one embodiment before further shopping is permitted, VRU 104 first determines whether the caller has any time remaining in his or her time-out period. This is illustrated by decision step 3626. If there is no more time remaining, VRU 104 announces the occurrence of the time-out condition in a step 3628 and the time-out process is invoked in a step 3632. A time-out process according to one embodiment of the invention is described above with reference to FIG. 34.

If, on the other hand, caller 182 has additional time remaining, in a step 3636 VRU 104 provides the caller with the options of continuing to sample more selections, going to the "Help" section, or terminating the phone call at this time.

5.10 Items on Hold

According to one embodiment of the automated product purchasing system, items that have been placed into a caller's virtual shopping cart can be held for that caller in the event that the caller is disconnected from VRU 104 before the caller actually purchases the items. This is provided as a convenience for situations where the caller 182 is unintentionally disconnected from the automated product purchasing system, or where the caller intentionally disconnects from the automated product purchasing system but later wishes to purchase those selections.

Figure 37:
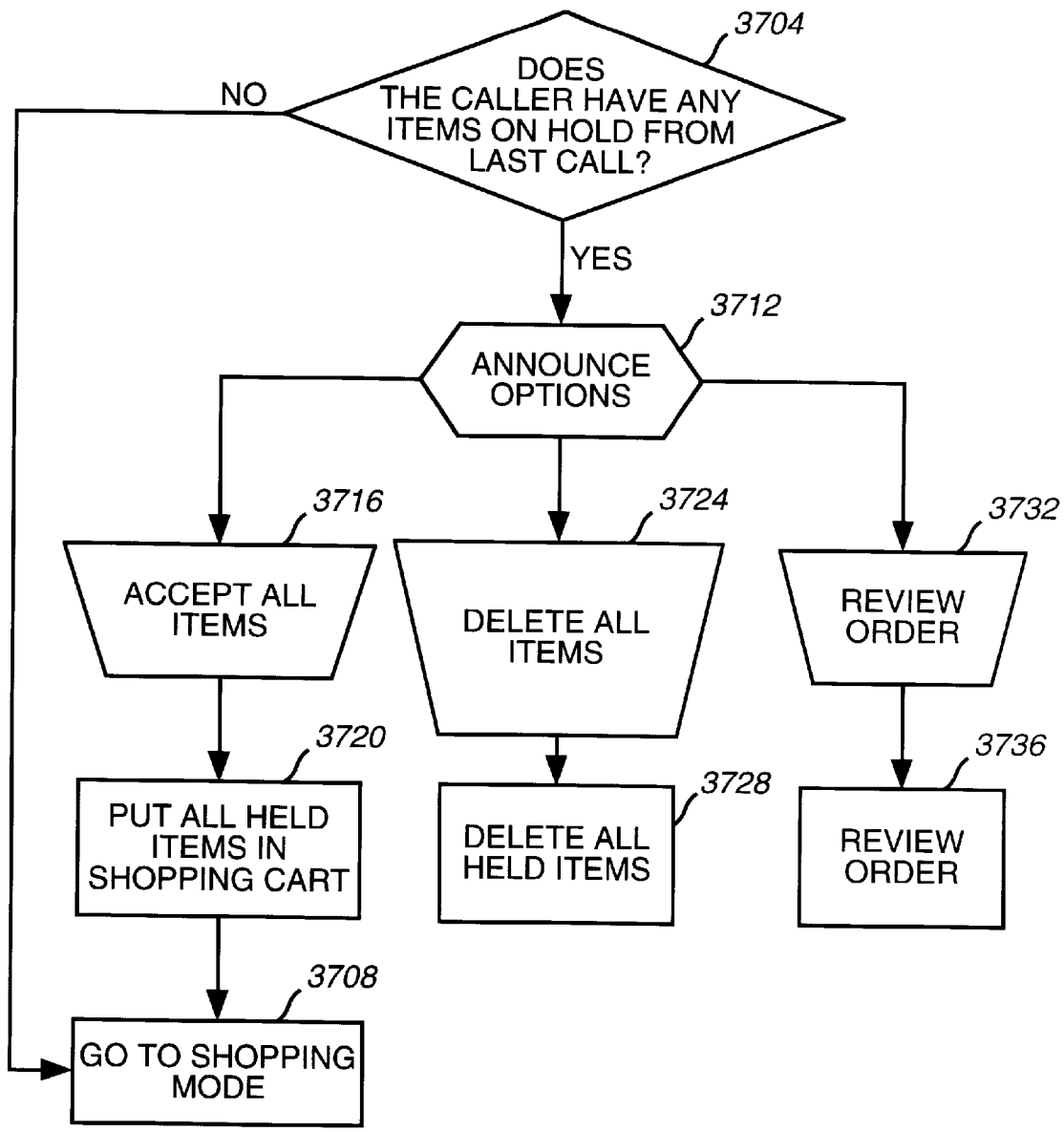
FIG. 37 is an operational flow diagram illustrating a process for handling items on hold from a previous call according to one embodiment of the invention.

A process by which items on hold are handled according to one embodiment of the invention is illustrated in FIG. 37. In one embodiment, items on hold are only maintained for callers 182 who have membership IDs. In alternative embodiments, orders can be held based on the caller's ANI or on some other attribute. In embodiments where the commutations medium is other than a telephone, the hold is made based on membership ID. For Internet access, the hold may be based on the Internet IP address of the caller's terminal. One disadvantage of using the ANI or IP address is that a different caller 182 may access the system from the same phone or Internet terminal causing the system to think that the items are on hold by this different caller 182.

Referring now to FIG. 37, in a step 3704, upon receiving a call from caller 182, VRU 104 determines whether caller 182 has any items on hold from a previous call. This status can be determined by VRU 104 retrieving any existing order information for that caller 182. Where there are no items on hold, VRU 104 immediately progresses to the shopping mode, allowing caller 182 to shop, listen to and purchase selections. This is illustrated by a step 3708.

If, alternatively, caller 182 does have items on hold, in a step 3712 VRU 104 plays a script announcing options to the caller. For example, the script may read:

> You currently have an order on hold. To review your order, press 1. To accept your order, press 2. To cancel this order, press 3.

If caller 182 decides to accept all of the items on hold as illustrated by input step 3716, VRU 104 returns all of these held items to the caller's virtual shopping cart. In one embodiment, this is accomplished by maintaining existing order information for caller 182. In an alternative embodiment, this may be accomplished by having interactive transaction database 112 open a new order, and placing these existing items into that new order. The process of returning the items to the caller's shopping cart is illustrated by a step 3720. To confirm the action, VRU 104 can play a script thanking the caller and informing him or her that the items have been placed into his or her virtual shopping cart. At this time, VRU 104 invokes the shopping mode where caller 182 can browse through additional selections or simply purchase the selections that were on hold.

If, in response to the scripted menu provided in step 3712, caller 182 decides to delete all of the items in his or her virtual shopping cart, as indicated by input step 3724, VRU 104 simply deletes these items from the order. This deletion step is illustrated by a step 3728. In one embodiment this is accomplished by deleting all the order information from the previous call and beginning anew with fresh order information for the present call. In an alternative embodiment, the deletion is accomplished by simply removing the items' catalog ID numbers 1008 from the order information in interactive transaction database 112. A confirmation script can be played by VRU 104 announcing that the order has been canceled. As with the other options, at this time the caller is returned to the shopping mode where he or she can sample additional selections or terminate the phone call.

Although not illustrated, in one embodiment, caller 182 is given the option of hearing a listing of the items in his or her virtual shopping cart before deciding whether to keep or cancel the order entirely.

Finally, caller 182 may decide to individually review the items in the virtual shopping cart and determine whether each individual item is to be kept. If this is the case, caller 182 elects to review the items on hold as illustrated by input step 3732. In response, in a step 3736, VRU 104 reviews the order with caller 182. In one embodiment, this is accomplished by a process similar to that illustrated in FIG. 36 where each item is reviewed one at a time, and caller 182 selects whether to accept or delete each item. Once the review order process is complete, caller 182 is forwarded to the shopping mode where he or she can sample additional selections, immediately purchase the selections remaining in his or her virtual shopping cart, or terminate the call.

5.11 System Access

Access to the automated product purchasing system for shopping and purchasing can be provided to users in a number of different mediums. For example, in one embodiment, access to the automated product purchasing system is provided via telephone hookup. In this scenario the user places a telephone call to dial-into the automated product purchasing system to shop through the selections and purchase products. In this embodiment, the caller is provided with audio menus prompting him or her to enter selections via the telephone keypad. Alternatively, the system produced with a telephone hookup in this manner could feature voice recognition capabilities such that the caller could enter selections and interact with the automated product purchasing system using voice commands.

In another embodiment, the medium by which the user interacts with the automated product purchasing system could be a network connection such as a the Internet network. In this embodiment, the user would access the automated product purchasing system via a network connection and browse the selections available within the automated product purchasing system. If the user finds a title about which he or she would like additional information, audio and video clips, as well as text information can be downloaded to the user's terminal to review the selection. Thus, the browsing and shopping feature of the automated product purchasing system could be provided with full multi-media browsing and shopping capabilities.

In this network embodiment, access is not gained using a telephone, but is instead gained using a computer terminal as the access tool. As such, telephone keypad entries are not needed. Instead, computer keyboard inputs and mouse inputs (such as clicking on-screen buttons) can be used as input devices.

Other communications mediums such as wireless RF links, modems, and other communications channels could be used to allow users to access the automated product purchasing system, browse available selections, and purchase products.

Although any of these communications mediums can be used to allow a user to access the automated product purchasing system, this document primarily describes the access in terms of a telephone hookup. Description of these terms is provided to facilitate an understanding of the system and how users can interface to the system in a manner that is readily understandable by every reader of this document, including lay persons. After reading this document, it will become apparent to a person skilled in the relevant art how to implement the features and the functionality of the automated product purchasing system using communications media other than the telephone link. Providing the bulk of the detailed description in terms of a single communications medium allows for continuity and flow of the document to be maximized.

6.0 Promotions and Specials

To enhance the marketability of products, in one embodiment the automated product purchasing system is provided with the capability of making special and promotional offerings to customers 182. According to this embodiment, the automated product purchasing system offers special purchase options, giveaway items, sales and other specials (generally referred to as promotions or promotional items) to shoppers during their call based on any of numerous parameters as is now described.

In one embodiment promotional items are offered to a customer 182 based on his or her calling and purchasing history. For example, in one embodiment, the automated product purchasing system review calling and purchasing statistics maintained for a shopper 182. Statistics can be maintained by VRU 104, interactive transaction database 112, or even by reporting database 438. If these statistics indicate that the shopper is a particularly good customer of the automated product purchasing system, interface unit 104 may offer a promotional or special item to that shopper 182. For example, where shopper 182 is a frequent purchaser, interface unit 104 may inform him or her that upon the next purchase, he or she will receive a bonus CD.

In addition to analyzing purchasing information of customer 182, the system may also analyze availability information for special products and make the offer based on the product availability.

Also, special or promotional items may be maintained by the automated product purchasing system as being associated with a particular product. For example, a recording artist may wish to offer a promotional T-shirt with the purchase of a particular album. In this case, this information is stored along with the album information. For example, in one embodiment, the information offering the free T-shirt may be stored with the product information at the interactive transaction database 112. When interface unit 104 requests product information (e.g., price and availability), this information is forwarded to interface unit 104 as well. Interface unit 104 plays a script to customer 182 informing him or her that a free T-shirt accompanies the purchase of the title. If customer 182 purchases the title, a catalog ID number for the T-shirt is appended to the customer's order information.

Additionally, specials or promotions may be offered at any time in the form of "sales" to shoppers in general, or to shoppers with a good purchase record.

Promotions can be created to offer special purchases or sales based on a number of metrics. For example, promotions can be set up for purchases occurring on a given day, for first-time callers, for purchases exceeding a certain amount or quantity, for a given time frame (e.g., "this weekend only", or "for the next hour") in a given area (e.g., "this weekend only in Los Angeles"), and so on.

Announcements are made to customer 182 announcing these specials. For example, for the telephone customer (caller 182), VRU 104 plays scripts announcing the specials. As another example, Internet customers have special announcements on the home page, or can access a "specials" page.

In one embodiment, promotions are capped for each order. For example, customer 182 can receive multiple promotions for a total amount up to a determined cap.

In one embodiment, electronic couponing is implemented as a form of promotion, allowing customers to take advantage of special sales of certain items. The coupons can be offered to customers in general or only to certain preferred customers. This can be accomplished by sending customers coupons by mail or via periodicals, where the coupons have a coupon number. When placing an order, customer 182 enters the coupon number with his or her order to receive the special sale. Coupons can also be advertised via television and radio as well as over the Internet.

In one embodiment, where advertised or mailed coupons are intended only for certain customers 182, the coupon number can be verified against the membership ID number to verify that the customer 182 is authorized to take advantage of that coupon offer.

In one embodiment, usage of a coupon or coupon number can be tracked along with membership information to ensure that a coupon, or one coupon number, is only used once per member. In alternative embodiments, coupons or coupon numbers can be used multiple times by a given customer 182. An example of where this is useful is where the offer is for a reduced price on purchases during a given time period regardless of the amount purchased. Allowing multiple uses of the same coupon allows such a promotion to be handled as a coupon.

Coupons can be sent or otherwise made available to preferred customers based on purchasing patterns and habits as well as product availability information. Coupons and other promotions can also be configured to offer the special deals or free offers to customers by offering them to callers based on access time. For example, electronic specials may be offered only to the first X customers (e.g., first 1,000 customers to call or sign in), or every Xth customer (e.g., every 10th customer).

As stated above, promotions can be offered to new customers. Promotions can also be established for customers who have established a membership profile but have not purchased, customers who have not ordered for a given period of time, customers located in a specific geographic area, customers accessing the service during a given time period, frequent customers, certain groups (e.g., group membership rates), customer classifications (such as telephone user, Internet user, etc.).

For customers who have not ordered in a specified period of time, interactive transaction database 112 references the last purchase data for the customer's membership number and calculates the elapsed time. For frequent customers 182, customer statistics are used to determine eligibility.

Geographic area-based promotions are determined by the caller's ANI or a portion thereof For Internet subscribers, this can be done using membership information.

Where promotions apply, the information is provided to fulfillment vendor 436 (or other supplier) so that the order can include the promotional item. This may include promotional or credit information so that the packing slip and receipt reflect the proper amount.

7.0 Retail Store Browsing and Purchasing Systems

The automated product purchasing system described above is described in terms of an environment where an individual user accesses the automated product purchasing system to shop available selections and possibly to order products in an automated fashion. This embodiment primarily contemplates that the various callers (or users accessing via other communications media) are individuals shopping for their own immediate purchases via the automated product purchasing system. It goes without saying, however, that use of the automated product purchasing system in the embodiments described above is not limited to access by individual users for immediate purchasing, but the automated product purchasing system could be used with businesses such as retail outlets to preview products prior to purchase by that retailer.

For example, a retail store such as a record store may provide access to the automated product purchasing system so that the customers of the record store could access the automated product purchasing system to sample the music selections available through the automated product purchasing system before that customer purchases a selection from the record store. Thus, record stores could provide access to the automated product purchasing system to allow record store customers to preview titles before the customer actually purchases the title.

Additionally, in this manner, customers of the record store could also comparison shop by comparing prices of the titles in the record store against prices available through ordering in the automated product purchasing system. Additionally, an alternative embodiment of the automated product purchasing system is used in conjunction with the retail outlet to facilitate purchasing at the retail outlet.

In embodiments where the automated product purchasing system is used in conjunction with a retail store, it may be important to note the relationship between the automated product purchasing system and the retail store. Where the automated product purchasing system is operated by an entity different from the record store, the record store would pay usage fees or royalties to the operator of the automated product purchasing system for the use of the automated product purchasing system by its customers.

These and other embodiments are now described in various forms in this section of the document. It is important to note that in this discussion, reference to the automated product purchasing system could be a full-functionality automated product purchasing system as described in detail above, or reference to the automated product purchasing system could refer to a reduced functionality automated product purchasing system, depending on the needs of the retail outlet.

7.1 Remote Access by a Retail Store

Figure 38:
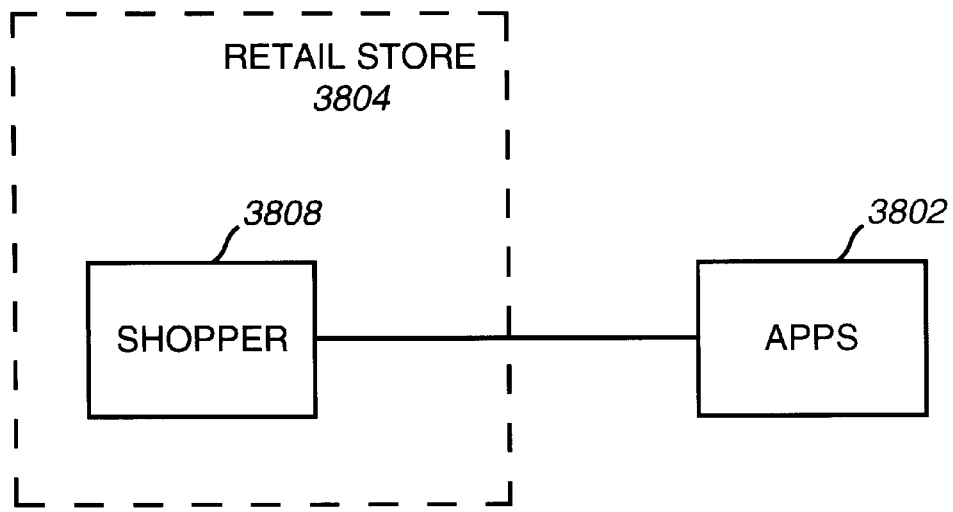
FIG. 38 is a block diagram illustrating an example scenario where the automated product purchasing system according to the invention can be used in conjunction with a retail store environment according to one embodiment of the invention.

FIG. 38 is a high level block diagram illustrating an environment where a shopper in a retail store accesses the automated product purchasing system (illustrated as APPS 3802) remotely to shop selections available by the automated product purchasing system. In this embodiment, a shopper 3808 utilizes a telephone or other communications medium to access the automated product purchasing system. An interface to the communications medium is located within retail store 3804 so that shopper 3808 can browse among and sample selections available in the automated product purchasing system while shopping at retail store 3804.

Depending on the arrangement between retail store 3804 and the operator of the automated product purchasing system 3802, the communications medium could utilize a direct line to the automated product purchasing system 3802 via, for example, microwave, satellite or cable connections, or a network such as a LAN or WAN, or a publicly accessible network such as the Internet. The customer could communicate via phone, a listening booth, a computer terminal or station, or some other interactive means.

This embodiment is particularly valuable in an environment where the product offered for sale is music, videos, software, video games or other multimedia products. In this environment, a shopper 3808 can sample selections available at the automated product purchasing system to determine whether he or she actually wishes to purchase a title before purchasing that title at retail store 3804. Thus, retail store 3804 does not have to have samples available for each of the potentially thousands of titles stocked by retail store 3804. Instead, the samples are provided to the shopper 3808 via the automated product purchasing system. Thus, even the smallest retail store could compete effectively with even the largest chain retail outlet.

Where the communications medium is a telephone, shopper 3808 is actually the same as caller 182 as described above, with the exception that the call is being placed from the retail store. If for some reason, the operator of an automated product purchasing system does not want a retail store to use the system in this fashion, the operator can utilize ANI data to block calls from that store's dialing number, or only provide limited service to such callers or to only provide that service on a toll basis, or via toll lines.

This embodiment is also useful for other products, such as computer software, movies, or other video program material, and other multi-media material. In the movie environments, shopper 3808 could sample movie selections stored at the automated product purchasing system before purchasing or renting a movie from retail store 3804. In this environment, the use of a telephone as a communications medium would obviously be less than ideal, so a video link could be utilized instead. Such a video link could be established using a direct data connection or a network data connection capable of supporting bandwidths required to transport quality video images. The video images could be displayed on a video monitor in retail store 3804 or other video display device. In addition to, or instead of, using a video monitor, the images could be accessed using other visual displays such as, for example, touch-screen interactive displays and low space utilizing displays such as LCD displays. Using wireless transmission, headphones and/or display units could be made to be portable so users could walk through the store and make selections as they go with a bar-code scanner or other device. By scanning a code on an available product, the user could sample selections from the scanned product.

Similarly, computer software and video games (generally referred to as "software titles") available for sale or rent at retail store 3804 could be sampled by shoppers 3808 remotely accessing those titles via the automated product purchasing system. In this embodiment an in-store system (for example, in-store system 3908 illustrated in FIG. 39, or interactive video displays as described above) would be provided to run the software titles samples.

The additional products described in these embodiments such as movies, video games, computer software, and other products are not limited to distribution in conjunction with the retail store environment. In a fundamental sense, the automated product purchasing system 3802 operates as a remote, interactive database for product sampling as an aid to retail marketing, promotion and sale.

As described above, the automated product purchasing system in general can be used for numerous products, including multimedia, regardless of the environment of the shopper 3808. Note that in order to fully sample more complex products such as video products and computer software products, the shopper would need to have more than a telephone hookup to do so. However even over a telephone, a shopper can at least hear product descriptions to order alternative products via the telephone as described above.

Figure 39:
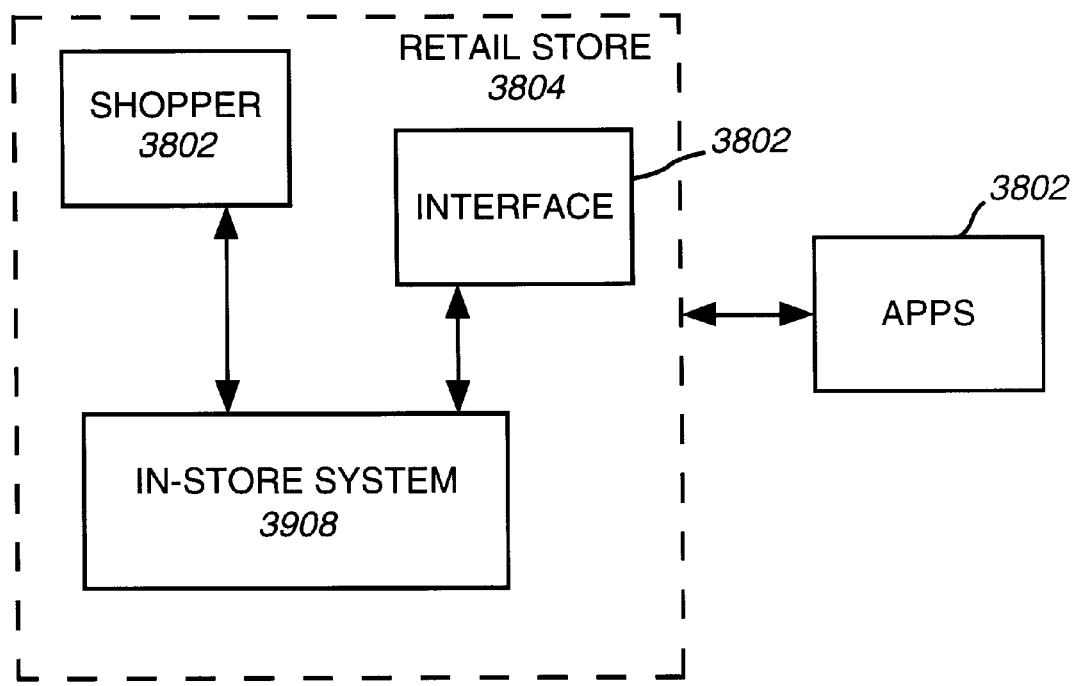
FIG. 39 is an operational flow diagram illustrating an example architecture for an in-store interface to the automated product purchasing system.

FIG. 39 is a block diagram illustrating a slightly more complex embodiment where the automated product purchasing system is used in conjunction with a retail store 3804. Referring now to FIG. 39, in this embodiment retail store 3804 further includes an in-store system 3908. In an embodiment where retail store 3804 is a music store, in-store system 3908 could be, for example, an in-house music sampling system. For example, many music stores today have juke box or other systems where shoppers can pick up a pair of headphones and listen to selected titles available in the store. Typically, the amount of music that can be sampled by these systems is limited as it is not practical for music stores to provide numerous titles in a jukebox fashion.

In one embodiment, this in-store sampling system 3908 can allow the shopper 3808 to also access the automated product purchasing system to sample additional selections. For example, in one embodiment a button is included on in-store system 3908 that, when pressed by the shopper, connects the shopper to the automated product purchasing system. Thus, shopper 3808 could listen to selections available from the in-store jukebox and then listen to selections available from the automated product purchasing system 3802 through the headphones provided by in-store system 3908. An input keypad or a mouthpiece microphone could be provided with in-store system 3908 to allow shopper 3808 to navigate through the various automated product purchasing system selections.

Additionally, in one embodiment, a portable bar code scanner or other reading/sensing device can be carried through retail store 3804 so that a customer can scan in a code for a desired product. The portable bar-code scanner provides the product code to in-store system 3908. In-store system 3908 communicates this information to the automated product purchasing system to request sampling for that product.

In another embodiment, in-store system 3908 could be a more complex system such as a computer terminal that allows shoppers to browse through various selections and obtain audio, video, and textual information about the selections. This system, too, could allow shopper 3808 to interface through the automated product purchasing system to expand the number of titles that can be browsed. The system could be designed to accommodate user-friendly features such as touch-screen inputting. Touch-screen or other inputs, such as keyboard, mouse and voice, provided by in-store system 3908 can be used to allow shopper 3808 to navigate through the automated product purchasing system.

In the retail store embodiments described above, it is not necessary that instore system 3908 and the automated product purchasing system are designed as a part of an integrated package. Instead, in-store system 3908 is designed (or existing in-store systems 3908 are modified) to communicate with the automated product purchasing system regardless of whether the automated product purchasing system was intended to be interfaced with such an in-store system 3908. Where in-store system 3908 and the automated product purchasing system are not designed as integrated systems, an interface may be provided to allow an existing in-store system to interface to the automated product purchasing system. Thus, interface 3812 would interpret commands input into in-store 3908 and format these commands to that they are compatible with the automated product purchasing system. In the other direction, interface 3812 would accept data such as menu screens or other user prompts from the automated product purchasing system and format them so that they can be displayed or otherwise provided to shopper 3808 via the in-store system 3908. Thus, in this embodiment, an automated product purchasing system can be interfaced to an existing in-store system to expand the functionality provided by the in-store system even where the automated product purchasing system was not originally designed to interface with an in-store system 3908.

Figure 40:
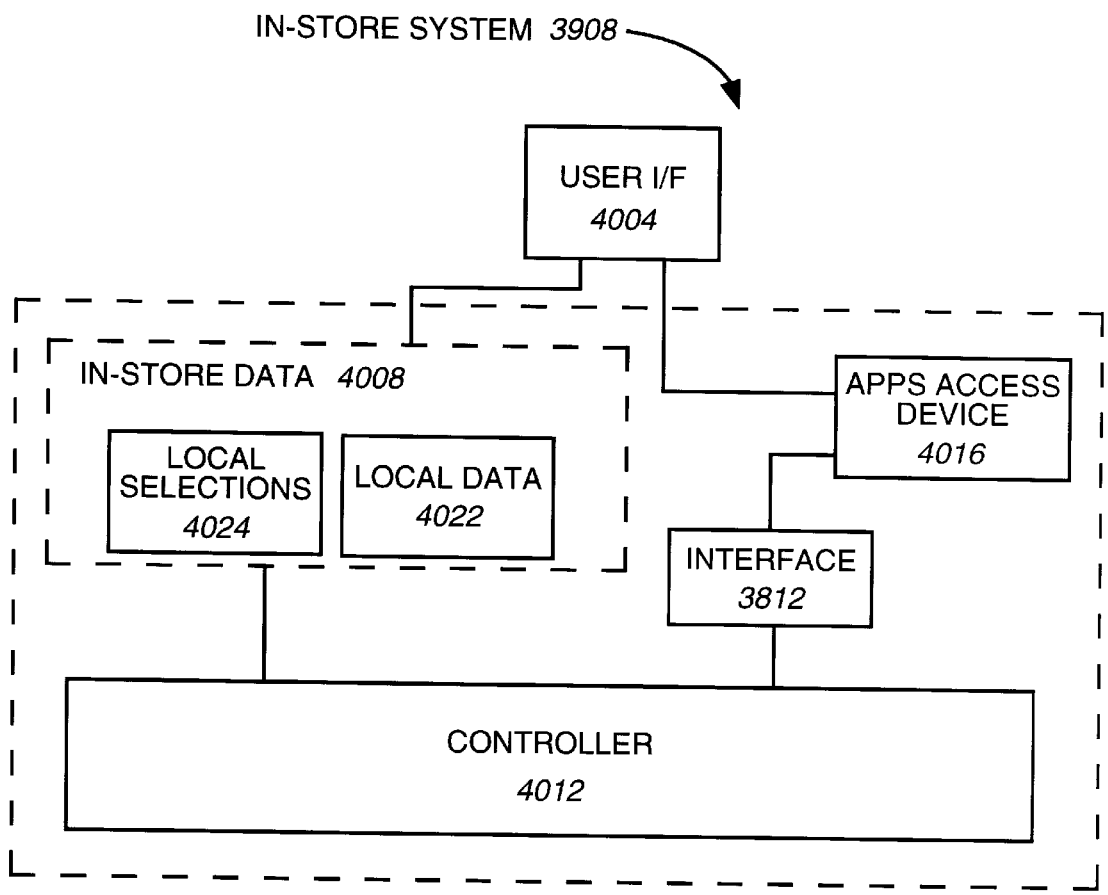
FIG. 40 is an operation flow diagram illustrating an example architecture for an in-store system according to one embodiment of the invention.

An example architecture for in-store system 3908 is illustrated in FIG. 40. FIG. 40 is provided as an example architecture only. After reading this description, it will become apparent to a person skilled in the relevant art how to provide in-store systems 3908 using alternative architectures. In the example illustrated in FIG. 40, in-store system 3908 includes a user interface 4004, in-store data 4008, a controller 4012, and an automated product purchasing system access device 4016.

User interface 4004 is the interface provided to shopper 3808 so that he or she can operate the in-store system. For example, in the simple juke box embodiment described above, user interface 4004 is comprised of a pair of headphones and a keypad or mouthpiece microphone. User interface 4004 can also include a display device such as an LCD display or a computer terminal, such as a touch-screen terminal.

In-store data 4008 comprises data maintained at the retail store 3804 location. For example, in-store data 4008 can include local selections 4024 that can sampled by the shopper 3808 without accessing the automated product purchasing system. These local selections, for example, could be CDs in a juke box in the retail store 3804 or samples of media selections stored on a hard disk or other randomly accessible medium.

In-store data 4008 also can include data pertaining to selections available at the retail store 3804. For example, in one embodiment, local data 4022 can include a price list and an inventory of all the titles available at retail store 3804. This can be provided to shopper 3808 via user interface 4004 while he or she is browsing selections either locally or via the automated product purchasing system, so that shopper 3808 knows what the items cost at the retail store and whether or not they are available in the retail store's inventory. In-store data 4008 can also include additional descriptions of in-store selections, concert information for local concerts, and other useful information.

An important aspect of utilizing an automated product purchasing system in conjunction with a retail-store environment where the automated product purchasing system is not intended to be used by retail stores 3804, is that the automated product purchasing system allows customers 3808 to make remote purchases from the automated product purchasing system. Obviously, a retail store 3804 would not want its customers accessing the automated product purchasing system from its store and purchasing products from the automated product purchasing system rather than from the retail store 3804.

Retail stores 3804 can avoid this situation by pricing their products more competitively than the automated product purchasing system, and by allowing customers using the automated product purchasing system to compare prices in real time. In one embodiment, this is accomplished by providing customers 3808 with a price list of products available in the retail stores 3804 so that customers 3808 can compare the in-store prices with prices received from the automated product purchasing system. In this embodiment, customers 3808 can enter a code into in-store system 3908 identifying a product so that in-store system can provide an in-store price for the product. The code can be keyed into in-store system 3908, scanned in (e.g., using a bar code scanner) or entered by other data entry means.

In an alternative embodiment, the in-store prices can be stored electronically in in-store system 3908. For example, the in-store prices can be stored as local data 4022. In-store system 3908 can cross reference an automated product purchasing system product code entered by the customer with the in-store product code and provide in-store price information for the same product. Selections entered by the customer 3808 when browsing through the automated product purchasing system selections can be detected by in-store system 3908 using voice recognition, DTMF tones, or some other detection means that detects the selection entered by the customer. Of course the means selected for detecting customer input depends on the means by which customer 3808 is accessing the automated product purchasing system.

Where sampled products are identified by customer 3808 to the automated product purchasing system using common names such as a product name, model number, or other product-related identifier, in-store system 3908 can easily identify the product being previewed using the automated product purchasing system. However, where products are identified by some automated product purchasing system defined code (such as, for example, an automated product purchasing system catalog ID number), cross referencing can be difficult without access to the list of codes. Note however that these codes can be obtained where the automated product purchasing system provides a catalog listing the catalog ID number for each product.

Controller 4012 is used to control the operation of in-store system 3908. Automated product purchasing system access device 4016 provides the access to the automated product purchasing system. For example, automated product purchasing system access device may be a modem or a network connection allowing in-store system to connect to the automated product purchasing system. Note that where necessary for translation of data, an interface 3812 may be provided in in-store system 3908 as described above with reference to FIG. 39.

7.2 Automated Retail Outlet

Figure 41:
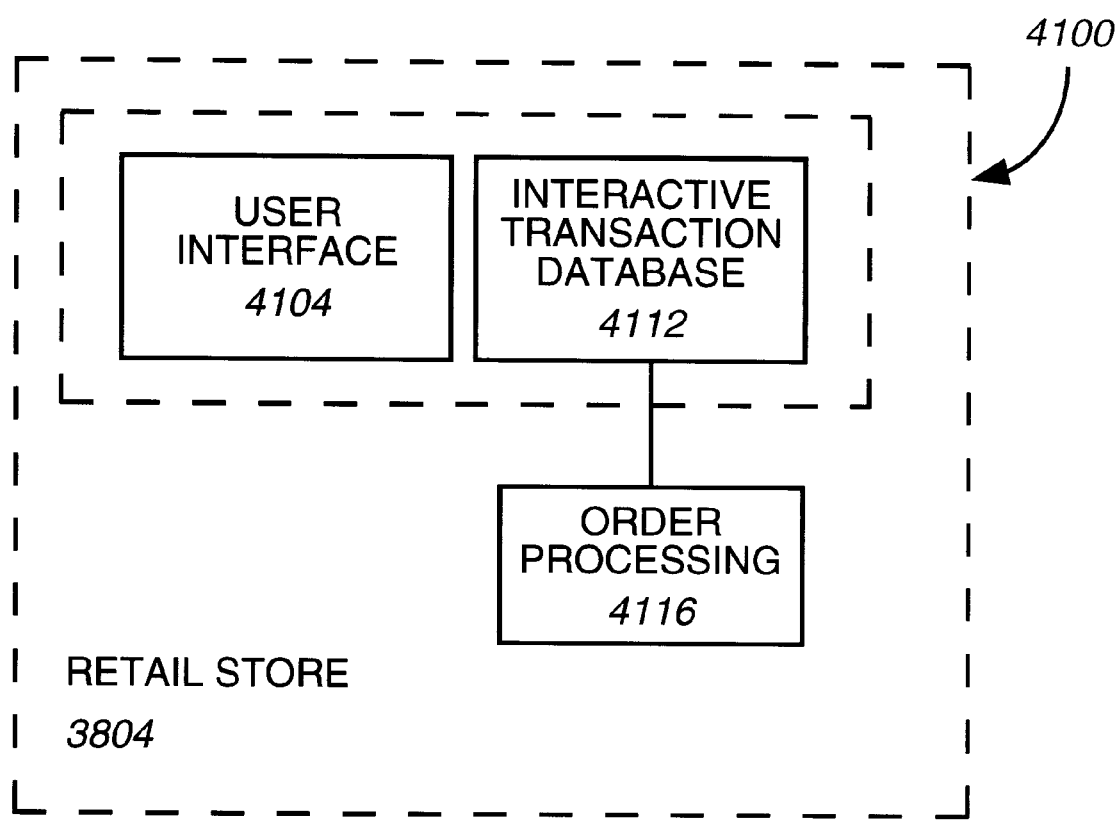
FIG. 41 is a block diagram illustrating an example architecture for an instore automated product purchasing system according to one embodiment of the invention.

In yet another embodiment, automated product purchasing system can be configured such that it can be ideally integrated into the environment of a retail store. In this embodiment, the majority, if not all, of the automated product purchasing system functionality is implemented in the retail store and is accessed by a customer shopping in that retail store. FIG. 41 is a high level block diagram illustrating an example architecture for such a configuration.

Referring now to FIG. 41, in this embodiment, an automated product purchasing system (illustrated as 4100 in FIG. 41) in a retail store environment includes a user interface 4104 and an interactive transaction database 4112. Automated product purchasing system 4100 interfaces to an order processing center 4116. In this architecture, user interface 4104 is analogous to user interface 104 as described above, and interactive transaction database 4112 is analogous to interactive transaction database 112 as described above.

User interface 4104 provides an interface by which a customer of retail store 3804 can browse available selections in retail store 3804 and place orders. Interactive transaction database 4112 contains the necessary data required to facilitate the browsing and purchasing of products by the customer.

In one embodiment, user interface 4104 and interactive transaction database 4112 are implemented in a manner similar to that in which user interface 104 and interactive transaction database 112 are implemented in a VRU site 460 as illustrated in FIG. 4. In this embodiment, user interface 4104 provides the desired audio, video and data interfaces to the customer and also contains all the data used to allow the customer to peruse and sample the selections. Thus, the data structure provided by user interface 4104 in this embodiment is very similar to the data structure described above for VRU 104 in FIG. 9.

Similarly, in this embodiment, interactive transaction database 4112 provides similar functionality and includes similar data types as those provided by interactive transaction database 112 described above and listed in FIG. 12. Note, however, that it may not be desirable to maintain shipping and delivery information as this is a retail store environment where shipping may not be a concern. However, customers visiting retail store 3804 from out of town or in other circumstances may wish to have a product shipped to a particular area, in which case such shipping information would be beneficial. Further note that tax information may be maintained to enable tax computation for the purchases. Tax information for other jurisdictions can also be maintained where it is anticipated that orders may be shipped to those jurisdictions by retail store 3804.

In addition, depending on the organization of retail store 3804, customer selections can be located and transported to a pick-up site within the store by either human clerks or using automated equipment. To facilitate such an embodiment, customer identification and pick-up location information can be maintained as well.

The architecture of automated product purchasing system 4100 can be implemented similar to that of a VRU site 460. However, because this is an in-store system, there is no need for a remote connection via telephone. Therefore, user interface 104 need not be a VRU 104. Note that it is not necessary that this architecture for site 460 be strictly followed. As is the case with VRU site 460 in the embodiments described above, the architecture illustrated in FIG. 4 is simply one example architecture and variations thereon are permitted. For example, user interface 4104 and interactive transaction database 4112 can be implemented as a personal computer or other computer system with a database contained therein.

The capabilities provided by the user interface 4104 may vary depending on the products being offered. For example, where the products are complex software packages or multimedia products, user interface 4104 is provided with the functionality and power necessary to allow a customer to sample these packages thereon.

Where the product is strictly music, an audio interface to the customer is useful to allow the customer to hear the music samples. For products that are strictly music, interfaces more complex than audio interfaces are not required.

Various input methods can be provided so that the customer can input selections and navigate throughout the selections. Examples can include a keyboard input, a voice recognition system, a mouse, a touch screen and other like input devices.

Once a customer has ordered one or more selections via user interface 4104, user interface 4104 compiles order information in interactive transaction database 4112, and sends the order to an order processing system 4116. Order processing system 4116 gathers the selected items so that they can be provided to the customer. Order processing system 4116 can be an in-house order processing facility, a mail order facility such as, for example, fulfillment center 436, a warehouse, a centralized redemption center or other like facility.

In one embodiment, for example, a customer 3808 at a remote location can access an automated product purchasing system associated with a retail store 3804. The customer 3808 could sample selections and make purchases via the automated product purchasing system. The automated product purchasing system notifies the retail store 3804 of the customer's order. Then the customer 3808 can go to retail store 3804 to pick-up the items. Payment can be made via the automated product purchasing system or at retail store 3804.

Figure 42:
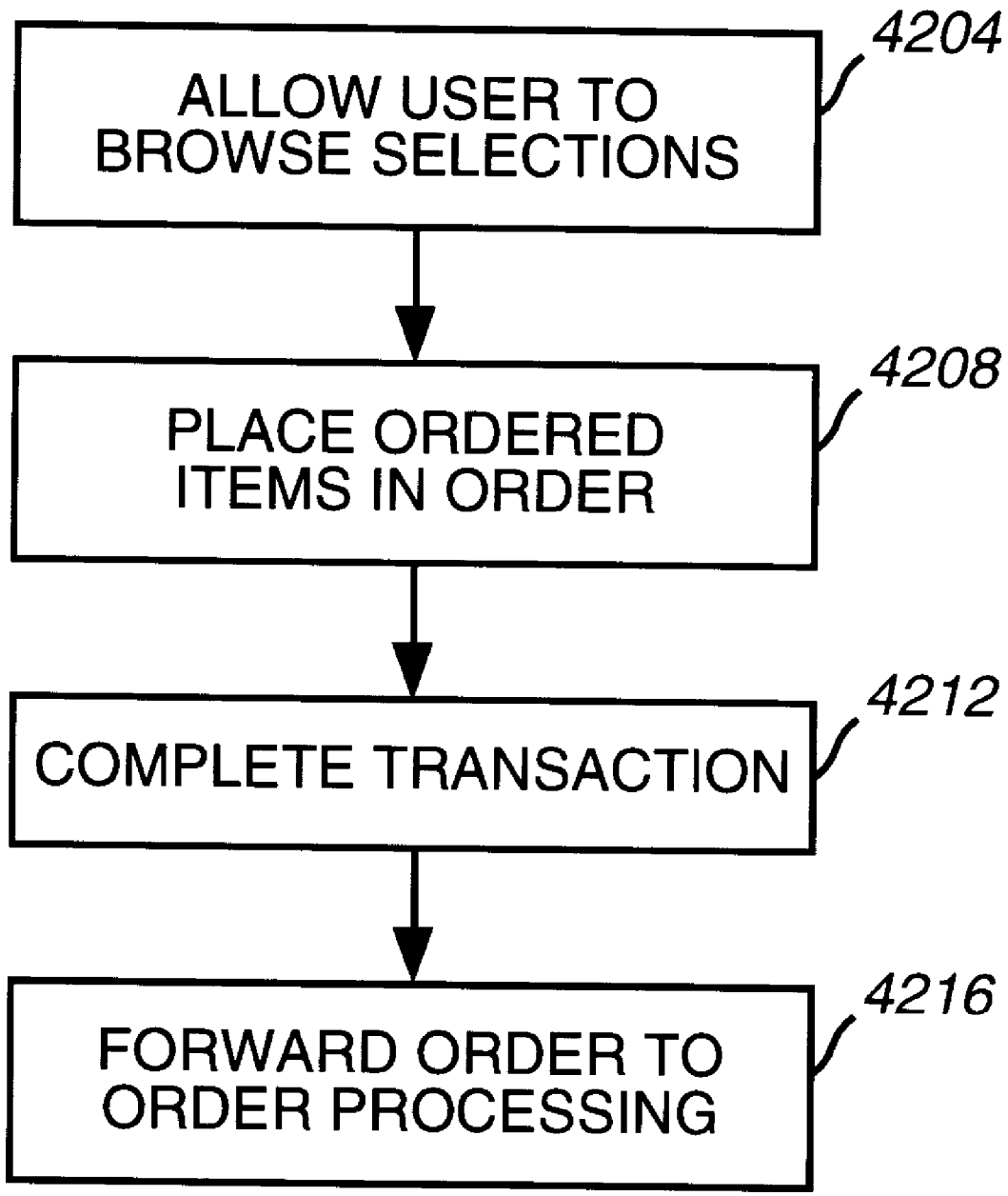
FIG. 42 is an operational flow diagram illustrating a process of previewing and purchasing objects with a n in-store automated product purchasing system according to one embodiment of the invention.

FIG. 42 is an operational flow diagram illustrating an example process by which the architecture illustrated in FIG. 41 facilitates automated retail shopping. In a step 4204, user interface 4104 allows the customer to browse the selections available in retail store 3804. This browsing can be accomplished in a number of different ways, including, for example, the browsing and sampling of music selections as described in great detail above with various embodiments of the remote automated product purchasing system.

Where the product is music, the customer is allowed to listen and sample music selections before ordering an item. Where the product is videos, video games, computer software, or multimedia products, the customer is allowed to sample these products before placing an order. For movies or other video products, the customer may be played a brief sample clip of the title. For video games, the user may be allowed to play a demo version of the game. And so on.

While the customer is browsing, if he or she comes upon an item that he or she would like to purchase, the customer enters his or her choice at the user interface 4104. In response, in a step 4208, user interface 4104 places the ordered items in the customer's order. In one embodiment, user interface 4104 places the item in the customer's virtual shopping cart. In one embodiment, this is accomplished by appending a catalog identification number for the selected item into an order file for the customer.

As with the embodiments of the remote automated product purchasing system described above, the customer is allowed to continue to browse before finalizing his or her selections and checking out. Once the customer has finalized his or her selections, user interface 4104 completes the transaction as illustrated by a step 4212. Step 4212 can be accomplished in a manner similar to the check out procedures described above, with the remote automated product purchasing system.

Where the customer is a member of the service, that customer's profile information can be maintained on file and payment of the order can be made automatically if the customer so desires. Alternatively, the customer can chose to enter credit card or ATM information via user interface 4104. In this embodiment, this information can be entered using input keys or a touch screen display at user interface 4104. Additionally, a card reader or other device reader can be provided at user interface 4104 to read the customer's payment information.

To ensure user security, membership ID numbers and PIN numbers can also be maintained in this retail store embodiment. In summary, all the features and advantages described above with reference to the automated product purchasing system described in terms of the music ordering service can be incorporated into the retail store embodiment, including variations on the user interface. Note that for an in-store embodiment, a telephone interface is generally not required. However, the interface can be provided by voice recognition, a computer keypad, a touch screen display screen, or other interface means.

In a step 4216, once the transaction is completed, the order information is forwarded to order processing center 4116 to process the order. Order processing center 4116 takes the order information and fills the customer's order. Order processing center can be implemented using workers who read the order information and retrieve the items from the store shelves to be provided to the customer who purchased those items. In one embodiment, when the customer completes the transaction, a sales slip is printed by user interface 4104. This sales slip includes an order number that can be used to reference the order. The customer provides this sales slip to order processing center 4116 to pick up the order when it is ready. This ensures that the completed order is not given to someone other than the customer who placed that order.

In an alternative embodiment, the membership number is provided along with the order to the order processing center. In this embodiment, the member simply needs to present his or her membership ID card to the order processing center 4116 to pick up his or her order. Again, PINs can be used to prevent the use of stolen membership cards or IDs.

7.3 Automated Order Processing Center

Figure 43:
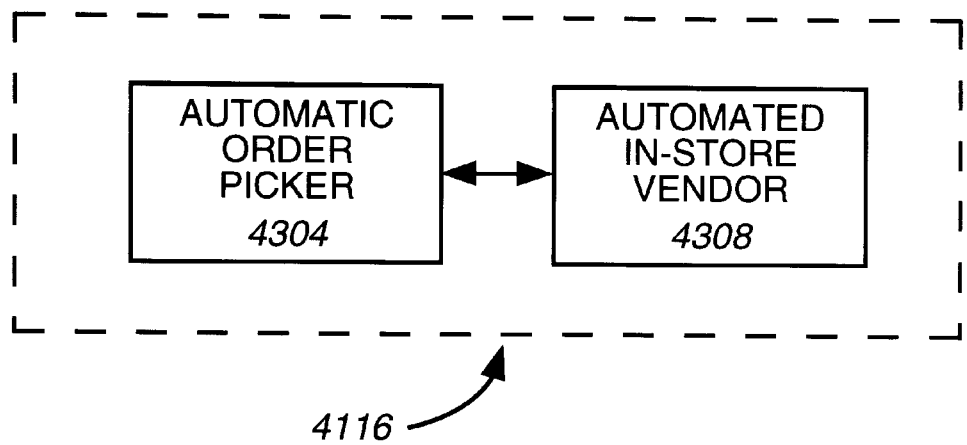
FIG. 43 is a block diagram illustrating an example architecture for an automated in-store order fulfillment center.

In yet another embodiment, order processing center 4116 is also automated. FIG. 43 is a high level block diagram illustrating an automated order processing center 4116. Order processing center in this automated embodiment includes an automated order picker 4304 and an automated in-store vendor 4308. Automated order picker 4304 is an automated system for retrieving items in an automated warehouse or storehouse. Automated in-store vendor 4308 is an automated device for providing the retrieved order to the customer. The manner in which the automated order processing center 4116 operates, according to one embodiment of the invention, is described in FIG. 44.

Figure 44:
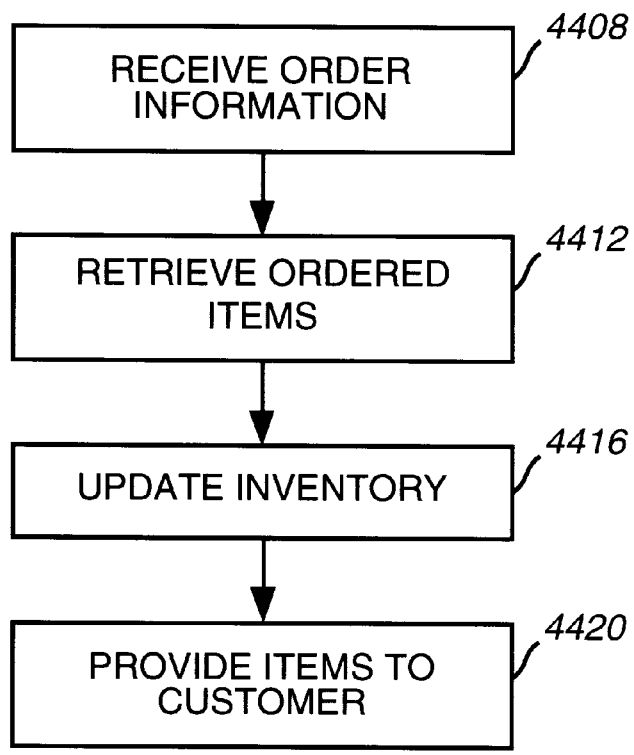
FIG. 44 is an operational flow diagram illustrating an example process by which the automated in-store order fulfillment center operates according to one embodiment of the invention.

Referring now to FIG. 44, in a step 4408 automated order picker 4304 receives the order information. Order information includes at a minimum a listing of the items ordered by the customer. Automated order information can further include location information indicating to automated order picker 4304 where those items can be found in the warehouse (for example, shelf or bin number). Where interactive transaction database 4112 provides the location information to automated order picker 4304, the information can be maintained by interactive transaction database 4112.

Alternatively, in another embodiment, this location information can be maintained by the automated order picker 4304 in its own database. In this embodiment, when an order is received, order picker 4304 looks up a location for each item in the order.

In a step 4412, automatic order picker 4304 retrieves their ordered items from their designated locations. As items are removed from the warehouse shelves, or after the order is filled, automatic order picker updates the inventory to reflect the fact that the item has been sold. This occurs in a step 4416. Inventory updates can be provided back to interactive transaction database 4112, such that interactive transaction database 4112 can provide availability information to the customer. Alternatively, the inventory can be maintained fully at the automatic order picker 4304 and this information queried as a user is browsing the products or when the user places an order for a product. Automatic order picker 4304 can interface with interactive transaction database 4112 via a direct connection, via a local area network or via other communications means.

In a step 4420 automatic order picker 4304 provides the completed order to automated in-store vendor where these items are provided to the customer. Automated in-store vendor is an automated vending machine which receives the ordered items and from automatic order picker 4304 and provides them to the customer. In one embodiment, automated in-store vendor 4308 is a vending machine having a secured access bay. Items are placed into this bay by automatic order picker 4304 as the order is being completed. Once the order is completed, the customer can open an access door and retrieve the selected items.

For security reasons, in one embodiment the customer is required to enter his membership ID and PIN into automated in-store vendor 4308 in order to access the secured bay. Alternative means are available for ensuring the security of the vended items, such as providing the user with an access code at the time the sale is completed. In yet another embodiment, the vending machine can be collocated with user interface 3804 so that the items are provided directly to the customer upon completion of the order. An advantage of separate vending machines, however, is that the customer does not have to "tie up" user interface 3804 while waiting for the order to be filled.

In an alternative embodiment, order processing center 4116 can be semi-automated by having automated order pickers 4304 retrieve the ordered items while using a live representative to act as the in-store vendor.

In the embodiments described above, payment information is provided to user interface 4104 before the purchase is completed. In alternative embodiments, payments can be made to an order processing representative in a check-out line when the customer receives the items ordered. Additionally, in the fully automated embodiment, payment can be made at automated in-store vendor 4308 using a credit/debit/ATM card scanner or by allowing a customer to enter account information and or membership information at the automated in-store vendor.

8.0 Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. An automated product purchasing system allowing a customer to sample and/or purchase media products via a remote communications interface, the system comprising:

interface means for providing an interface to a customer accessing the product system via a remote communications medium;

means for accepting input from the customer, said input identifying a desired one or more of a plurality of media products that the customer would like to sample;

means for providing a sample of said desired one or more media products to the customer via the remote communications medium means for determining an abusive status of the customer, wherein the abusive user status is a status indicating excessive sampling of media products without making purchases, means for obtaining and maintaining a user profile for the customer, the user profile including information regarding the customer's abusive user status;

means for defining a predetermined abusive user status time limit; and means for regulating customer usage on a per-customer basis for managing resource consumption of the automated product purchasing system, including limiting usage of the product system by an abusive customer having an abusive user status, wherein said limiting usage includes disconnecting the abusive customer from the product system after said customer has been connected to said product system for said abusive user status time limit.

2. The automated product purchasing system of claim 1, further comprising:

means for accepting an order from the customer via the remote communications medium, said order indicating one or more of the plurality of media products that the customer would like to purchase; and means for processing said order to complete a sale of said indicated one or more of the plurality of media products.

3. The automated product purchasing system of claim 1, further comprising means for providing the customer with information regarding said desired one or more media products identified by the customer.

4. The automated product purchasing system of claim 3, wherein said means for providing the customer with information comprises:

database means for storing information regarding the media products; and means for requesting said information for said desired one or more media products from said database means and providing said information to the customer.

5. The automated product purchasing system of claim 3, wherein said information regarding said desired one or more media products identified by the customer comprises at least one of price, delivery information, and availability information.

6. The automated product purchasing system of claim 3, wherein said information regarding said desired one or more media products identified by the customer comprises information regarding related products.

7. The automated product purchasing system of claim 1, further comprising:

means for determining geographic information of the customer; and means for determining selections offered to the customer based on the customer's geographic information.

8. The automated product purchasing system of claim 1, wherein said media product comprise album titles and said sample is a sample of a song from one of said album titles.

9. The automated product purchasing system of claim 1, wherein said interface means is a voice response unit and said remote communications medium is a telephone.

10. The automated product purchasing system of claim 9, wherein said voice response unit comprises means for playing a script to the customer said script providing the customer with menu choices.

11. The automated product purchasing system of claim 10, wherein said voice response unit further comprises:

means for determining geographic information of the customer; and means for determining which of a plurality of scripts to play to the customer based on the customer's geographic information.

12. The automated product purchasing system of claim 10, wherein said means for determining geographic information comprising means for mapping the customer's call identification information to a zip code from which the customer's geographic area is determined.

13. The automated product purchasing system of claim 1, further comprising:
    means for accepting an order from the customer via the remote communications medium, said order indicating a media product that the customer would like to purchase;
    means for creating an order record for that customer, said order record containing an identification of said indicated media product;
    means for appending the order record to include an identification of one or more additional media products ordered by the customer.

14. The automated product purchasing system of claim 13, further comprising:
    means for determining whether the customer has finished ordering media products; and
    means for completing a sale of the products identified in said order records.

15. The automated product purchasing system of claim 14, wherein said means for completing a sale comprises means for securing payment from the customer and means for forwarding the customer's order to a fulfillment center for processing.

16. The automated product purchasing system of claim 1, wherein said media products are album titles and said means for providing a sample comprises means for audibly playing a portion of a desired one of said album titles.

17. The automated product purchasing system of claim 1, wherein said media products are computer software titles and said means for providing a sample comprises means for allowing the customer to demo the software title.

18. The automated product purchasing system of claim 1, wherein said interface means provides an interface to a customer accessing the sampling system via a computer at a remote location.

19. The automated product purchasing system of claim 18, wherein said means for providing a sample comprises means for downloading a portion of a desired one of said media products so that said portion can be run on said computer.

20. The automated product purchasing system of claim 19, wherein said media products comprise products from the group of album titles, video titles, and computer software titles.

21. The automated product purchasing system of claim 1, further comprising:
    means for holding items selected by the customer if the customer disconnects from the automated product purchasing system prior to purchase being complete.

22. The automated product purchasing system of claim 1, wherein the user profile includes at least one of an indication of customer purchase history and customer music preference.

23. The automated product purchasing system of claim 22, wherein the customer is offered media products in response to at least one of the customer purchase history and customer music preference.

24. A method for allowing a customer to sample media products via a remote communications interface, the method comprising the steps of:
    accepting input from the customer, said input identifying a desired one or more of a plurality of media product the customer would like to sample;
    providing a sample of said desired one or more media products to the customer via the remote communications medium;
    determining an abusive user status of the customer, wherein the abusive user status is a status indicating excessive sampling of media products without making purchases;
    obtaining and maintaining a user profile for the customer, the user profile including information regarding the customer's abusive user status;
    defining a predetermined customer abusive user status time limit; and
    regulating customer usage on a per-customer basis for managing resource consumption of the automated product purchasing systems including limiting usage of the product system by an abusive customer having an abusive user status, wherein said limiting usage includes disconnecting the abusive customer from the product system after said customer has been connected to said product system for said abusive user status time limit.

25. The method of claim 24, further comprising the steps of:
    accepting an order from the customer via the remote communications medium, said order indicating one or more of the plurality of media products that the customer would like to purchase; and
    processing said order to complete a sale of said indicated one or more of the plurality of media products.

26. The method of claim 24, further comprising the step of providing the customer with information regarding said desired one or more media products identified by the customer.

27. The method of claim 26, wherein said information regarding said desired one or more media products identified by the customer comprises at least one of price, delivery information, availability information, and related products.

28. The method of claim 24, further comprising the steps of:
    determining geographic information of the customer; and
    determining selections offered to the customer based on the customer's geographic information.

29. The method of claim 24, wherein said media products comprise album titles, said sample is a sample of a song from one of said album titles and said step of providing a sample of said desired one or more media products to the customer via the remote communications medium comprises the step of transmitting said sample over the remote communications medium.

30. The method of claim 24, wherein said interface means is a voice response unit, said remote communications medium is a telephone and said method further comprises the step of playing a script to the customer said script providing the customer with menu choices.

31. The method of claim 30, further comprising the steps of:
    determining geographic information of the customer; and
    determining which of a plurality of scripts to play to the customer based on the customer's geographic information.

32. The method of claim 31, wherein said step of determining geographic information comprising a step of mapping the customer's call identification information to a zip code from which the customer's geographic area is determined.

33. The method of claim 24, further comprising the steps of:
  accepting an order from the customer via the remote communications medium, said order indicating a media product that the customer would like to purchase;
  creating an order record for that customer, said order record containing an identification of said indicated media product;
  appending the order record to include an identification of one or more additional media products ordered by the customer.

34. The method of claim 33, further comprising the steps of:
  determining whether the customer has finished ordering media products; and
  completing a sale of the products identified in said order records.

35. The method of claim 34, wherein said step of completing a sale comprises the steps of:
  securing payment from the customer; and
  forwarding the customer's order to a fulfillment center for processing.

36. The method of claim 24, wherein said media products are computer software titles and said step of providing a sample comprises a step of providing a demo of the software title to the customer.

37. The method of claim 24, wherein said step of providing a sample comprises the step of downloading a sample of a desired one of said media products to the customer via the remote communications medium so that said sample can be run on a computer at a remote location.

38. The method of claim 24, further comprising the step of holding items selected by the customer if the customer is prematurely disconnected.

39. The method of claim 24, further including the step of obtaining and maintaining a user profile, the user profile including an indication of at least one of a customer purchase history and a customer music preference.

40. The method of claim 39, further including the step of offering media products to the customer in response to at least one of the customer purchase history and customer music preference.

* * * * *